US007488572B2

(12) United States Patent
Goto

(10) Patent No.: US 7,488,572 B2
(45) Date of Patent: Feb. 10, 2009

(54) IMAGE FORMATION METHOD

(75) Inventor: Takahiro Goto, Minami-ashigara (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 10/108,886

(22) Filed: Mar. 29, 2002

(65) Prior Publication Data

US 2003/0108824 A1 Jun. 12, 2003

(30) Foreign Application Priority Data

Mar. 29, 2001 (JP) ............................ 2001-097047

(51) Int. Cl.
*G03C 5/16* (2006.01)
*G03C 1/498* (2006.01)

(52) U.S. Cl. ....................... 430/350; 430/619; 430/631; 430/944; 430/955

(58) Field of Classification Search ................. 430/350, 430/619, 631, 944, 945, 44, 955
See application file for complete search history.

(56) References Cited

U.S. PATENT DOCUMENTS

| | | | | |
|---|---|---|---|---|
| 4,460,681 | A * | 7/1984 | Frenchik | 430/502 |
| 5,393,654 | A * | 2/1995 | Burrows et al. | 430/584 |
| 5,686,228 | A * | 11/1997 | Murray et al. | 430/350 |
| 5,698,380 | A * | 12/1997 | Toya | 430/363 |
| 6,210,869 | B1 * | 4/2001 | Ito | 430/350 |
| 6,329,127 | B1 * | 12/2001 | Ito et al. | 430/350 |
| 6,548,232 | B2 * | 4/2003 | Goto | 430/350 |
| 2002/0028414 | A1 * | 3/2002 | Yanagisawa et al. | 430/601 |

FOREIGN PATENT DOCUMENTS

| | | | |
|---|---|---|---|
| JP | 2000112066 | * | 4/2000 |
| JP | 2000-258870 | A | 9/2000 |
| JP | 2000-284396 | * | 10/2000 |
| JP | 2000-347379 | A | 12/2000 |
| JP | 2001-075228 | A | 3/2001 |
| JP | 2001-092078 | A | 4/2001 |
| JP | 2002-023302 | * | 1/2002 |

* cited by examiner

*Primary Examiner*—Thorl Chea
(74) *Attorney, Agent, or Firm*—Birch, Stewart, Kolasch & Birch, LLP

(57) ABSTRACT

An image formation method comprising exposing a photothermographic material 10 having an image-forming layer and a back layer with a light having a wavelength of 700-850 nm and subjecting it to development in a heat development apparatus provided with a preheating section A, a heat development section B and a gradual cooling section C, wherein the photothermographic material 10 has at least one coated layer obtained by applying a coating solution containing 20 weight % or more of an organic solvent, and the heat development section B is provided with heating members 15 on image-forming layer side 10*a* and back layer side 10*b* and transportation rollers only on the image-forming layer side 10*a* with respect to the photothermographic material 10 to be transported in the apparatus. There is provided an image formation method utilizing a photothermographic material, which can form images showing less generation of density unevenness, high contrast and high maximum density without causing physical deformation.

26 Claims, 2 Drawing Sheets

IMAGE FORMATION METHOD

BACKGROUND OF THE INVENTION

1. Field of the Invention

The present invention relates to an image formation method for a photothermographic material, in particular, an image formation method for a photothermographic material for scanners or image setters suitable for photomechanical process. More precisely, the present invention relates to an image formation method for a photothermographic material that does not cause physical deformation and uneven density and can provide performances of high contrast and high maximum density.

2. Description of the Related Art

Various image formation methods are known in which image formation is attained by exposing imagewise a photosensitive material having a photosensitive image-forming layer on a support. Among such methods, methods of forming images by subjecting a photosensitive material to heat development are known as methods that contribute to environmental protection and enable simplification of image formation system. In recent years, reduction of amount of waste processing solutions is strongly desired in the field of photomechanical process from the standpoints of environmental protection and space savings. Therefore, techniques relating to photothermographic materials for use in photomechanical process are required to be developed, which enables efficient exposure by a laser scanner or a laser image setter and formation of a clear black image having high resolution and sharpness. Such photothermographic materials can provide users with a simple and non-polluting heat development processing system that eliminates the use of solution-type processing chemicals.

Methods for forming images by heat development are described in, for example, U.S. Pat. Nos. 3,152,904, 3,457,075 and D. Klosterboer, Imaging Processes and Materials, "Thermally Processed Silver Systems A", Neblette, 8th ed., Chapter 9, page 279, compiled by J. Sturge, V. Walworth and A. Shepp, (1989). Such a photothermographic material contains a reducible non-photosensitive silver source (e.g., silver salt of an organic acid), a photocatalyst (e.g., silver halide) in a catalytically active amount, and a reducing agent for silver, which are usually dispersed in an organic binder matrix. The photosensitive material is stable at an ambient temperature, but when the material is heated at a high temperature (e.g., 80° C. or higher) after light exposure, silver is produced through an oxidation-reduction reaction between the reducible silver source (which functions as an oxidizing agent) and the reducing agent. The oxidation-reduction reaction is accelerated by catalytic action of a latent image generated upon exposure. The silver produced by the reaction of the reducible silver salt in the exposed region shows black color and this presents a contrast to the non-exposed region to form an image.

Such a photothermographic material is produced by applying coating solutions prepared by dissolving various materials in solvents on a support to form multiple layers including an image-forming layer. As solvents of the coating solutions, organic solvents such as methyl ethyl ketone and acetone may be used. Although a photosensitive material using an organic solvent as a solvent of coating solution may suffer from fluctuation of density due to fluctuation of development temperature or with time, generation of such an event may be suppressed by making the amount of remaining solvent after the coating constant as disclosed in Japanese Patent Laid-open Publication (Kokai, hereinafter referred to as JP-A) No. 6-301140 etc.

By the way, the image formation methods based on heat development comprise a thermal development step in which temperature of photothermographic material exposed imagewise is increased for development. As embodiments of heat development apparatus, there are heat development apparatuses in which a photothermographic material is brought into contact with a heat source such as heat roller or heat drum as disclosed in Japanese Patent Publication (Kokoku, hereinafter referred to as JP-B) No. 5-56499, JP-A-9-292695, JP-A-9-297385 and International Patent Publication WO95/30934, and heat development apparatuses of non-contact type as disclosed in JP-A-7-13294, WO97/28489, WO97/28488 and WO97/28487.

On the other hand, a photosensitive material that provides images of high contrast is required for printing plate making, and uses of hydrazine derivatives are known as techniques of obtaining high contrast as disclosed in U.S. Pat. Nos. 5,545,505 and 5,464,738. However, when these techniques for obtaining high contrast are employed, unevenness of density may be generated by the heat development. Further, since films for printing plate making have a large size, they suffer from a problem of being more likely to cause unevenness of density. Furthermore, they also suffer from a problem that, when uneven external force is applied to them at the time of the heat development, they cause physical deformation and thus unevenness of density is generated. As for the type of heat development apparatus, those of contact type are characterized in that they provide uniform heat development, and those of non-contact type are characterized in that they hardly cause physical deformation since they do not utilize captive force at the time of transportation. However, films for use in printing have a large film size and hence they are more likely to suffer from the problems of unevenness of density and physical deformation. Therefore, there has been desired an image formation method that does not cause physical deformation and unevenness of density and can provide performances of high contrast and high maximum density.

SUMMARY OF THE INVENTION

The present invention was accomplished in view of the aforementioned various problems, and its object is to provide an image formation method that does not cause physical deformation, but generates less unevenness of density and can provide images of high contrast and high maximum density with a photothermographic material for photomechanical process, in particular, such a photothermographic material for scanners or imagesetters.

In order to achieve the aforementioned object, the present invention provides an image formation method comprising exposing a photothermographic material having an image-forming layer and a back layer with a light having a wavelength of 700-850 nm and subjecting it to development in a heat development apparatus provided with a preheating section, a heat development section and a gradual cooling section, wherein the photothermographic material has at least one coated layer obtained by applying a coating solution containing 20 weight % or more of an organic solvent, and the heat development section is provided with heating members on image-forming layer side and back layer side and transportation rollers only on the image-forming layer side with respect to the photothermographic material to be transported in the apparatus.

In the image formation method of the present invention, the photothermographic material is preferably in a form of sheet having a width of 550-650 mm and a length of 1-65 m, and a part or all of the material is rolled around a core member of cylindrical shape so that the image-forming layer side of the material should be exposed to outside. Further, development speed of the photothermographic material during the heat development is preferably 20-200 mm/second.

According to the image formation method of the present invention, images showing less generation of density unevenness, high contrast and high maximum density can be provided without causing physical deformation by using a photothermographic material for photomechanical process, in particular, such a material for scanners or imagesetters.

DETAILED DESCRIPTION OF THE PREFERRED EMBODIMENTS

Figure 1:
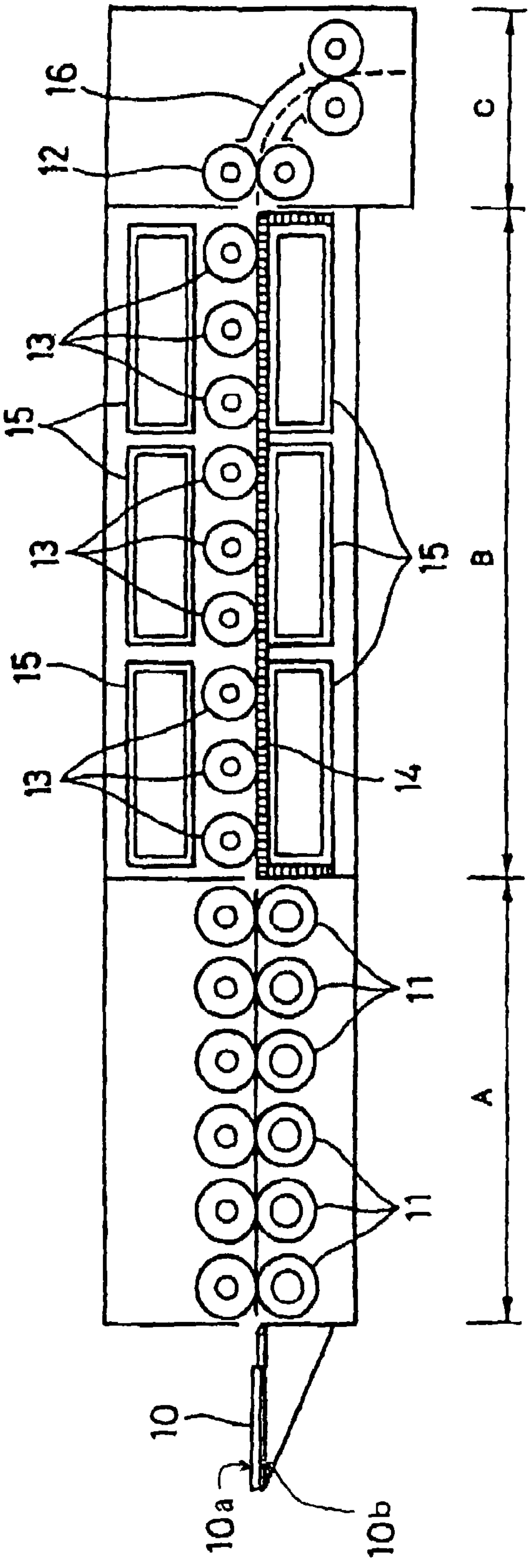
FIG. 1 is a side view of an exemplary heat development apparatus used for the image formation method of the present invention. In the figure, there are shown a photothermographic material 10, taking-in roller pairs 11, taking-out roller pairs 12, rollers 13, a flat surface 14, heaters 15, and guide panels 16. The apparatus consists of a preheating section A, a heat development section B, and a gradual cooling section C.

Hereafter, the image formation method of the present invention will be explained in detail. In the present specification, ranges indicated with "-" mean ranges including the numerical values before and after "-" as the minimum and maximum values.

The present invention relates to an image formation method using a photothermographic material. In the image formation method of the present invention, the aforementioned photothermographic material is light-exposed first with a light having a wavelength of 700-850 nm. As the light exposure apparatus used for the light exposure, any apparatus may be used so long as it is an exposure apparatus enabling light exposure with an exposure time of $10^{-7}$ second or shorter. However, a light exposure apparatus utilizing a laser diode (LD) or a light emitting diode (LED) as a light source is preferably used in general. In particular, LD is more preferred in view of high output and high resolution. Any of these light sources may be used so long as they can emit a light of electromagnetic wave spectrum of desired wavelength range. For example, as for LD, dye lasers, gas lasers, solid state lasers, semiconductor lasers and so forth can be used.

For use in printing, it is preferred that density of non-image areas should be low for wavelengths of from UV region to visible region, and a material that is sensitive for a light of 700-850 nm is required.

In the image formation method of the present invention, the light exposure of the photothermographic material is preferably performed with overlapped light beams of light sources. The term "overlapped" means that a vertical scanning pitch width is smaller than the diameter of the beams. For example, the overlap can be quantitatively expressed as FWHM/vertical-scanning pitch width (overlap coefficient), where the beam diameter is represented as a half width of beam strength (FWHM). In the present invention, it is preferred that this overlap coefficient is 0.2 or more.

The scanning method of the light source of the light exposure apparatus used in the present invention is not particularly limited, and the cylinder external surface scanning method, cylinder internal surface scanning method, flat surface scanning method and so forth can be used. Although the channel of light source may be either of single channel or multichannel, a multichannel comprising two or more of laser heads is preferred, because it provides high output and shortens writing time. In particular, for the cylinder external surface scanning method, a multichannel carrying several to several tens of laser heads is preferably used.

When the photothermographic material to be exposed shows low haze upon light exposure, it is likely to generate interference fringes and therefore it is preferable to prevent them. As techniques for preventing such interference fringes, there are known a technique of obliquely irradiating a photosensitive material with a laser light as disclosed in JP-A-5-113548, a technique of utilizing a multimode laser disclosed in WO95/31754 and so forth, and these techniques are preferably used.

In the image formation method of the present invention, the photothermographic material is light-exposed to form a latent image, and then subjected to development in a development apparatus equipped with a preheating section, a heat development section and a gradual cooling section. The development temperature in the development apparatus is preferably 80-250° C., more preferably 100-140° C. The development time in the development apparatus is preferably 1-180 seconds, more preferably 5-90 seconds, in total. Further, the heat development speed in the development apparatus is preferably 20-200 mm/second, more preferably 25-200 mm/second.

The light-exposed photothermographic material is first heated in the preheating section. The preheating section is provided in order to prevent uneven development caused by dimensional change of the photothermographic material during the heat development. As for the heating in the preheating section, temperature is desirably controlled to be lower than the heat development temperature (for example, lower by about 10-30° C.), and the temperature and time in this section are desirably adjusted so that they should be sufficient for evaporating moisture remaining in the photothermographic material. The temperature is also preferably adjusted to be higher than the glass transition temperature (Tg) of the support of the photothermographic material so that uneven development should be prevented. It is generally preferred that the photothermographic material should be heated at a temperature of 80° C. or higher but lower than 115° C. for 5 seconds or more.

The photothermographic material heated at the preheating section is subsequently heated in the heat development section. In the image formation method of the present invention, the heat development section is provided with heating members on image-forming layer side and back layer side and transportation rollers only on the image-forming layer side with respect to the photothermographic material to be transported. For example, when the photothermographic material is transported so that it should have the image-forming layer on the upper side, there is employed a configuration that no transportation rollers are provided on the lower side of the photothermographic material (back layer side of the photothermographic material) and transportation rollers are provided only on the upper side (image-forming layer side of the photothermographic material) with respect to the transportation plane of the photothermographic material. In the present invention, generation of uneven density and physical deformation are prevented by employing the above configuration of the heat development section.

In the heat development section, the photothermographic material is heated by heating members such as heaters. The heating temperature in the heat development section is a temperature sufficient for the heat development, and it is generally 110-140° C. Since the photothermographic material is subjected to a high temperature of 110° C. or higher in the heat development section, a part of the components contained in the material or a part of decomposition products produced by the heat development may be volatilized. It is known that these volatilized components invite various bad influences, for example, they may cause uneven development, erode structural members of development apparatuses, deposit at low temperature portions as dusts to cause deformation of image surface, adhere to image surface as stains and so forth. As a method for eliminating these influences, it is known to provide a filter on the heat development apparatus, or suitably control air flows in the heat development apparatus. These methods may be effectively used in combination. For example, WO95/30933, WO97/21150 and International Patent Publication in Japanese (Kohyo) No. 10-500496 disclose use of a filter cartridge containing binding absorption particles and having a first vent for taking up volatilized components and a second vent for discharging them in a heating apparatus for heating a photothermographic material by contact. Further, WO96/12213 and International Patent Publication in Japanese (Kohyo) No. 10-507403 disclose use of a filter consisting of a combination of heat conductive condensation collector and a gas-absorptive microparticle filter. These can be preferably used in the present invention. Further, U.S. Pat. No. 4,518,845 and JP-B-3-54331 disclose structures comprising means for eliminating vapor from a photothermographic material, pressing means for pressing a photothermographic material to a heat-conductive member and means for heating the heat-conductive member. Furthermore, WO98/27458 discloses elimination of components volatilized from a photothermographic material and increasing fog from a surface of a photothermographic material. These techniques are also preferably used for the present invention.

Temperature distribution in the preheating section and the heat development section is preferably in the range of ±1° C. or less, more preferably ±0.5° C. or less, respectively.

The photothermographic material heated in the heat. development section is then cooled in the gradual cooling section. It is preferred that the cooling should be gradually attained so that the photothermographic material should not physically deform, and the cooling rate is preferably 0.5-100C/second.

An exemplary structure of heat development apparatus used for the image formation method of the present invention is shown in FIG. 1.

FIG. 1 depicts a schematic side view of a heat development apparatus. The heat development apparatus shown in FIG. 1 consists of a preheating section A for preheating a photothermographic material 10, a heat development section B for carrying out the heat development, and a gradual cooling section C for cooling the photothermographic material. The preheating section A comprises taking-in roller pairs 11 (upper rollers are silicone rubber rollers, and lower rollers are aluminum heating rollers). The Heat development section B is provided with multiple rollers 13 on the side contacting with the surface 10*a* of the photothermographic material 10 on which the image-forming layer is formed, and a flat surface 14 adhered with non-woven fabric (composed of, for example, aromatic polyamide, polytetrafluoroethylene (Teflon™) etc.) or the like on the opposite side to be contacted with the back layer side surface 10*b* of the photothermographic material 10. The clearance between the rollers 13 and the flat surface 14 is suitably adjusted to a clearance that allows the transportation of the photothermographic material 10. The clearance is generally 0-1 mm. In the heat development section B, heaters 15 (panel heaters etc.) are further provided over the rollers 13 and under the flat surface 14 so as to heat the photothermographic material 10 from the image-forming layer side and the back layer side. The gradual cooling section C is provided with taking-out roller pairs 12 for taking out the photothermographic material 10 from the heat development section B and guide panels 16.

The photothermographic material 10 is subjected to heat development while it is transported by the taking-in roller pairs 11 and then by the taking-out roller pairs 12.

After the light exposure, the photothermographic material 10 is carried into the preheating section A. In preheating section A, the photothermographic material 10 is made into a flat shape, preheated and then transported into the heat development section B by the multiple taking-in rollers. The photothermographic material 10 carried into the heat development section B is inserted into the clearance between the multiple rollers 13 and the flat surface 14 and transported by driving of the multiple rollers 13 contacting with the surface 10*a* of the photothermographic material 10, while the back layer side surface 10*b* slides on the flat surface 14. During the transportation, the photothermographic material 10 is heated to a temperature sufficient for the heat development by the heaters 15 from both of the image-forming layer side and the back layer side so that the latent image formed by the light exposure is developed. Then, the photothermographic material 10 it transported into the gradual cooling section C, and made into a flat shape and taken out from the heat development apparatus 20 by the taking-out roller pairs 12.

The materials of the surfaces of the rollers 13 and the member of the flat surface 14 in the heat development section B may be composed of any materials so long as they have heat resistance and they should not cause any troubles in the transportation of the photothermographic material 10. However, the material of surfaces of the rollers 13 is preferably composed of silicone rubber, and the member of the flat surface 14 is preferably composed of non-woven fabric made of aromatic polyamide or Teflon (PTFE). Shape and number of the heaters 15 are not particularly limited so long as they can heat the photothermographic material 10 to a temperature sufficient for the heat development of the material. However, they preferably have such a configuration that heating temperature of each heater can be adjusted freely.

The photothermographic material 10 is heated in the preheating section A comprising the taking-in roller pairs 11 and the heat development section B comprising the heaters 15. Temperature of the preheating section A is preferably controlled to be lower than the heat development temperature (for example, lower by about 10-30° C.), and the temperature and time in this section are desirably adjusted so that they should be sufficient for evaporating moisture contained in the photothermographic material 10. The temperature is also preferably adjusted to be higher than the glass transition temperature (Tg) of the support of the photothermographic material 10 so that uneven development should be prevented. Temperature distribution in the preheating section and the heat development section is preferably in the range of ±1° C. or less, more preferably ±0.5° C. or less.

In the gradual cooling section C, in order to prevent deformation of the photothermographic material 10 due to rapid cooling, the guide panels 16 are preferably composed of a material showing low heat conductivity.

As the photothermographic material, for example, one in a form of sheet having a width of 550-650 mm and a length of 1-65 m is used, and it is provided into the heat development system in a state that a part or all of the material is rolled around a core member of cylindrical shape. The material is preferably rolled so that the image-forming layer side of the material should be exposed to outside.

Hereafter, the photothermographic material used as an object of the image formation method of the present invention will be explained.

The photothermographic material used for the present invention has photosensitivity to light of a wavelength in the range of 700-850 nm. The photothermographic material has at least one image-forming layer on a support, and this image-forming layer consists of one or more layers and contains a photosensitive silver halide emulsion showing photosensitivity at least for light of the aforementioned wavelength region in any of the layers. Further, the photothermographic material has a back layer on a surface of the support opposite to the surface on which the image-forming layer is formed (back surface). In addition, it may have a protective layer for protecting the image-forming layer etc., if desired. The photothermographic material used for the present invention is characterized by having at least one coated layer obtained by applying a coating solution containing 20 weight % or more of an organic solvent. Although the coated layer may be any one of the layers in the photothermographic material (e.g., image-forming layer, protective layer etc.), an image-forming layer preferably constitutes the coated layer.

The photothermographic material contains a reducible silver salt of an organic acid. As the silver salt of an organic acid, an aliphatic acid silver salt is preferred. The aliphatic acid silver salt is a silver salt of an aliphatic acid containing a reducible silver source, and a silver salt of an aliphatic carboxylic acid having a long chain (containing 10-30 carbon atoms, preferably 15-25 carbon atoms) is especially preferred. Preferred examples of the aliphatic acid silver salt are disclosed in Research Disclosure Items 17029 and 29963, and include, for example, silver salts of an aliphatic acid such as oxalic acid, behenic acid, arachidic acid, stearic acid, palmitic acid and lauric acid. Particularly preferred is at least one kind selected from silver behenate, silver arachidinate and silver stearate.

The silver salt of an organic acid can be obtained by mixing a water-soluble silver compound with an aliphatic acid that form a complex with silver, and the forward mixing method, reverse mixing method, simultaneous mixing method and controlled double jet method as disclosed in JP-A-9-127643 and so forth are preferably used. For example, an aliphatic acid is added with an alkali metal salt (e.g., sodium hydroxide, potassium hydroxide etc.) to produce an aliphatic acid alkali metal salt soap (e.g., sodium behenate, sodium arachidinate etc.) and then the soap and silver nitrate or the like are added by the controlled double jet method to prepare crystals of silver salt of an aliphatic acid. At that time, silver halide grains may be mixed.

The silver salt of an organic acid may be in the form of tabular grain. Thickness of the tabular grain is preferably 0.005-0.2 μm, more preferably 0.005-0.15 μm, still more preferably 0.005-0.1 μm. Further, tabular ratio TA defined by the following equation is preferably 2-200, more preferably 3-100.

$$TA=B/D$$

(B: project area of aliphatic acid silver salt tabular grain, D: thickness of aliphatic acid silver salt tabular grain).

Further, it is preferred that tabular grains having a tabular ratio of 2 or more should constitute 50% or more, more preferably 55-100%, still more preferably 60-100%, of the total organic acid silver salt grains.

As a method of obtaining a tabular ratio in the desired range, there are, for example, the method of controlling pH, temperature, electric potential, velocity etc. at the time of adding silver nitrate into NaOH solution in an organic acid (preferably aliphatic acid), the method of controlling, pH temperature, electric potential, velocity etc. at the time of adding NaOH solution of an organic acid (preferably aliphatic acid) into a silver nitrate solution, the method of controlling, pH temperature, electric potential, velocity etc. at the time of simultaneously adding and mixing NaOH solution in an organic acid (preferably aliphatic acid) and a silver nitrate solution by the controlled double jet method, the method of ripening silver salt of an organic acid after preparation in a reaction vessel, the method of dispersing silver salt of an organic acid after preparation with a binder in a dispersing apparatus and so forth, and these methods are used each alone or in any combination. Among these, the method of dispersing silver salt of an organic acid after preparation with a binder, activating agent and so forth in a dispersing apparatus to form tabular grains of organic acid silver salt is preferably used.

The mean grain size of the organic acid silver salt grains is preferably 0.2-1.2 μm, more preferably 0.35-1 μm. To obtain the mean grain size used herein, 300 or more grains are extracted from the aforementioned grains and projected areas of individual grains are measured by the replica method or the like. The arithmetic average of diameters of the projected areas considered as circles are calculated to obtain the mean grain size. The grains of the silver salt of an organic acid are preferably monodispersed. The term monodispersion used herein has the same meaning as that used for the silver halide mentioned later, and the monodispersion degree is preferably 1-30. By adjusting the monodispersion degree to be in this range, there can be provided a photosensitive material showing high density and excellent in image storability.

It is not preferred that acicular grains of silver salt of an organic acid coexist with the aforementioned tabular grains of silver salt of an organic acid in order to maintain transparency after the treatment. When grains having a long axis length of 1 μm or more constitute 50% or more of the total number of grains as disclosed in examples of JP-A-9-68772, transparency after the treatment may be markedly degraded.

The photothermographic material contains a silver halide emulsion. Silver halide grains contained in the emulsion function as a photosensor. It is preferable to use silver halide gains having a small grain size in order to reduce cloudiness after the image formation and improve quality of formed images, and the mean grain size is preferably 0.1 μm or less, more preferably 0.01-0.1 μm, particularly preferably 0.02-0.08 μm. The grain size used herein means a ridge length of a silver halide grain for normal crystals including cubic crystals and octahedral crystals, or a diameter of a sphere having the same volume as a silver halide grain for crystals that are not normal crystals, e.g., spherical grains, rod-like grains and tabular grains. The silver halide is preferably monodispersed. The monodispersion used herein means that the monodispersion degree obtained according to the following equation is 40 or less. More preferred are grains showing a monodispersion degree of 30 or less, particularly preferably 0.1 or more but 20 or less.

$$\text{Monodispersion degree}=\{(\text{Standard deviation of grain size})/(\text{Average of grain size})\}\times 100$$

Although shape of the silver halide grain is not particularly limited, it is desirable to use those having a high proportion of [100] face in terms of the Miller index, and this proportion is preferably at least 50%, more preferably at least 70%, still more preferably at least 80%. The proportion of Miller index [100] face can be determined by using the method described in T. Tani, J. Imaging Sci., 29, 165 (1985), which utilizes the difference in adsorption of a sensitizing dye to [111] face and [100] face.

Another preferred form of silver halide is a form of tabular grain. The tabular grain used herein means a grain showing an aspect ratio=r/h of 3 or more, where square root of projected area is defined as r μm and thickness along the direction perpendicular to the projected plane is defined as h μm. The aspect ratio is particularly preferably 3-50. The grain size is preferably 0.1 μm or less, more preferably 0.01-0.08 μm. Such grains are disclosed in U.S. Pat. Nos. 5,264,337, 5,314,798, 5,320,958 and so forth, and desired tabular grains can be easily obtained. When these tabular grains are used in the present invention, sharpness of images is also improved.

The photosensitive silver halide emulsion used for the present invention is not particularly limited as for the halogen composition, and any of silver chloride, silver chlorobromide, silver chloroiodobromide, silver bromide, silver iodobromide, and silver iodide may be used. The emulsion used in the present invention can be prepared based on the methods described in P. Glafkides, Chimie et Phisique Photographique, Paul Montel, 1967; G. F. Duffin, Photographic Emulsion Chemistry, The Focal Press, 1966; V. L. Zelikman et al., Making and Coating of Photographic Emulsion, The Focal Press, 1964 and so forth. That is, the preparation can be performed by any of the acidic method, neutral method, ammonia method and so forth. As the method of reacting a soluble silver salt and a soluble halide salt, any of the single-side mixing method, the simultaneous mixing method, combination thereof and so forth may be used. The silver halide may be added to a layer by any method, and the silver halide is provided so as to locate near the reducible silver source. Further, the silver halide may be prepared by converting a part or all of silver in silver salt of an organic acid into silver halide through a reaction of silver salt of an organic acid and halogen ion, or silver halide may be prepared beforehand and added to a solution for preparing silver salt of an organic acid, and these methods may be used in combination. However, the latter is preferred. In general, the silver halide is preferably contained in the amount of 0.75-30 weight % with respect to the silver salt of an organic acid.

The silver halide preferably contains metal ions of metal belonging to Group VI to Group XI in the periodic table of elements, and the metal is preferably W, Fe, Co, Ni, Cu, Ru, Rh, Pd, Re, Os, Ir, Pt or Au. These metal ions can be introduced into the silver halide in the form of a metal complex or a metal complex ion. As such metal complex or metal complex ion, 6-coordinated metal complexes represented by the following formula (X) are preferred.

$$[ML_6]^m \qquad \text{Formula (X)}$$

In the formula, M represents a transition metal selected from the elements of Group VI to Group XI in the periodic table of elements, L represents a ligand, and m represents 0, 1-, 2-, 3- or 4-. Two or more of L may be identical to or different from each other or one another. M is preferably rhodium (Rh), ruthenium (Ru), rhenium (Re), iridium (Ir) or osmium (Os). Specific examples of the ligand represented by L include ligands of halide (fluoride, chloride, bromide and iodide), cyanide, cyanate, thiocyanate, selenocyanate, tellurocyanate, azide and aquo, nitrosyl, thionitrosyl and so forth, and preferred are aquo, nitrosyl, thionitrosyl and so forth. When an aquo ligand exists, number of the ligands is preferably 2 or less.

Specific examples of the transition metal complex ion represented by the aforementioned formula (X) are shown below. However, the present invention is not limited to these.

1: $[RhCl_6]^{3-}$
2: $[RuCl_6]^{3-}$
3: $[ReCl_6]^{3-}$
4: $[RuBr_6]^{3-}$
5: $[OSCl_6]^{3-}$
6: $[IrCl_6]^{4-}$
7: $[Ru(NO)Cl_5]^{2-}$
8: $[RuBr_4(H_2O)]^{2-}$
9: $[Ru(NO)(H_2O)Cl_4]^{-}$
10: $[RhCl5(H_2O)]^{2-}$
11: $[Re(NO)Cl_5]^{2-}$
12: $[Re(NO)CN_5]^{2-}$
13: $[Re(NO)ClCN_4]^{2-}$
14: $[Rh(NO)_2Cl_4]^{-}$
15: $[Rh(NO)(H_2O)Cl_4]^{-}$
16: $[Ru(NO)CN_5]^{2-}$
17: $[Fe(CN)_6]^{3-}$
18: $[Rh(NS)Cl_5]^{2-}$
19: $[Os(NO)Cl_5]^{2-}$
20: $[Cr(NO)Cl_5]^{2-}$
21: $[Re(NO)Cl_5]^{-}$
22: $[Os(NS)Cl_4(TeCN)]^{2-}$
23: $[Ru(NS)Cl_5]^{2-}$
24: $[Re(NS)Cl_4(SeCN)]^{2-}$
25: $[Os(NS)Cl(SCN)_4]^{2-}$
26: $[Ir(NO)Cl_5]^{2-}$
27: $[Ir(NS)Cl_5]^{2-}$

These metal ions, metal complexes and metal complex ions may be used each alone or two or more kinds of them containing the same metal or different metal may be used in combination. Content of these metal ions, metal complexes and metal complex ions is generally $1\times10^{-9}$ to $1\times10^{-2}$ mole, preferably $1\times10^{-8}$ to $1\times10^{-4}$ mol, per mole of silver halide.

A compound that provides these metals are preferably added at the time of silver halide grain formation so as to be incorporated into silver halide grains, and it may be added in any steps of preparation of silver halide grains, i.e., nucleation, growth, physical ripening and before and after chemical sensitization. In particular, it is preferably added in the step of nucleation, growth or physical ripening, particularly preferably in the step of nucleation or growth, most preferably in the step of nucleation. The addition may be attained by adding divided portions several times, and it may be contained in a silver halide grain uniformly or with a distribution as disclosed in JP-A-63-29603, JP-A-2-306236, JP-A-3-167545, JP-A-4-76534, JP-A-6-110146, JP-A-5-273683 and so forth. Preferably, it is contained in a grain with a distribution.

These metal compounds can be added after being dissolved in water or a suitable organic solvent (e.g., alcohols, ethers, glycols, ketones, ester and amides). For example, there are a method of preliminarily adding an aqueous solution dissolving powder of a metal compound or an aqueous solution dissolving powder of a metal compound together with NaCl or KCl into a solution of water-soluble silver salt or solution of water-soluble halide during the grain formation, a method of simultaneously mixing three kinds of solutions to prepare silver halide grains in which a solution of a metal compound is added as a third aqueous solution when a silver salt solution and a halide solution are mixed simultaneously, a method of adding an aqueous solution of a metal compound to a reaction vessel in a required amount during the grain formation, a method of adding separate silver halide grains preliminarily doped with ions or complex ions of metal at the time of preparation of silver halide to dissolve it and so forth. In particular, the method of adding an aqueous solution of powder of a metal compound or an aqueous solution dissolving a metal compound together with NaCl or KCl into a solution of water-soluble halide is preferred. When they are added to grain surfaces, it is also possible to add an aqueous solution of metal compound in a required amount to a reaction vessel immediately after grain formation, during or after physical ripening or during chemical ripening.

The photosensitive silver halide grains may be desalted by washing methods with water known in the art, such as the noodle washing and flocculation washing.

The photosensitive silver halide grains are preferably subjected to chemical sensitization. As preferred chemical sensitization methods, there can be used sulfur sensitization, selenium sensitization, tellurium sensitization, noble metal sensitization utilizing a gold compound or platinum, palladium or iridium compound and reduction sensitization as well known in this field.

In the present invention, in order to prevent loss of clarity of a plate making film material, the silver halide and the silver salt of an organic acid are preferably used in a total amount of 0.5-2.2 g in terms of silver amount per 1 $m^2$. An amount in this range can provide a high contrast image. Further, amount of the silver halide to the total amount of silver is 50% or less, preferably 25% or less, more preferably 0.1-15%, in terms of weight.

The photothermographic material used for the present invention is a material showing photosensitivity to a light of a wavelength of 700-850 nm. In order to show photosensitivity to a light of the aforementioned wavelength region, the aforementioned silver halide emulsion is preferably subjected to spectral sensitization with a sensitizing dye. For example, there are preferably selected thiacarbocyanines disclosed in JP-B-48-42172, JP-B-51-9609, JP-B-55-39818, JP-A-62-284343, JP-A-2-105135 and so forth for LED light sources and infrared semiconductor laser light sources, tricarbocyanines disclosed in JP-A-59-191032 and JP-A-60-80841 for infrared semiconductor laser light sources, dicarbocyanines containing 4-quinoline nucleus represented by the formula (IIIa) or (IIIb) disclosed in JP-A-59-192242 and JP-A-3-67242 and so forth. Furthermore, when wavelength of infrared laser light source is 750 nm or more, more preferably 800 nm or more, sensitizing dyes disclosed in JP-A-4-182639, JP-A-5-341432, JP-B-6-52387, JP-B-3-10931, U.S. Pat. No. 5,441,866, JP-A-7-13295 and so forth are preferably used to meet lasers of such a wavelength region. These sensitizing dyes may be used each kind alone or two or more kinds of them may be used in combination for supersensitization. Further, together with a sensitizing dye, a dye that does not have spectral sensitization effect in itself or a substance that does not substantially absorb visible light but shows supersensitization effect may be contained.

The photothermographic material preferably contains at least one kind of compound represented by any of the following formulas (1) to (3) as a sensitizing dye having a spectral sensitivity in the infrared region.

Formula (1)

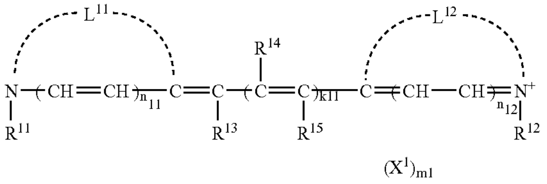

Formula (2)

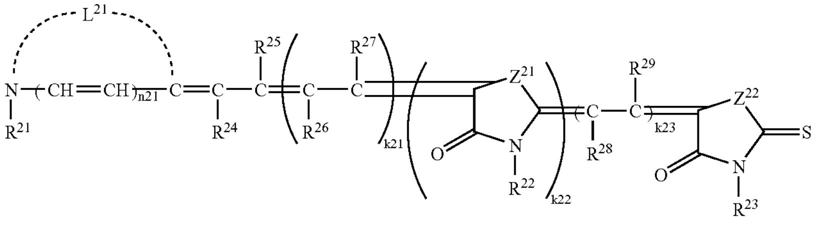

Formula (3)

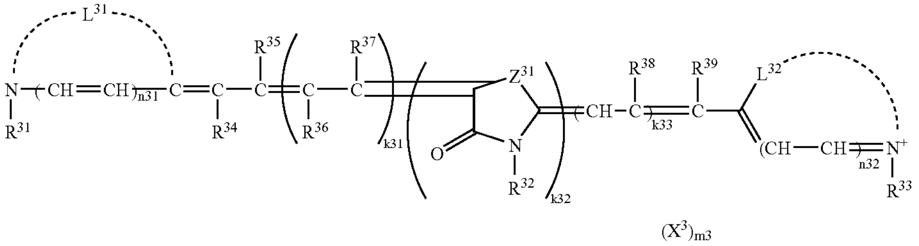

In the formula (1), $L^{11}$ and $L^{12}$ each independently represent a nonmetallic atom group required to complete a monocyclic or condensed 5- or 6-membered nitrogen-containing heterocyclic ring, $R^{11}$ and $R^{12}$ each independently represent an aliphatic group, $R^{13}$, $R^{14}$ and $R^{15}$ each independently represent a hydrogen atom, a substituted or unsubstituted alkyl group, aryl group, alkoxy group, aryloxy group, heterocyclic group, —$SR^1$ or —$NR^2R^3$. $R^1$ represents a substituted or unsubstituted alkyl group, aryl group or heterocyclic group, $R^2$ and $R^3$ each independently represent a substituted or unsubstituted alkyl group or aryl group, and $R^2$ and $R^3$ may bond to each other to form a 5- or 6-membered nitrogen-containing heterocyclic ring. $X^1$ represents an ion required to offset charge in the molecule, and $m^1$ represents a number of the ion required to offset the charge in the molecule. $n^{11}$ and $n^{12}$ each represent 0 or 1. $k^{11}$ represents 2 or 3, and $R^{14}$ and $R^{15}$ existing in the molecule in a multiple number may be identical to or different from each other or one another. Further, if possible, two of $R^{11}$ to $R^{15}$ (including a combination of $R^{14}$ and $R^{14}$ or $R^{15}$ and $R^{15}$, which exist in a multiple number) may bond to each other to form a 5- or 6-membered carbon ring or heterocyclic ring.

As the aforementioned 5- or 6-membered nitrogen-containing heterocyclic ring formed by the atomic group represented by $L^{11}$ or $L^{12}$, there can be mentioned oxazole nucleus (e.g., oxazolidine ring, oxazoline ring, benzoxazole ring, tetrahydrobenzoxazole ring, naphthoxazole ring, benzonaphthoxazole ring etc.), an imidazole nucleus (e.g., imidazolidine ring, imidazoline ring, benzimidazole ring, tetrahydrobenzimidazole ring, naphthoimidazole ring, benzonaphthoimidazole ring etc.), a thiazole nucleus (e.g., thiazolidine ring, thiazoline ring, benzothiazole ring, tetrahydrobenzothiazole ring, naphthothiazole ring, benzonaphthothiazole ring etc.), a selenazole nucleus (e.g., selenazolidine ring, selenazoline ring, benzoselenazole ring, tetrahydrobenzoselenazole ring, naphthoselenazole ring, benzonaphthoselenazole ring etc.), a tellurazole nucleus (e.g., tellurazolidine ring, tellurazoline ring, benzotellurazole ring etc.), a pyridine nucleus (e.g., pyridine ring, quinoline ring etc.), and a pyrrole nucleus (e.g., pyrrolidine ring, pyrroline ring, pyrrole ring, 3,3-dialkylindolenine ring etc.). When atoms constituting these rings may be substituted, they may be substituted with groups exemplified later as substituents represented by $Q^{41}$ to $Q^{88}$.

Examples of the aliphatic group represented by $R^{11}$ or $R^{12}$ include, for example, a linear or branched alkyl group having 1-10 carbon atoms (e.g., methyl group, ethyl group, propyl group, butyl group, pentyl group, iso-pentyl group, 2-ethylhexyl group, octyl group, decyl group etc.), an alkenyl group having 3-10 carbon atoms (e.g., 2-propenyl group, 3-butenyl group, 1-methyl-3-propenyl group, 3-pentenyl group, 1-methyl-3-butenyl group, 4-hexenyl group etc.), and an aralkyl group having 7-10 carbon atoms (e.g., benzyl group, phenethyl group etc.).

The aliphatic group represented by $R^{11}$ or $R^{12}$ may be further substituted with any group among the following substituent group W.

The substituent group W include a lower alkyl group (e.g., methyl group, ethyl group, propyl group etc.), a halogen atom (e.g., fluorine atom, chlorine atom, bromine atom etc.), a vinyl group, an aryl group (e.g., phenyl group, p-tolyl group, p-bromophenyl group etc.), a trifluoromethyl group, an alkoxy group (e.g., methoxy group, ethoxy group, methoxyethoxy group etc.), an aryloxy group (e.g., phenoxy group, p-tolyloxy group etc.), a cyano group, a sulfonyl group (e.g., methanesulfonyl group, trifluoromethanesulfonyl group, p-toluenesulfonyl group etc.), an alkoxycarbonyl group (e.g., ethoxycarbonyl group, butoxycarbonyl group etc.), an amino group (e.g., amino group, biscarboxymethylamino group etc.), an aryl group (e.g., phenyl group, carboxyphenyl group etc.), a heterocyclic group (e.g., tetrahydrofurfuryl group, 2-pyrrolidinon-1-yl group etc.), an acyl group (e.g., acetyl group, benzoyl etc.), a ureido group (e.g., ureido group, 3-methylureido group, 3-phenylureido group etc.), a thioureido group (e.g., thioureido group, 3-methylthioureido group etc.), an alkylthio group (e.g., methylthio group, ethylthio group etc.), an arylthio group (e.g., phenylthio group etc.), a heterocyclylthio group (e.g., 2-thienylthio group, 3-thienylthio group etc.), a carbonyloxy group (e.g., acetyloxy group, propanoyloxy group, benzoyloxy group etc.), an acylamino group (e.g., acetyl amino, benzoylamino group etc.), and a thioamido group (e.g., thioacetamido group, thiobenzoylamino group etc.). The group further includes hydrophilic groups such as a sulfo group, a carboxy group, a phosphono group, a sulfato group, a hydroxy group, a mercapto group, a sulfino group, a carbamoyl group (e.g., carbamoyl group, N-inethylcarbamoyl group, N,N-tetram-tethylenecarbamoyl group etc.), a sulfamoyl group (e.g., sulfamoyl group, N,N-3-oxy-pentamethyleneaminosulfonyl group etc.), a sulfonamido group (e.g., methanesulfonamido group, butanesulfonamido group etc.), a sulfonylaminocarbonyl group (e.g., methanesulfonylamino-carbonyl group, ethanesulfonylaminocarbonyl group etc.), an acylaminosulfonyl group (e.g., acetamidosulfonyl group, methoxyacetamidosulfonyl group etc.), an acylaminocarbonyl group (e.g., acetamidocarbonyl group, methoxyacetamidocarbonyl group etc.), a sulfinylaminocarbonyl group (e.g., methanesulfinyl-aminocarbonyl group, ethanesulfinylaminocarbonyl group etc.) and so forth. Specific examples of the aliphatic group substituted with any of these hydrophilic groups include carboxymethyl, carboxyethyl, carboxybutyl, carboxypentyl, 3-sulfatobutyl, 3-sulfopropyl, 2-hydroxy-3-sulfopropyl, 4-sulfobutyl, 5-sulfopentyl, 3-sulfopentyl, 3-sulfinobutyl, 3-phosphonopropyl, hydroxyethyl, N-methanesulfonylcarbamoylmethyl, 2-carboxy-2-propenyl, o-sulfobenzyl, p-sulfophenethyl, p-carboxybenzyl and so forth.

The alkyl group represented by $R^{13}$, $R^{14}$ or $R^{15}$ includes both of an unsubstituted alkyl group and an alkyl group having one or more substituents. Examples of the substituents of the alkyl group include those of the aforementioned substituent group W. Specific examples of the aforementioned alkyl group include methyl group, ethyl group, butyl group, isobutyl group, 2-methoxyethyl group, 2-hydroxyethyl group, 3-ethoxycarbonyl-propyl group, 2-carbamoylethyl group, 2-methanesulfonylethyl group, 3-methanesulfonylaminopropyl group, benzyl group, phenethyl group, carboxymethyl group, carboxyethyl group, allyl group, 2-furylethyl group and so forth.

The aryl group represented by $R^{13}$, $R^{14}$ or $R^{15}$ includes both of a monocyclic group and a polycyclic group, and includes both of an unsubstituted aryl group and an aryl group having one or more substituents. As examples of the substituents of the aryl group, those of the aforementioned substituent group W can be mentioned. Specific examples of the aryl group include phenyl group, naphthyl group, p-carboxyphenyl group, p-N,N-dimethyl-aminophenyl group, p-morpholinophenyl group, p-methoxyphenyl group, 3,4-dimethoxyphenyl group, 3,4-methylenedioxyphenyl group, 3-chlorophenyl group, p-nitrophenyl group and so forth.

The alkoxy group represented by $R^{13}$, $R^{14}$ or $R^{15}$ includes both of an unsubstituted alkoxy group and an alkoxy group having one or more substituents. As examples of the substituents of the alkoxy group, those of the aforementioned substituent group W can be mentioned. Specific examples of the alkoxy group include methoxy group, ethoxy group, 2-methoxyethoxy group, 2-hydroxyethoxy group and so forth.

The aryloxy group represented by $R^{13}$, $R^{14}$ or $R^{15}$ includes both of an unsubstituted aryloxy group and an aryloxy group having one or more substituents, and includes both of a monocyclic group and a polycyclic group. As examples of the substituents of the aryloxy group, those of the aforementioned substituent group W can be mentioned. Specific examples of the aryloxy group include phenoxy group, 2-naphthoxy group, 1-naphthoxy group, p-tolyloxy group, p-methoxyphenyl group and so forth.

The heterocyclic group represented by $R^{13}$, $R^{14}$ or $R^{15}$ includes both of a monocyclic group and a polycyclic group, and includes both of an unsubstituted heterocyclic group and a heterocyclic group having one or more substituents. As examples of the substituents of the heterocyclic group, those of the aforementioned substituent group W can be mentioned. Specific examples of the heterocyclic group include thienyl group, furyl group, pyridyl group, carbazolyl group, pyrrolyl group, indolyl group, 5-chloro-2-pyridyl group, 5-ethoxycarbonyl-2-pyridyl group, 5-carbamoyl-2-pyridyl group and so forth.

In —$SR^1$ represented by $R^{13}$, $R^{14}$ or $R^{15}$, $R^1$ represents a substituted or unsubstituted alkyl group, aryl group or heterocyclic group. The alkyl group, aryl group and heterocyclic group represented by $R^1$ have the same meanings as such groups represented by $R^{13}$, $R^{14}$ or $R^{15}$, respectively, and similar groups can be mentioned as specific examples thereof. In —$NR^2R^3$ represented by $R^{13}$, $R^{14}$ or $R^{15}$, $R^2$ and $R^3$ each independently represent a substituted or unsubstituted alkyl group or aryl group, and $R^2$ and $R^3$ may bond to each other to form a 5- or 6-membered nitrogen-containing heterocyclic ring. The 5- or 6-membered nitrogen-containing heterocyclic ring may be, for example, pyrrolidine ring, morpholine ring, piperidine ring or the like. The alkyl group and aryl group represented by $R^2$ or $R^3$ have the same meanings as such groups represented by $R^{13}$, $R^{14}$ or $R^{15}$, respectively, and similar groups can be mentioned as specific examples thereof.

The ion required to offset charge in the molecule represented by $X^1$ may be a cation or an anion. Examples of the cation include a proton, organic ammonium ions (e.g., triethylammonium ion, triethanolammonium ion etc.) and inorganic cations (e.g., lithium ion, sodium ion, potassium ion etc.). Specific examples of the anion include halogen ions (e.g., chlorine ion, bromine ion, iodine ion etc.), p-toluenesulfonate ion, perchlorate ion, tetrafluoroborate ion, sulfate ion, methylsulfate ion, ethylsulfate ion, methanesulfonate ion, trifluoromethanesulfonate ion and so forth. $m^1$ represents a number of the ion required to offset the charge in the molecule, and it is determined according to the charge of $X^1$.

$k^{11}$ represents 2 or 3, and a plurality of $R^{14}$ and $R^{15}$ in the molecule may be identical to or different from each other or one another. Further, if possible, two of $R^{11}$ to $R^{15}$ (including a combination of $R^{14}$ and $R^{14}$ or $R^{15}$ and $R^{15}$, which exist in a multiple number) may bond to each other to form a 5- or 6-membered carbon ring or heterocyclic ring (preferably a carbon ring). The formed ring may have one or more substituents at arbitrary positions. As examples of the substituents, those of the aforementioned substituent group W can be mentioned.

In the aforementioned formula (2), $L^{21}$ represents a nonmetallic atom group required to complete a monocyclic or condensed 5- or 6-membered nitrogen-containing heterocyclic ring, $R^{21}$ represents an aliphatic group, $R^{22}$ and $R^{23}$ each independently represent a substituted or unsubstituted alkyl group, aryl group or heterocyclic group, and $R^{24}$ to $R^{29}$ each independently represent a hydrogen atom, a substituted or unsubstituted alkyl group, aryl group, alkoxy group, aryloxy group, heterocyclic group, —$SR^1$ or —$NR^2R^3$, where $R^1$ to $R^3$ have the same meanings as defined above. $R^{21}$ and $R^{24}$, and $R^{25}$ and $R^{27}$ may bond to each other to form a 5- or 6-membered ring. $Z^{21}$ and $Z^{22}$ each independently represent an oxygen atom, a sulfur atom, a selenium atom or —N(R)— where R represents an alkyl group, an aryl group or a heterocyclic group. $n^{21}$ represents 0 or 1, and $k^{21}$, $k^{22}$ and $k^{23}$ each represent 0 or 1.

In the aforementioned formula (2), the nonmetallic atom group represented by $L^{21}$ has the same meaning as the nonmetallic atom group represented by $L^{11}$ or $L^{12}$ in the aforementioned formula (1), and similar groups can be mentioned as specific examples thereof. In the aforementioned formula (2), the aliphatic group represented by $R^{22}$ has the same meaning as the aliphatic group represented by $R^{11}$ or $R^{12}$ in the aforementioned formula (1), and similar groups can be mentioned as specific examples thereof. In the aforementioned formula (2), the alkyl group, aryl group and heterocyclic group represented by $R^{22}$to $R^{29}$, and the alkoxy group, aryloxy group, —$SR^1$ and —$NR^2R^3$ represented by $R^{24}$ to $R^{29}$ have the same meaning as such groups represented by $R^{13}$ to $R^{15}$ in the aforementioned formula (1), and similar groups can be mentioned as specific examples thereof. Further, the alkyl group, aryl group and heterocyclic group represented by R have the same meaning as such groups represented by $R^{13}$ to $R^{15}$ in the aforementioned formula (1), and similar groups can be mentioned as specific examples thereof. The 5- or 6-membered ring formed by $R^{21}$ and $R^{24}$ or $R^{25}$ and $R^{27}$ bonded to each other may have one or more substituents at arbitrary positions. As examples of the substituents, those of the aforementioned substituent group W can be mentioned.

In the formula (3), $L^{31}$ and $L^{32}$ each independently represent a nonmetallic atom group required to complete a monocyclic or condensed 5- or 6-membered nitrogen-containing heterocyclic ring, and $Z^{31}$ represent an oxygen atom, a sulfur atom, a selenium atom or —N(R)— where R has the same meaning as defined above. $R^{31}$ and $R^{33}$ each independently represent an aliphatic group, $R^{32}$ represents a substituted or unsubstituted alkyl group, aryl group or heterocyclic group, and $R^{34}$ to $R^{39}$ each independently represent a hydrogen atom, a substituted or unsubstituted alkyl group, alkoxy group, aryloxy group, aryl group, —$SR^1$ or —$NR^2R^3$ where $R^1$ to $R^3$ have the same meanings as defined above. $R^{31}$ and $R^{34}$ $R^{35}$ and $R^{37}$, or $R^{39}$ and $R^{33}$ may bond to each other to form a 5- or 6-membered ring. $X^3$ represents an ion required to offset charge in the molecule, and $m^3$ represents a number of the ion required to offset the charge in the molecule. $n^{31}$ and $n^{32}$ each represent 0 or 1, and $k^{31}$, $k^{32}$ and $k^{33}$ each independently represent 0 or 1.

In the aforementioned formula (3), the nonmetallic atom group represented by $L^{31}$ or $L^{32}$ has the same meaning as the nonmetallic atom group represented by $L^{11}$ or $L^{12}$ in the aforementioned formula (1), and similar groups can be mentioned as specific examples thereof. In the aforementioned formula (3), the aliphatic group represented by $R^{31}$ or $R^{33}$ has the same meaning as the aliphatic group represented by $R^{11}$ or $R^{12}$ in the aforementioned formula (1), and similar groups can be mentioned as specific examples thereof. In the aforementioned formula (3), the alkyl group, aryl group and heterocyclic group represented by $R^{32}$ and $R^{34}$ to $R^{39}$, and the alkoxy group, aryloxy group, —$SR^1$ and —$NR^2R^3$ represented by $R^{34}$ to $R^{39}$ have the same meaning as such groups represented by $R^{13}$ to $R^{15}$ in the aforementioned formula (1), and similar groups can be mentioned as specific examples thereof. Further, the alkyl group, aryl group and heterocyclic group represented by R have the same meaning as such groups represented by $R^{13}$ to $R^{15}$ in the aforementioned formula (1), and similar groups can be mentioned as specific examples thereof. As also for specific examples of the ion represented by $X^3$ in the aforementioned formula (3), there can be mentioned examples similar to those of the ion represented by $X^1$ in the aforementioned formula (1). The 5- or 6-membered ring formed by $R^{31}$ and $R^{34}$, $R^{35}$ and $R^{37}$, or $R^{39}$ and $R^{33}$ bonded to each other may have one or more substituents at arbitrary positions. As examples of the substituents, those of the aforementioned substituent group W can be mentioned.

Among the compounds represented by the aforementioned formula (1), compounds represented by the following formula (4) or (5) can be mentioned as preferred examples for the case where $k^{11}$ is 2.

Formula (4)

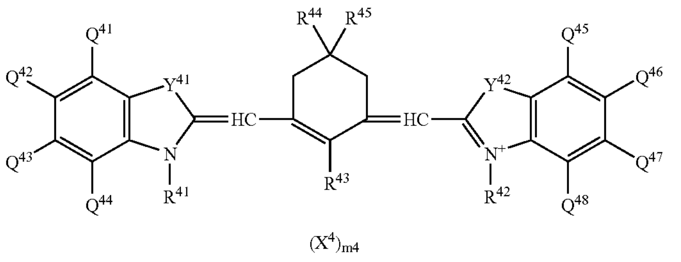

Formula (5)

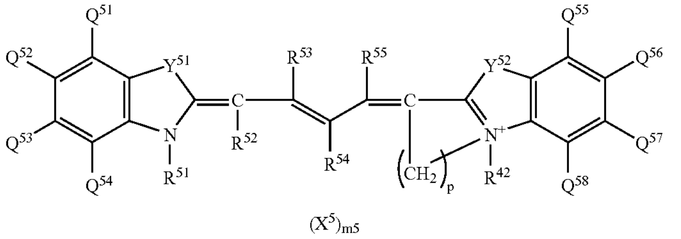

In the aforementioned formula (4), $Y^{41}$ and $Y^{42}$ each independently represent an oxygen atom, a sulfur atom, a selenium atom or —($NR^0$)— where $R^0$ represents an aliphatic group. $R^{41}$ and $R^{42}$ each independently represent an aliphatic group, and $R^{44}$ and $R^{45}$ each independently represent a hydrogen atom, a substituted or unsubstituted alkyl group, aryl group or heterocyclic group. $R^{43}$ represents a hydrogen atom, a halogen atom, a substituted or unsubstituted alkyl group, aryl group, heterocyclic group, alkoxy group, aryloxy group, alkylthio group, arylthio group or amino group. $Q^{41}$ to $Q^{48}$ each independently represent a hydrogen atom or a substituent, and at least one set of $Q^{41}$ and $Q^{42}$, $Q^{42}$ and $Q^{43}$, $Q^{43}$ and $Q^{44}$, $Q^{45}$ and $Q^{46}$, $Q^{46}$ and $Q^{47}$, and $Q^{47}$ and $Q^{48}$ may bond to each other to form a condensed naphthol ring. $X^4$ represents an ion required to offset charge in the molecule, and $m^4$ represents a number of the ion required to offset the charge in the molecule.

In the aforementioned formula (4), the aliphatic group represented by $R^0$, $R^{41}$ or $R^{42}$ has the same meaning as the aliphatic group represented by $R^{11}$ or $R^{12}$ in the aforementioned formula (1), and similar groups can be mentioned as specific examples thereof. In the aforementioned formula (4), the alkyl group, aryl group and heterocyclic group represented by $R^{43}$ to $R^{45}$ have the same meanings as such groups represented by $R^{13}$ to $R^{15}$ in the aforementioned formula (1), and similar groups can be mentioned as specific examples thereof. In the aforementioned formula (4), the alkoxy group and aryloxy group represented by $R^{43}$ have the same meanings as such groups represented by $R^{13}$ to $R^{15}$ in the aforementioned formula (1), and similar groups can be mentioned as specific examples thereof. As specific examples of the ion represented by $X^4$ in the aforementioned formula (4), there can be mentioned ions similar to the specific examples of the ion represented by $X^1$ in the aforementioned formula (1).

The halogen atom represented by $R^{43}$ may be, for example, a fluorine atom, a chlorine atom, a bromine atom or an iodine atom. The alkylthio group represented by $R^{43}$ includes an alkylthio group having one or more substituents and an unsubstituted alkylthio group. Examples of the substituents of the alkylthio group include those of the aforementioned substituent group W. Specific examples of the alkylthio group include methylthio group, ethylthio group and so forth. The arylthio group represented by $R^{43}$ includes an arylthio group having one or more substituents and an unsubstituted arylthio group. Examples of the substituents of the arylthio group include those of the aforementioned substituent group W. Specific examples of the arylthio group include phenylthio group, m-chlorophenylthio group and so forth. The amino group represented by $R^{43}$ includes an amino group having one or more substituents and an unsubstituted amino group. Examples of the substituents of the amino group include those of the aforementioned substituent group W. Specific examples of the amino group include amino group, methylamino group, dimethylamino group, diethylamino group, diphenylamino group, N,N-tetramethyleneamino group, N,N-pentamethyleneamino group and so forth.

Examples of the substituents represented by each of $Q^{41}$ to $Q^{48}$ include a lower alkyl group (e.g., methyl group, ethyl group, propyl group etc.), a halogen atom (e.g., fluorine atom, chlorine atom, bromine atom etc.), a vinyl group, a stilyl group, an aryl group (e.g., phenyl group, p-tolyl group, p-bromophenyl group etc.), a trifluoromethyl group, an alkoxy group (e.g., methoxy group, ethoxy group etc.), an aryloxy group. (e.g., phenoxy group, p-tolyloxy group etc.), a carbonyloxy group (e.g., acetyloxy group, propanoyloxy group, benzoyloxy group etc.), an amino group (e.g., amino group, dimethylamino group, anilino group etc.), a heterocyclic group (e.g., pyridyl group, pyrrolyl group, furyl group, thienyl group, imidazolyl group, thiazolyl group, pyrimidinyl group etc.), an acyl group (e.g., acetyl group, benzoyl group etc.), a cyano group, a sulfonyl group (e.g., methanesulfonyl group, benzenesulfonyl group etc.), a carbamoyl group (e.g., carbamoyl group, N,N-dimethylcarbamoyl group, morpholinocarbonyl group etc.), a sulfamoyl group (e.g., sulfamoyl group, N-phenylsulfamoyl group, morpholinosulfonyl group etc.), an acylamino group (e.g., acetylamino group, benzoylamino group, orth-hydroxybenzoylamino group etc.), a sulfonylamino group (e.g., methanesulfonylamino group, benzenesulfonylamino group etc.), an alkoxycarbonyl group (e.g., methoxycarbonyl group, ethoxycarbonyl group, trifluoroethoxy-carbonyl group etc.), a hydroxyl group, a carboxyl group and so forth.

The condensed naphthol ring formed by at least one set of $Q^{41}$ and $Q^{42}$, $Q^{42}$ and $Q^{43}$, $Q^{43}$ and $Q^{44}$, $Q^{45}$ and $Q^{46}$, $Q^{46}$ and $Q^{47}$, and $Q^{47}$ and $Q^{48}$ bonded to each other may have one or more substituents. As examples of the substituents, those of the aforementioned substituent group W can be mentioned.

In the aforementioned formula (5), $Y^{51}$ and $Y^{52}$ each independently represent an oxygen atom, a sulfur atom, a selenium atom or —($NR^0$)— where $R^0$ represents an aliphatic group. $R^{51}$ represents an aliphatic group or a nonmetallic atom group required to form a 5- or 6-membered condensed ring together with $R^{52}$ bonded thereto, and $R^{52}$ represents a hydrogen atom or a bond to $R^{51}$. $R^{54}$ represents a hydrogen atom, a halogen atom, a substituted or unsubstituted alkyl group, aryl group, heterocyclic group, alkoxy group, aryloxy group, alkylthio group, arylthio group or amino group. $R^{53}$ and $R^{55}$ each independently represent a hydrogen atom, a substituted or unsubstituted alkyl group or a nonmetallic atom group required to form a 5- or 6-membered ring through bonding between $R^{53}$ and $R^{55}$. $Q^{51}$ to $Q^{58}$ each independently represent a hydrogen atom or a substituent, and at least one set of $Q^{51}$ and $Q^{52}$, $Q^{52}$ and $Q^{53}$, $Q^{53}$ and $Q^{54}$, $Q^{55}$ and $Q^{56}$, $Q^{56}$ and $Q^{57}$, $Q^{57}$ and $Q^{58}$ may bond to each other to form a condensed naphthol ring. $X^5$ represents an ion required to offset charge in the molecule, and $m^5$ represents a number of the ion required to offset the charge in the molecule. p represents 2 or 3.

In the aforementioned formula (5), the aliphatic group represented by $R^0$ or $R^{51}$ has the same meaning as the aliphatic group represented by $R^{11}$ or $R^{12}$ in the aforementioned formula (1), and similar groups can be mentioned as specific examples thereof. In the aforementioned formula (5), the alkyl group, aryl group, heterocyclic group, halogen atom, alkoxy group, aryloxy group, alkylthio group, arylthio group and amino group represented by $R^{54}$ have the same meanings as such groups represented by $R^{43}$ in the aforementioned formula (4), and similar groups can be mentioned as specific examples thereof. In the aforementioned formula (5), the alkyl group represented by $R^{53}$ or $R^{55}$ has the same meaning as the alkyl group represented by $R^{13}$ to $R^{15}$ in the aforementioned formula (1), and similar groups can be mentioned as specific examples thereof. As specific examples of the ion represented by $X^5$ in the aforementioned formula (5), there can be mentioned ions similar to the specific examples of the ion represented by $X^1$ in the aforementioned formula (1). As specific examples of the substituents represented by each of $Q^{51}$ to $Q^{58}$ in the aforementioned formula (5), there can be mentioned groups similar to the specific examples of the substituents represented by each of $Q^{41}$ to $Q^{48}$ in the aforementioned formula (4).

The condensed ring formed by $R^{51}$ and $R^{52}$ bonded together, the ring formed by $R^{53}$ and $R^{55}$ bonded together and the condensed naphthol ring formed by at least one set of $Q^{51}$ and $Q^{52}$, $Q^{52}$ and $Q^{53}$, $Q^{53}$ and $Q^{54}$, $Q^{55}$ and $Q^{56}$, $Q^{56}$ and $Q^{57}$, and $Q^{57}$ and $Q^{58}$ bonded together may have one or more substituents. As examples of the substituents, those of the aforementioned substituent group W can be mentioned.

Among the compounds represented by the aforementioned formula (1), compounds represented by any one of the following formulas (6) to (8) can be mentioned as preferred examples for the case where $k^{11}$ is 3.

Formula (6)

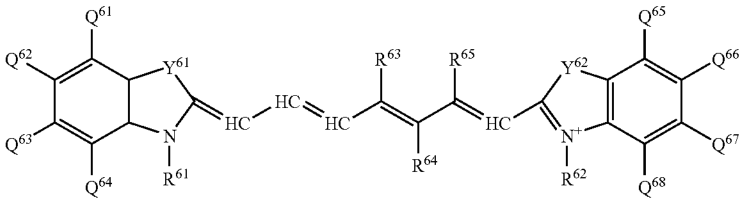

$(X^6)_{m6}$

Formula (7)

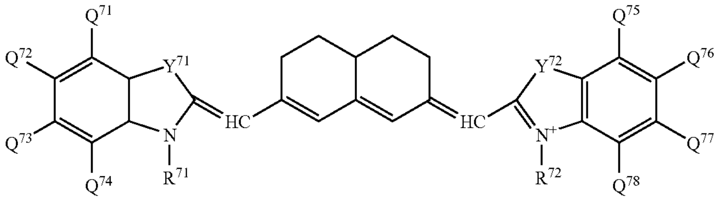

$(X^7)_{m7}$

Formula (8)

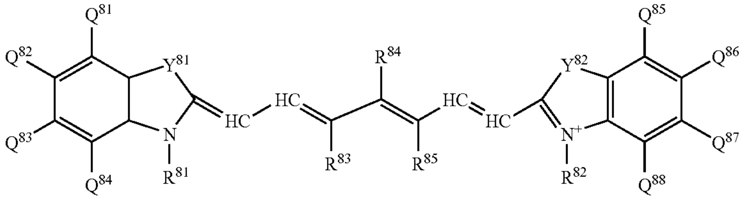

$(X^8)_{m8}$

In the aforementioned formula (6), $Y^{61}$ and $Y^{62}$ each independently represent an oxygen atom, a sulfur atom, a selenium atom or —$(NR^0)$— where $R^0$ represents an aliphatic group. $R^{61}$ and $R^{62}$ each independently represent an aliphatic group, $R^{63}$ and $R^{65}$ represent a nonmetallic atom group required to form a 5- or 6-membered condensed ring through bonding to each other, and $R^{64}$ represents a hydrogen atom, a halogen atom, a substituted or unsubstitutedalkyl group, arylgroup, heterocyclic group, alkoxy group, aryloxy group, alkylthio group, arylthio group or amino group. $Q^{61}$ to $Q^{68}$ each independently represent a hydrogen atom or a substituent, and at least one set of $Q^{61}$ and $Q^{62}$, $Q^{62}$ and $Q^{63}$, $Q^{63}$ and $Q^{64}$, $Q^{65}$ and $Q^{66}$, $Q^{66}$ and $Q^{67}$, and $Q^{67}$ and $Q^{68}$ may bond to each other to form a condensed naphthol ring. $X^6$ represents an ion required to offset charge in the molecule, and $m^6$ represents a number of the ion required to offset the charge in the molecule.

In the aforementioned formula (6), the aliphatic group represented by $R^0$, $R^{61}$ or $R^{62}$ has the same meaning as the aliphatic group represented by $R^{11}$ or $R^{12}$ in the aforementioned formula (1), and similar groups can be mentioned as specific examples thereof. In the aforementioned formula (6), the alkyl group, aryl group, heterocyclic group, halogen atom, alkoxy group, aryloxy group, alkylthio group, arylthio group and amino group represented by $R^{64}$ have the same meanings as such groups represented by $R^{43}$ in the aforementioned formula (4), and similar groups can be mentioned as specific examples thereof. As specific examples of the ion represented by $X^6$ in the aforementioned formula (6), there can be mentioned ions similar to the specific examples of the ion represented by $X^1$ in the aforementioned formula (1). As specific examples of the substituents represented by each of $Q^{61}$ to $Q^{68}$ in the aforementioned formula (6), there can be mentioned groups similar to the specific examples of the substituents represented by each of $Q^{41}$ to $Q^{48}$ in the aforementioned formula (4).

The ring formed by $R^{63}$ and $R^{65}$ bonded together (preferably a hydrocarbon ring) and the condensed naphthol ring formed by at least one set of $Q^{61}$ and Q 62, $Q^{62}$ and $Q^{63}$, $Q^{63}$ and $Q^{64}$, $Q^{65}$ and $Q^{66}$ $Q^{66}$ and $Q^{67}$, and $Q^{67}$ and $Q^{68}$ bonded together may have one or more substituents. As examples of the substituents, those of the aforementioned substituent group W can be mentioned.

In the aforementioned formula (7), $Y^{71}$ and $Y^{72}$ each independently represent an oxygen atom, a sulfur atom, a selenium atom or —$(NR^0)$— where $R^0$ represents an aliphatic group. $R^{71}$ and $R^{72}$ each independently represent an aliphatic group. $Q^{71}$ to $Q^{78}$ each independently represent a hydrogen atom or a substituent, and at least one set of $Q^{71}$ and $Q^{72}$, $Q^{72}$ and $Q^{73}$, $Q^{73}$ and $Q^{74}$, $Q^{75}$ and $Q^{76}$, $Q^{76}$ and $Q^{77}$, and $Q^{77}$ and $Q^{78}$ may bond to each other to form a condensed naphthol ring. $X^7$ represents an ion required to offset charge in the molecule, and $m^7$ represents a number of the ion required to offset the charge in the molecule.

In the aforementioned formula (7), the aliphatic group represented by $R^0$, $R^{71}$ or $R^{72}$ has the same meaning as the aliphatic group represented by $R^{11}$ or $R^{12}$ in the aforementioned formula (1), and similar groups can be mentioned as specific examples thereof. As specific examples of the ion represented by $X^7$ in the aforementioned formula (7), there can be mentioned ions similar to the specific examples of the ion represented by $X^1$ in the aforementioned formula (1). As specific examples of the substituents represented by each of $Q^{71}$ to $Q^{78}$ in the aforementioned formula (7), there can be mentioned groups similar to the specific examples of the substituents represented by each of $Q^{41}$ to $Q^{48}$ in the aforementioned formula (4). The condensed naphthol ring formed by at least one set of $Q^{71}$ and $Q^{72}$, $Q^{72}$ and $Q^{73}$, $Q^{73}$ and $Q^{74}$, $Q^{75}$ and $Q^{76}$, $Q^{76}$ and $Q^{77}$, and $Q^{77}$ and $Q^{78}$ bonded together may have one or more substituents. As examples of the substituents, those of the aforementioned substituent group W can be mentioned.

In the aforementioned formula (8), $Y^{81}$ and $Y^{82}$ each independently represent an oxygen atom, a sulfur atom, a selenium atom or —$(NR^0)$— where $R^0$ represents an aliphatic group. $R^{81}$ and $R^{82}$ each independently represent an aliphatic group. $R^{83}$ and $R^{85}$ each represent a nonmetallic atom group required to form a 5- or 6-membered condensed ring through bonding to each other, and $R^{84}$ represents a hydrogen atom, a halogen atom, a substituted or unsubstituted alkyl group, aryl group, heterocyclic group, alkoxy group, aryloxy group, alkylthio group, arylthio group or amino group. $Q^{81}$ to $Q^{88}$ each independently represent a hydrogen atom or a substituent, and at least one set of $Q^{81}$ and $Q^{82}$, $Q^{82}$ and $Q^{83}$, $Q^{83}$ and $Q^{84}$, $Q^{85}$ and $Q^{86}$, $Q^{86}$ and $Q^{87}$, and $Q^{87}$ and $Q^{88}$ may bond to each other to form a condensed naphthol ring. $X^8$ represents an ion required to offset charge in the molecule, and $m^8$ represents a number of the ion required to offset the charge in the molecule.

In the aforementioned formula (8), the aliphatic group represented by $R^0$, $R^{81}$ or $R^{82}$ has the same meaning as the aliphatic group represented by $R^{11}$ or $R^{12}$ in the aforementioned formula (1), and similar groups can be mentioned as specific examples thereof. In the aforementioned formula (8), the alkyl group, aryl group, heterocyclic group, halogen atom, alkoxy group, aryloxy group, alkylthio group, arylthio group and amino group represented by $R^{84}$ have the same meanings as such groups represented by $R^{43}$ in the aforementioned formula (4), and similar groups can be mentioned as specific examples thereof. As specific examples of the ion represented by $X^8$ in the aforementioned formula (8), there can be mentioned ions similar to the specific examples of the ion represented by $X^1$ in the aforementioned formula (1). As specific examples of the substituents represented by each of $Q^{81}$ to $Q^{88}$ in the aforementioned formula (8), there can be mentioned groups similar to the specific examples of the substituents represented by each of $Q^{41}$ to $Q^{48}$ in the aforementioned formula (4).

The ring formed by $R^{83}$ and $R^{85}$ bonded together (preferably a hydrocarbon ring) and the condensed naphthol ring formed by at least one set of $Q^{81}$ and $Q^2$, $Q^{82}$ and $Q^{83}$, $Q^{83}$ and $Q^{84}$, $Q^{85}$ and $Q^{86}$, $Q^{86}$ and $Q^{87}$, and $Q^{87}$ and $Q^{88}$ bonded together may have one or more substituents. As examples of the substituents, those of the aforementioned substituent group W can be mentioned.

The photothermographic material used for the present invention preferably contains at least one kind of a compound represented by any one of the aforementioned formulas (1) to (3), more preferably contains at least one kind of a compound represented by the aforementioned formula (4) or (5), still more preferably contains at least one kind of a compound represented by any one of the aforementioned formulas (6) to (8), as a sensitizing dye.

Specific examples of the sensitizing dyes represented by any one of the aforementioned formulas (1) to (8) (Exemplary Compounds 1-1 to 1-55) will be shown below. However, the present invention is not limited by these examples at all.

1-1
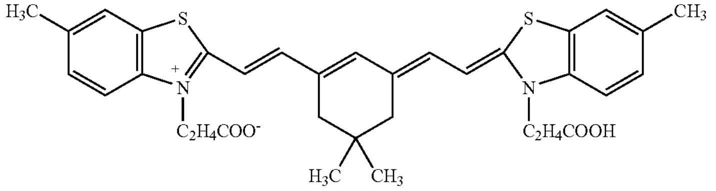
1-2
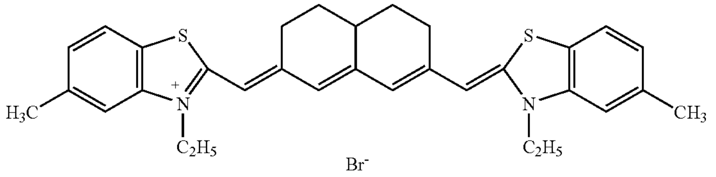
1-3
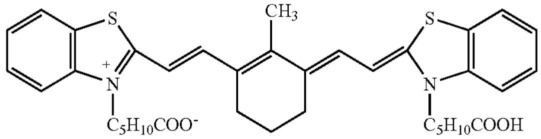
1-4
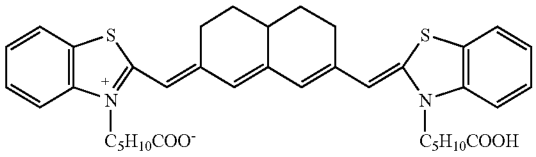
1-5
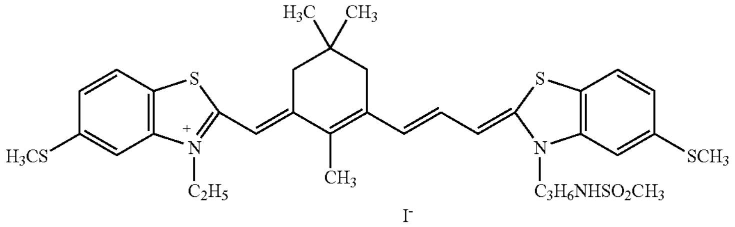
1-6
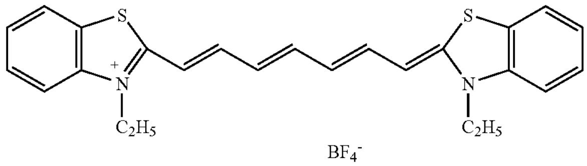
1-7
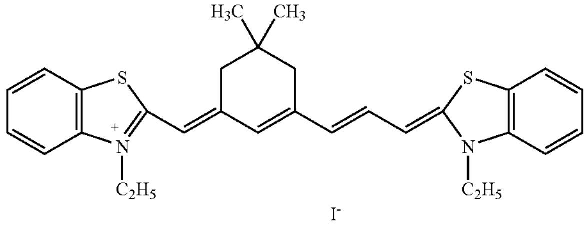
1-8
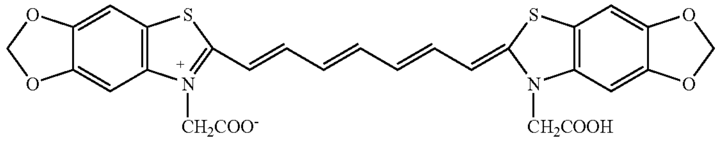
1-9
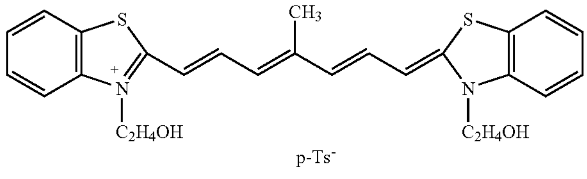

-continued
1-10
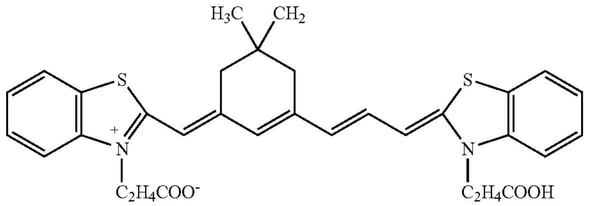
1-11
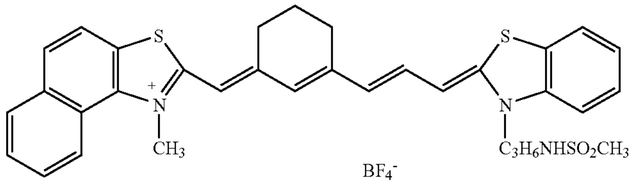
1-12
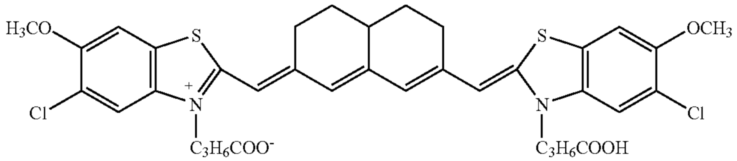
1-13
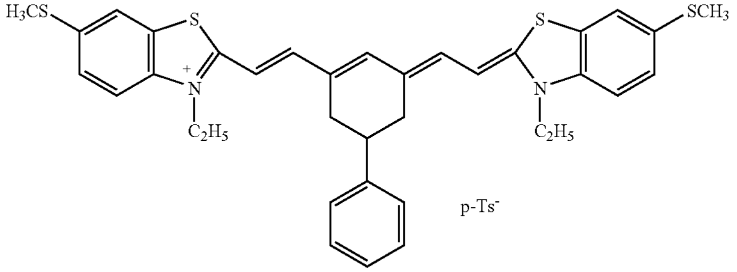
1-14
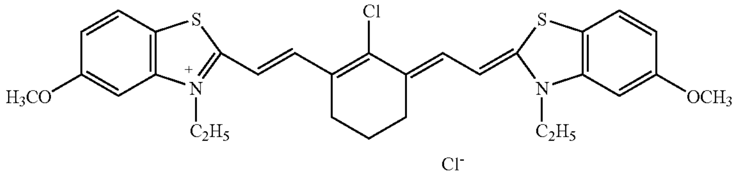
1-15
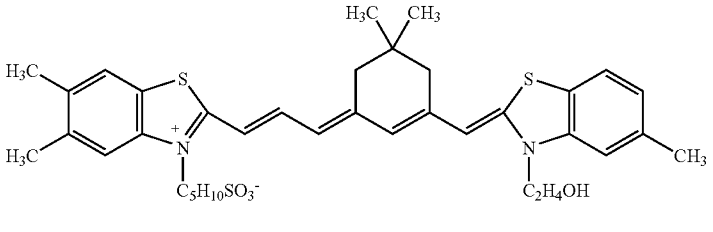
1-16
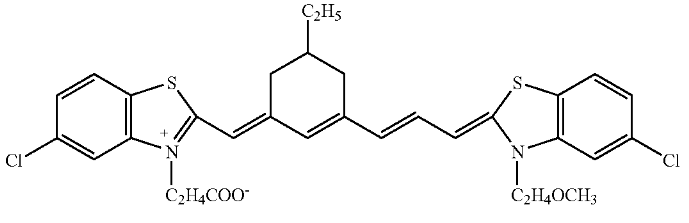

-continued
1-17
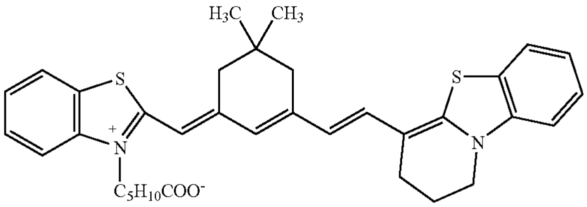
1-18
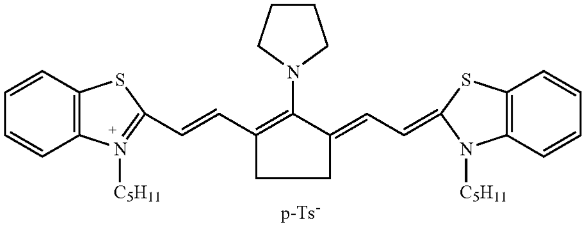
1-19
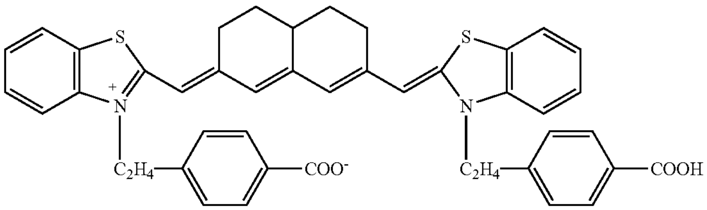
1-20
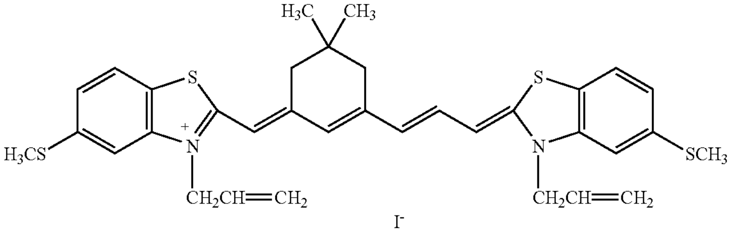
1-21
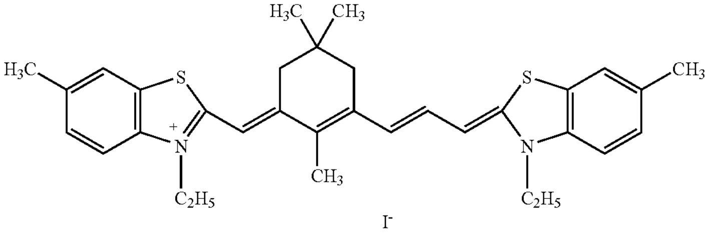
1-22
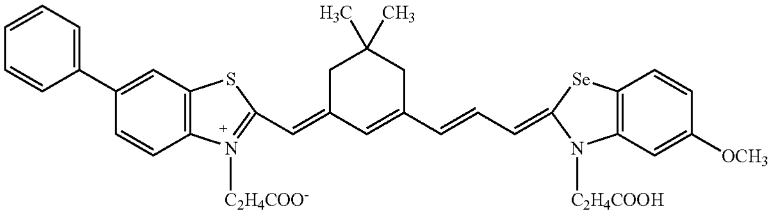
1-23
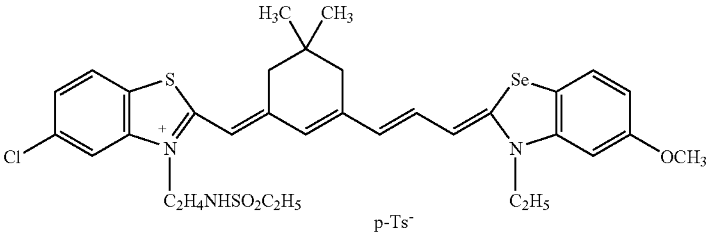

-continued
1-24
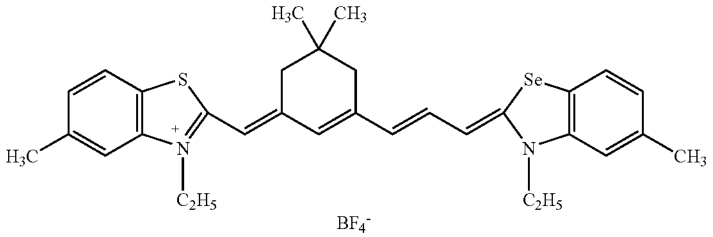
1-25
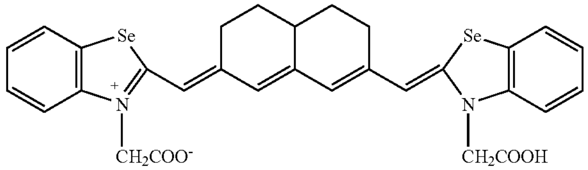
1-26
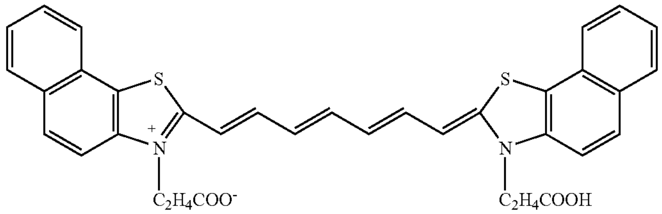
1-27
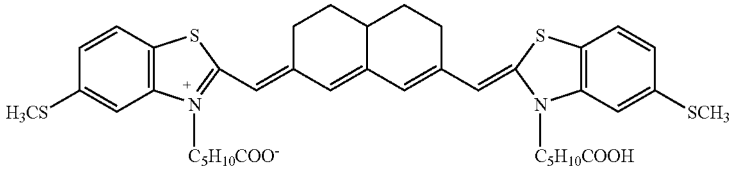
1-28
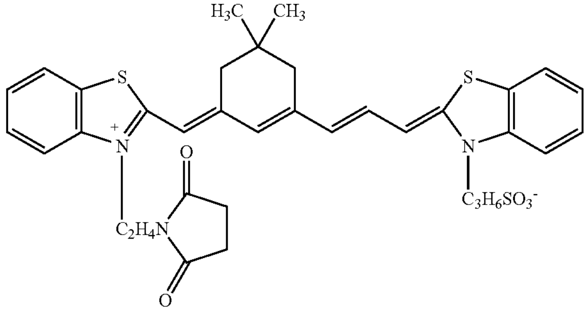
1-29
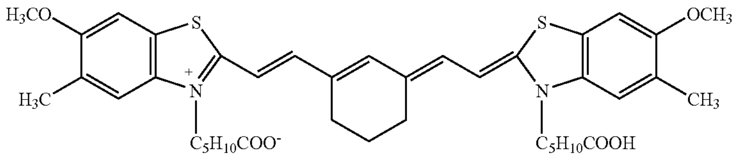
1-30
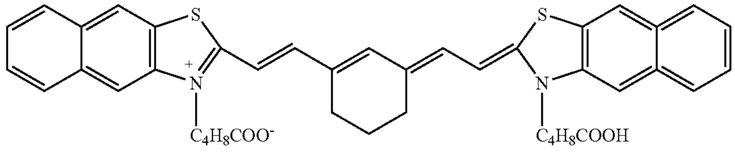

-continued
1-31
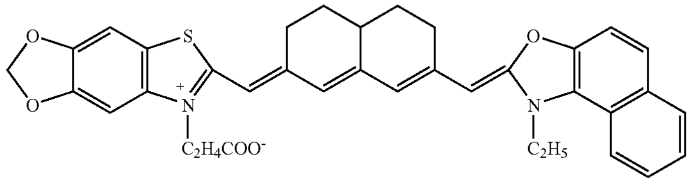
1-32
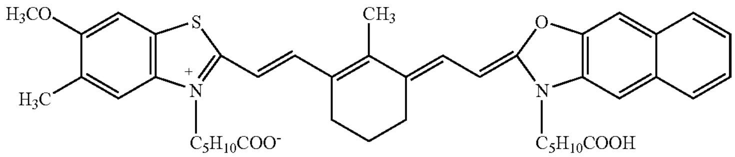
1-33
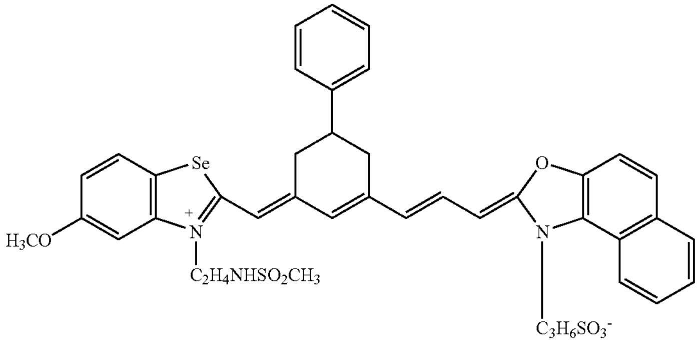
1-34
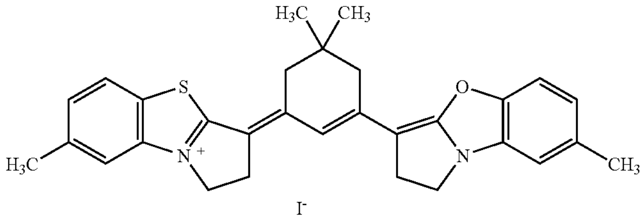
1-35
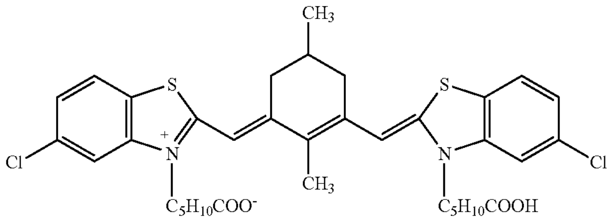
1-36
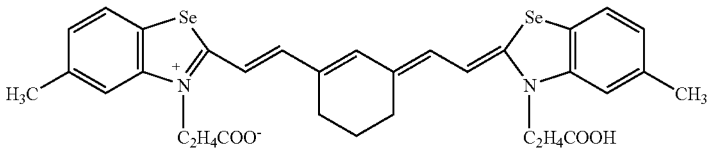
1-37
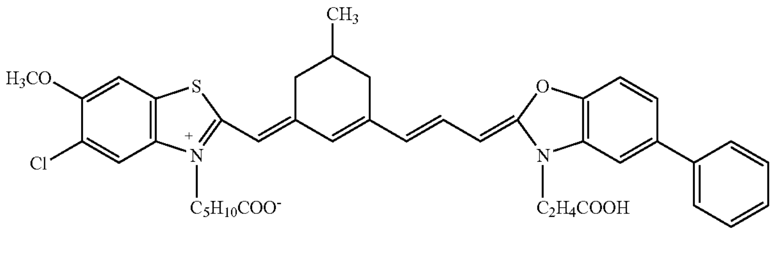

-continued
1-38
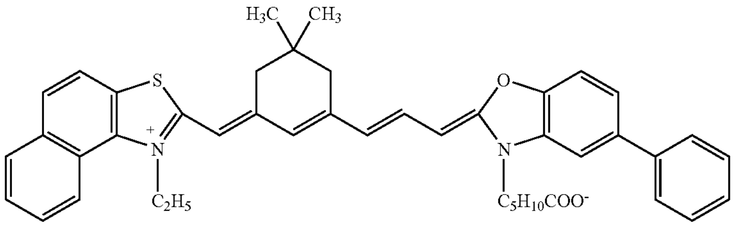
1-39
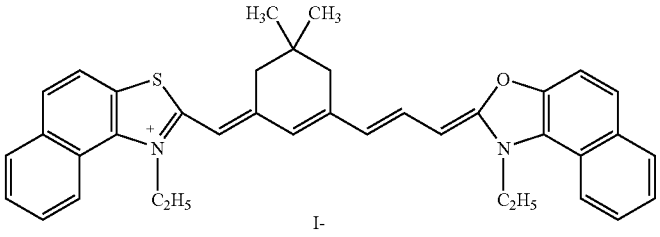
1-40
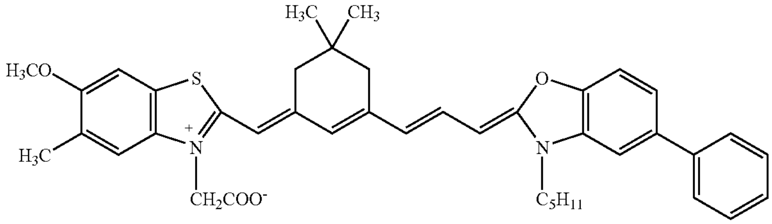
1-41
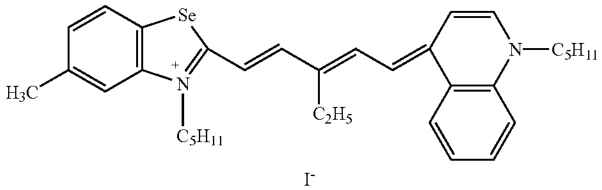
1-42
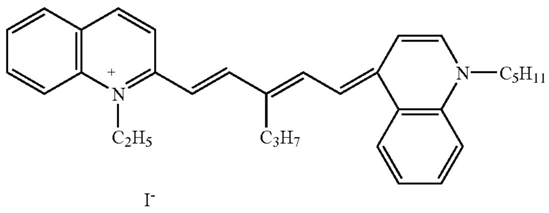
1-43
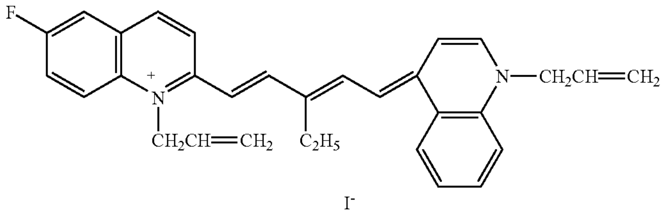
1-44
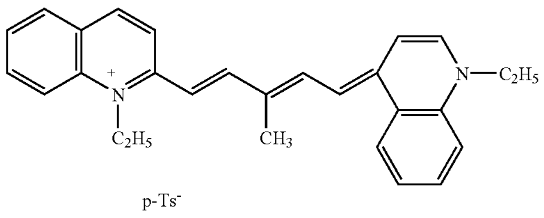

-continued
1-45
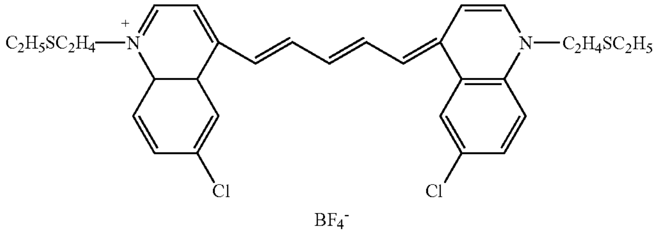
1-46
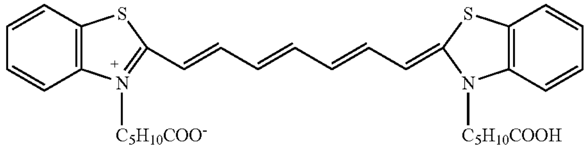
1-47
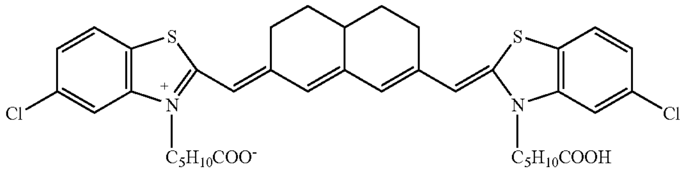
1-48
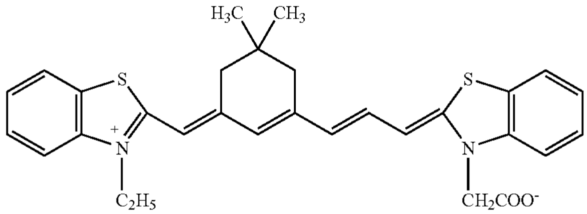
1-49
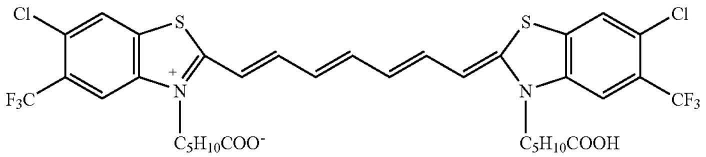
1-50
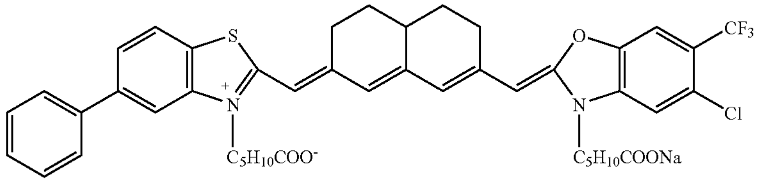
1-51
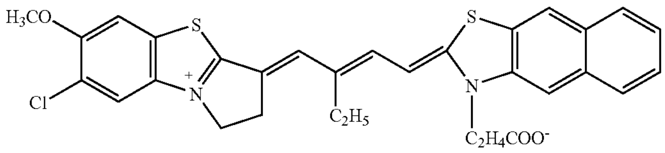
1-52
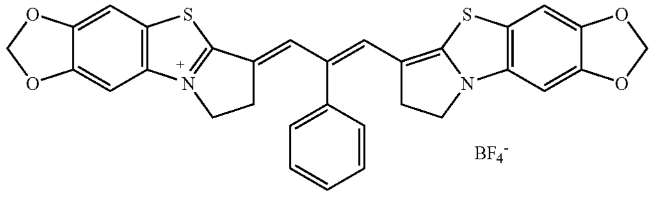

-continued 1-53

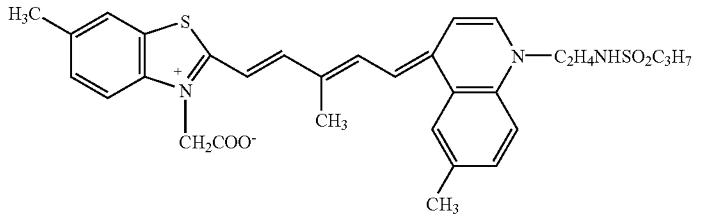

1-54

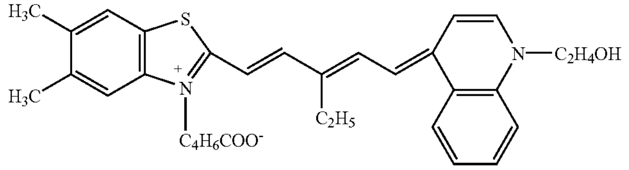

1-55

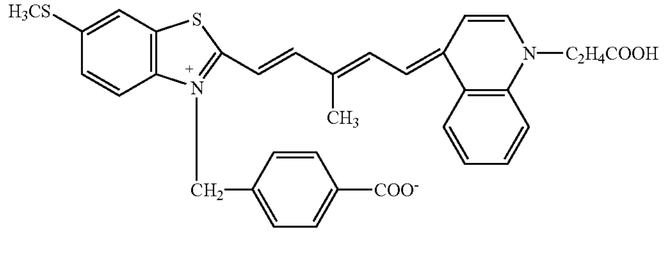

The compounds represented by any one of the aforementioned formulas (1) to (8) can be easily synthesized by, for example, the method described in F. M. Hamer, The Chemistry of Heterocyclic Compounds, vol. 18, "The Cyanine Dyes and Related Compounds", A. Weissherger ed., Interscience, New York, 1964.

The photothermographic material used for the present invention may contain a single kind of sensitizing dye or two or more kinds of sensitizing dyes in combination. When two or more kinds of the compounds represented by any one of the aforementioned formulas (1) to (8) are used in combination, the photosensitive dyes may be dispersed and contained in a silver halide emulsion each independently or as a preliminarily formed mixture. Together with the compounds represented by any one of the aforementioned formulas (1) to (8), the material may contain, for the purpose of supersensitization, a dye showing absorption in the visible region, a dye that does not have spectral sensitization effect in itself or a substance that does not substantially absorb visible light but shows supersensitization effect.

Useful photosensitive dyes and combinations of dyes showing supersensitization effect and substances showing supersensitization effect are disclosed in Research Disclosure, vol. 176, Item 17643 (December, 1978), p.23, IV, Section J, JP-B-49-25500, JP-B-43-4933, JP-A-59-19032, JP-A-59-192242, JP-A-62-123454, JP-A-3-15049, JP-A-7-146527 and so forth.

The photothermographic material used for the present invention may contain a mercapto compound, disulfide compound or thione compound with the purposes of controlling the development by inhibiting or accelerating the development, improving spectral sensitization efficiency and improving storage stability before or after the development. As the mercapto compound, those compounds represented by the following formula (10) or (11) are preferred.

Ar—SM Formula (10):

Ar—S—S—Ar Formula (11):

In the formulas, M is a hydrogen atom or an alkali metal atom, and Ar is a heteroaromatic ring or condensed heteroaromatic ring containing one or more nitrogen, sulfur, oxygen, selenium or tellurium atoms.

The heteroaromatic ring represented by Ar is preferably selected from benzimidazole, naphthimidazole, benzothiazole, naphthothiazole, benzoxazole, naphthoxazole, benzoselenazole, benzotellurazole, imidazole, oxazole, pyrazole, triazole, thiadiazole, tetrazole, triazine, pyrimidine, pyridazine, pyrazine, pyridine, purine, quinoline and quinazolinone. The heteroaromatic ring may have one or more substituents selected from, for example, the group consisting of a halogen (e.g., Br, Cl), hydroxy, amino, carboxy, alkyl (e.g., alkyl having one or more carbon atoms, preferably 1-4 carbon atoms) and alkoxy (e.g., alkoxy having one or more carbon atoms, preferably 1-4 carbon atoms).

Examples of Ar—S (mercapto-substituted heteroaromatic compound) in the formulas (10) and (11) include 2-mercaptobenzimidazole, 2-mercaptobenzoxazole, 2-mercapto-benzothiazole, 2-mercapto-5-methylbenzimidazole, 6-ethoxy-2-mercaptobenzothiazole, 2,2'-dithiobis(benzothiazole), 3-mercapto-1,2,4-triazole, 4,5-diphenyl-2-imidazolethiol, 2-mercaptoimidazole, 1-ethyl-2-mercaptobenzimidazole, 2-mercaptoquinoline, 8-mercaptopurine, 2-mercapto-4(3H)-quinazolinone, 7-trifluoromethyl-4-quinolinethiol, 2,3,5,6-tetrachloro-4-pyridinethiol, 4-amino-6-hydroxy-2-mercaptopyrimidine monohydrate, 2-amino-5-mercapto-1,3,4-thiadiazole, 3-amino-5-mercapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole, 2-mercapto-4-phenyloxazole and so forth. The compounds represented by the formula (10) or (11) are preferably added in an amount of from 0.001-1.0 mole, more preferably from 0.01-0.3 mole, per mole of silver in an emulsion layer.

The photothermographic material may to contain a compound showing infrared absorption at a wavelength of 700-900 nm for antihalation purpose. As the infrared absorption compound, there can be used polymethine dyes, squarylium dyes and so forth disclosed in JP-A-59-6481, JP-A-59-182436, U.S. Pat. Nos. 4,271,263, 4,594,312, European Patent Publication Nos. 533,008, 652,473, JP-A-2-216140, JP-A-4-348339, JP-A-7-191432, JP-A-7-301890, JP-A-9-230531, JP-A-10-104779, JP-A-10-104785, International Patent Publication in Japanese (Kohyo) No. 9-509503 and so forth.

Although the layer to which the antihalation dye is added is not particularly limited, it is preferably added to an undercoat layer. It is preferably added to an undercoat layer coated on the image-forming layer side. When the undercoat layer consists of two or more layers, it is desirably added to a layer most close to the image-forming layer. Although its amount varies depending on the desired purpose, it is generally 0.1-1000 $mg/m^2$, preferably 1-200 $mg/m^2$.

The photothermographic material contains a reducing agent for reducing silver ions. As the reducing agent, there are preferably used those disclosed in U.S. Pat. Nos. 3,770,448, 3,773,512, 3,593,863, Research Disclosure Items 17029 and 29963. Specifically, the followings can be mentioned: aminohydroxycycloalkenone compounds (e.g., 2-hydroxypiperidino-2-cyclohexenone); esters of aminoreductones (e.g., piperidinohexose reductone monoacetate) acting as precursors of reducing agent; N-hydroxyurea derivatives (e.g., N-p-methylphenyl-N-hydroxyurea); hydrazones of aldehyde or ketone (e.g., anthracenaldehydephenyl hydrazone), phosphor-amide phenols; phosphor-amidanilines; polyhydroxybenzenes (e.g., hydroquinone, tert-butyl-hydroquinone, isopropylhydroquinone, (2,5-dihydroxy-phenyl) methylsulfone); sulfhydroxamic acids (e.g., benzenesulfhydroxamic acid); sulfonamidanilines (e.g., 4-(N-methanesulfonamido) aniline); 2-tetrazolylthiohydroquinones (e.g., 2-methyl-5-(1-phenyl-5-tetrazolylthio)hydroquinone); tetrahydroquinoxalines (e.g., 1,2,3,4-tetrahydroquinoxaline); amidoxins; combination of azines (e.g., aliphatic carboxylic acid aryl hydrazides) and ascorbic acid; combination of polyhydroxybenzene and hydroxylamine, reductone and/or hydrazine; hydroxamic acids; combinations of azine and sulfonamidephenol; α-cyanophenylacetic acid derivatives; combinations of bis-β-naphthol and 1,3-dihydroxybenzene derivative; 5-pyrazolones; sulfonamidophenol reducing agents; 2-phenylinedan-1,3-diones; chromans; 1,4-dihydroxypyridines (e.g., 2,6-dimethoxy-3,5-dicarboethoxy-1,4-dihydropyridine); bisphenols (e.g., bis(2-hydroxy-3-tert-butyl-5-methylphenyl)methane, bis(6-hydroxy-m-tri) mesitol, 2,2-bis(4-hydroxy-3-methylphenyl)propane, 4,5-ethylidene-bis(2-tert-butyl-6-methyl)phenol); ultraviolet-sensitive ascorbic acid derivatives; and 3-pyrazolidones. Particularly preferred as the reducing agent are hindered phenols.

As hindered phenols used as the reducing agent, compounds represented by the following formula (a) can be mentioned.

Formula (a)

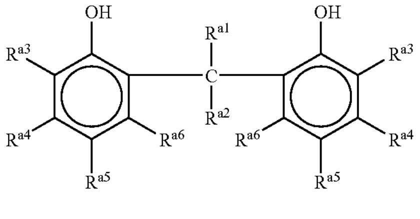

In the formula, $R^{a1}$ and $R^{a2}$ each independently represent a hydrogen atom or an alkyl group having 1-10 carbon atoms (e.g., $—C_4H_9$, 2,4,4-trimethylpentyl), provided that at least one of them is a hydrogen atom. $R^{a3}$ to $R^{a6}$ each independently represent a hydrogen atom or an alkyl group having 1-5 carbon atoms (e.g., methyl, ethyl, tert-butyl), and it is preferred that $R^{a4}$ and $R^{a6}$ should represent a hydrogen atom and $R^{a3}$ and $R^{a5}$ should represent an alkyl group having 1-5 carbon atoms.

Specific examples of the compounds represented by the aforementioned formula (a) (Exemplary Compounds a-1 to a-1) will be shown below. However, the present invention is not limited by these examples at all.

a-1

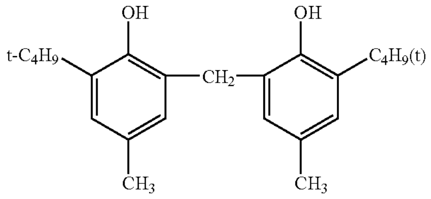

a-2

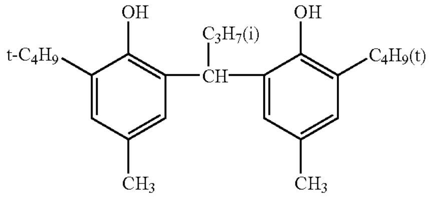

a-3

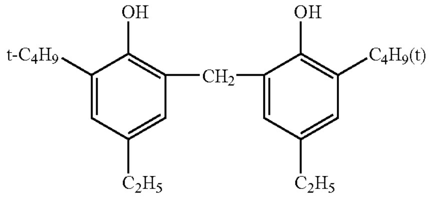

a-4

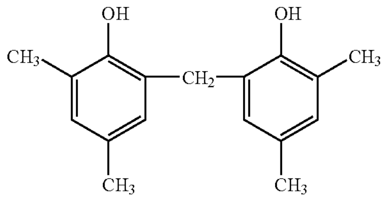

a-5

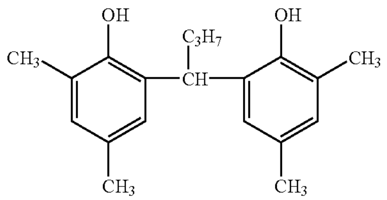

a-6

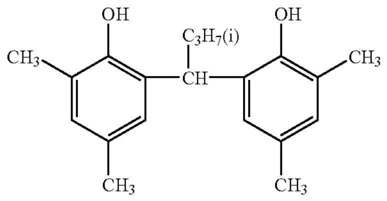

-continued a-7

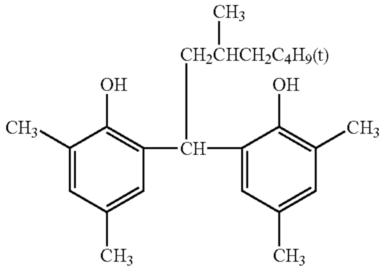

The amount of the reducing agents including the reducing agents represented by the aforementioned formula (a) is preferably $1\times10^{-2}$ to 10 moles, more preferably $1\times10^{-2}$ to 1.5 moles, per mole of silver.

The photothermographic material may contain a high contrast agent. As the high contrast agent, hydrazine derivatives, quaternary ammonium compounds, quaternary phosphonium compounds and the vinyl compound represented by the formula (e) mentioned later are preferred.

As the aforementioned hydrazine derivatives, compounds represented by the following formula (b) are preferred.

Formula (b)

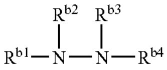

In the formula, $R^{b1}$ represents an aliphaticgroup, aryl group, heterocyclic group or $-G^0-D^0$ group, which each may have one or more substituent, $R^{b4}$ represents a blocking group, and $R^{b2}$ and $R^{b3}$ each represent a hydrogen atom, an acyl group, a sulfonyl group or an oxalyl group, provided that at least one of them is a hydrogen atom.

In the aforementioned formula (b), the aliphatic group represented by $R^{b1}$ is preferably a linear, branched or cyclic alkyl group having 1-30 carbon atoms, in particular, 1-20 carbon atoms, and there can be mentioned, for example, methyl group, ethyl group, tert-butyl group, octyl group, cyclohexyl group, benzyl group and so forth. The aliphatic group may be substituted with one or more suitable substituents (e.g., an aryl group, a heterocyclic group, an alkoxy group, an aryloxy group, an alkylthio group, an arylthio group, a sulfoxy group, a sulfonamido group, a sulfamoyl group, an acylamino group, a ureido group etc.).

In the aforementioned formula (b), the aryl group represented by $R^{b1}$ includes both of a monocyclic group and a group having two or more condensed rings, and may have one or more substituents (e.g., an alkyl group, a heterocyclic group, an alkoxy group, an aryloxy group, an alkylthio group, an arylthio group, a sulfoxy group, a sulfonamido group, a sulfamoyl group, an acylamino group, a ureido group etc.). Specifically, a phenyl group or a naphthyl group is preferred.

In the aforementioned formula (b), the heterocyclic group represented by $R^{b1}$ includes both of a monocyclic group and a group having two or more condensed rings, and may have one or more substituents (e.g., an alkyl group, an aryl group, an alkoxy group, an aryloxy group, an alkylthio group, an arylthio group, a sulfoxy group, a sulfonamido group, a sulfamoyl group, an acylamino group, a ureido group etc.). The heterocyclic ring is preferably a heterocyclic ring containing at least one hetero atom selected from nitrogen, sulfur and oxygen atoms, and examples thereof include, for example, pyrrolidine ring, imidazole ring, tetrahydrofuran ring, morpholine ring, pyridine ring, pyrimidine ring, quinoline ring, thiazole ring, benzothiazole ring, thiophene ring and furan ring.

In the aforementioned formula (b), when $R^{b1}$ represents a $-G^0-D^0$ group, $G^0$ represents —CO— group, —COCO— group, —CS— group, $—C(=N-G^1D^1)-$ group, —SO— group, $—SO_2—$ group or $—P(O)(G^1-D^1)-$ group. $G^1$ represents a simple bond, —O— group, —S— group or $—N(D^1)-$ group, and $D^1$ represents an aliphatic group, an aromatic group, a heterocyclic group or a hydrogen atom. When two or more $D^1$ exist in the molecule, they may be identical to or different from each other or one another. $D^0$ represents a hydrogen atom, an aliphatic group, an aromatic group, a heterocyclic group, an amino group, an alkoxy group, an aryloxy group, an alkylthio group or an arylthio group. Preferred as $D^0$ are a hydrogen atom, an alkyl group, an alkoxy group, an amino group and so forth. The $-G^0-D^0$ group may have one or more substituents.

Particularly preferred as $R^{b1}$ is an aryl group or a $-G^0-D^0$ group.

Further, in the formula (b), $R^{b1}$ preferably contains at least one non-diffusion group or silver halide adsorption group. Preferred as the non-diffusion group is a ballast group commonly used in immobile photographic additives such as couplers. Examples of the ballast group include an alkyl group, an alkenyl group, an alkynyl group, an alkoxy group, a phenyl group, a phenoxy group, an alkylphenoxy group and so forth, which are photographically inert, and the total carbon number of the substituent moiety is preferably 8 or more. Examples of the silver halide adsorption group include a thiourea group, a thiourethane group, a mercapto group, a thio ether group, a thione group, a heterocyclic group, a thioamidoheterocyclic group, a mercaptoheterocyclic group, adsorption groups disclosed in JP-A-64-90439 and so forth.

In the aforementioned formula (b), preferred as the blocking group represented by $R^{b4}$is a $-G^0-D^0$ group. $G^0$ represents —CO— group, —COCO— group, —CS— group, $—C(=NG^1D^1)-$ group, —SO— group, $—SO_2—$ group or $—P(O)(G^1D^1)-$ group, and preferred as $G^0$ are —CO— group and —COCO— group. $G^1$ represents a simple bond, —O— group, —S— group or $—N(D^1)-$ group, and $D^1$ represents an aliphatic group, an aromatic group, a heterocyclic group or a hydrogen atom. When two or more of $D^1$ exist in the molecule, they are identical to or different from each other or one another. $D^0$ represents a hydrogen atom, an aliphatic group, an aromatic group, a heterocyclic group, an amino group, an alkoxy group, an aryloxy group, an alkylthio group or an arylthio group, and preferred as $D^0$ are a hydrogen atom, an alkyl group, an alkoxy group, an amino group and so forth.

In the aforementioned formula (b), the acyl group represented by $R^{b2}$ or $R^{b3}$ may be acetyl group, trifluoroacetyl group, benzoyl group or the like. Examples of the sulfonyl group include methanesulfonyl group, toluenesulfonyl group etc., and examples of the oxalyl group include ethoxalyl group etc.

Specific examples of the compounds represented by the formulas (b) (b-1 to b-30) will be shown below. However, the present invention is not limited by these examples at all.

b-1
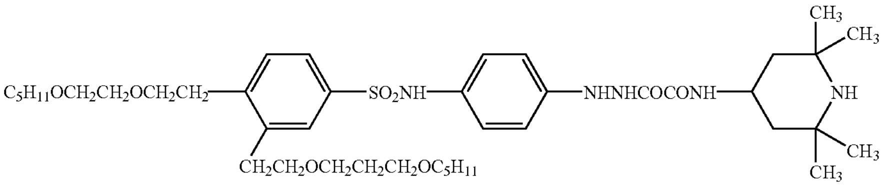
b-2
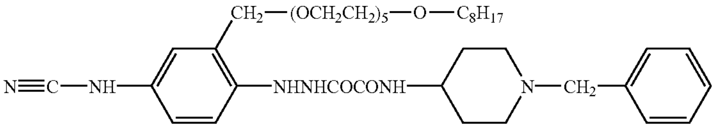
b-3
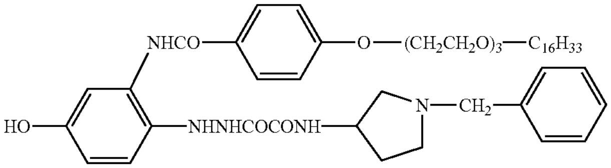
b-4
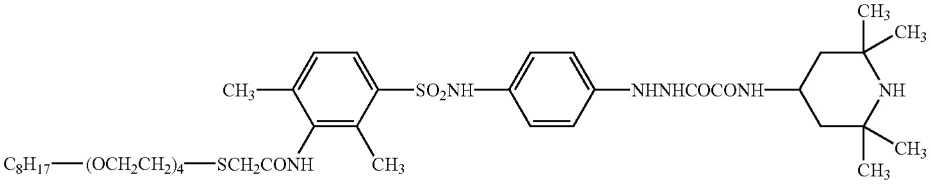
b-5
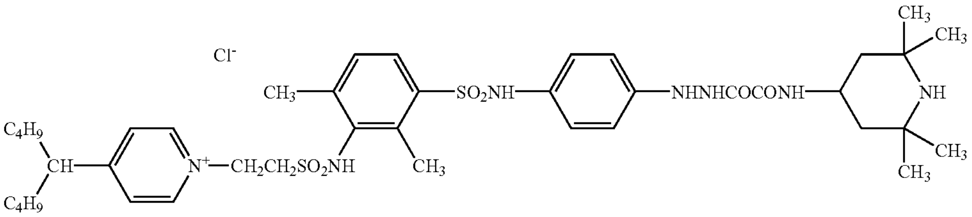
b-6
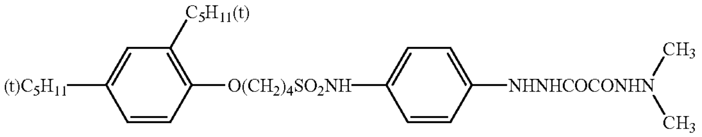
b-7
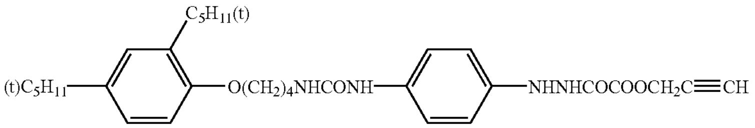
b-8
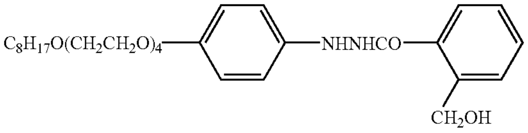
b-9
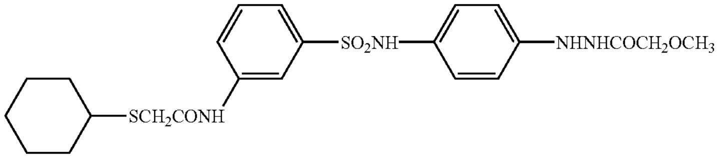

-continued
b-10
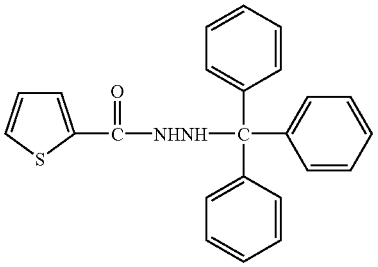
b-11
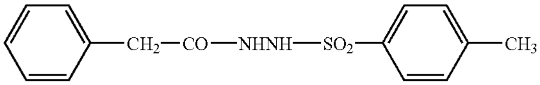
b-12
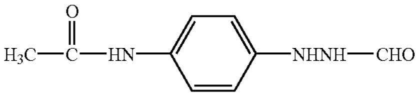
b-13
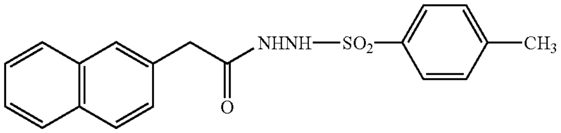
b-14
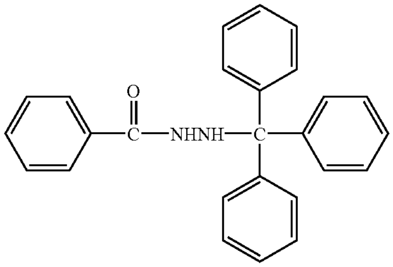
b-15
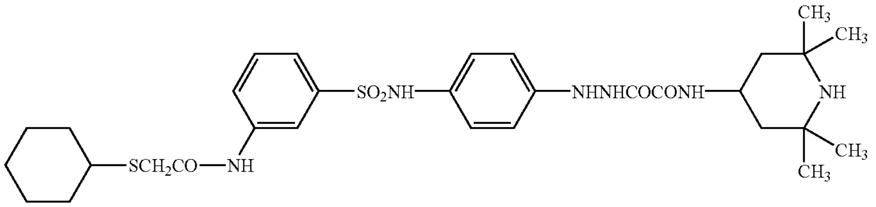
b-16
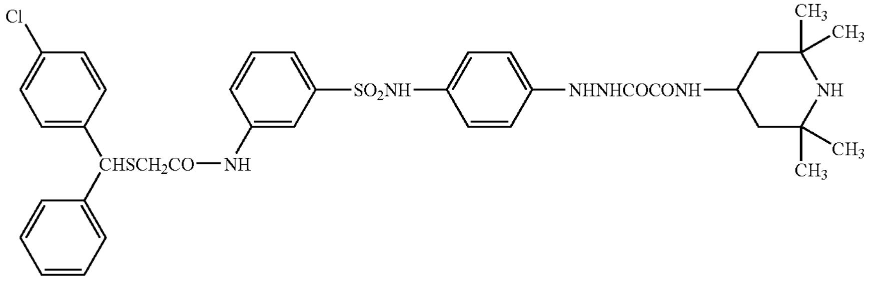
b-17
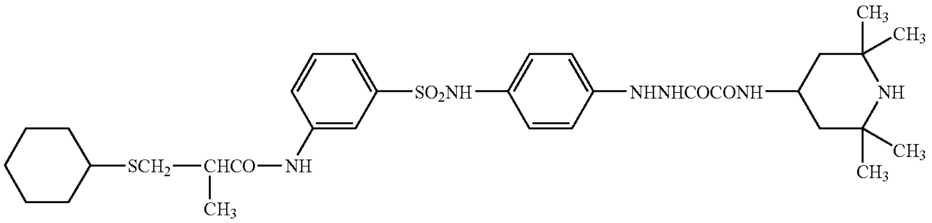

-continued
b-18
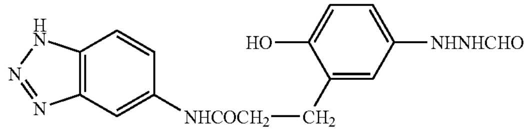
b-19
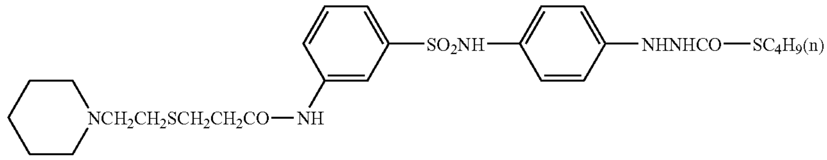
b-20
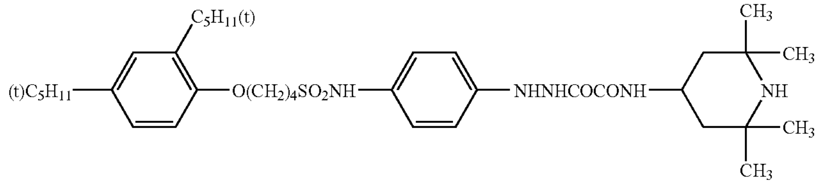
b-21
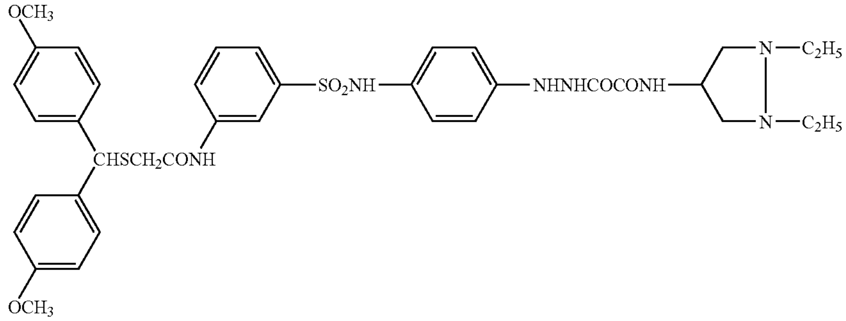
b-22
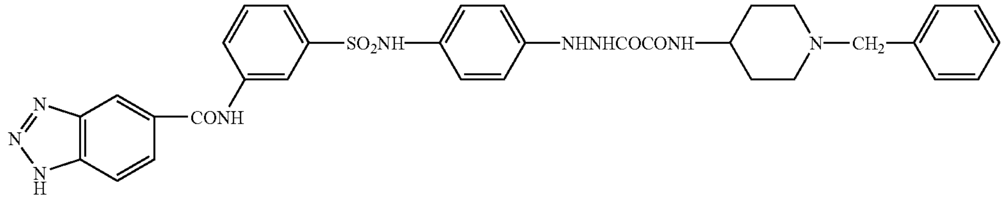
b-23
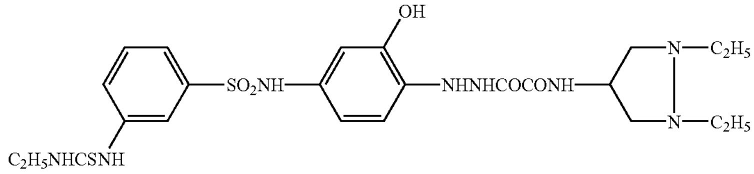
b-24
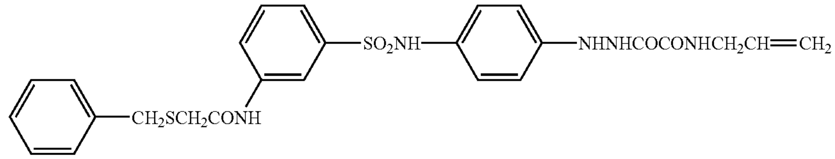
b-25
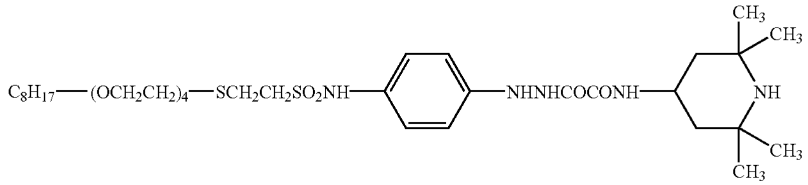

-continued b-26

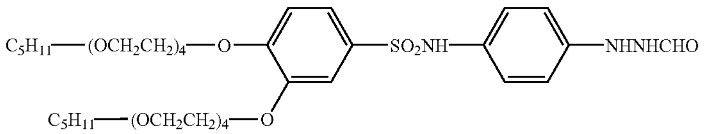

b-27

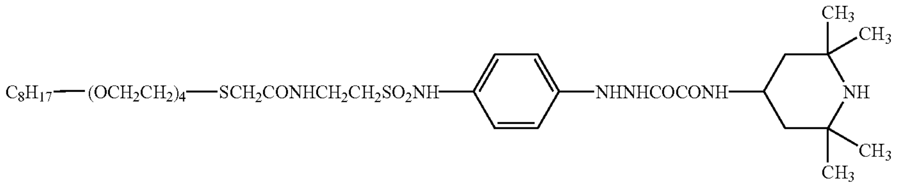

b-28

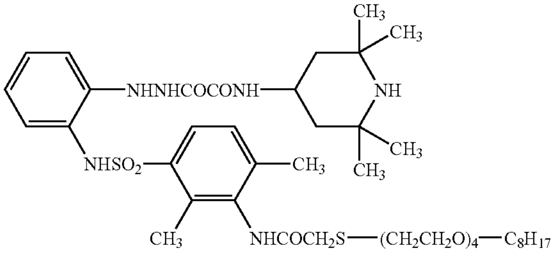

b-29

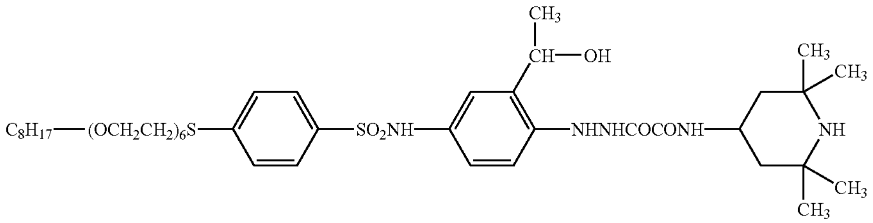

b-30

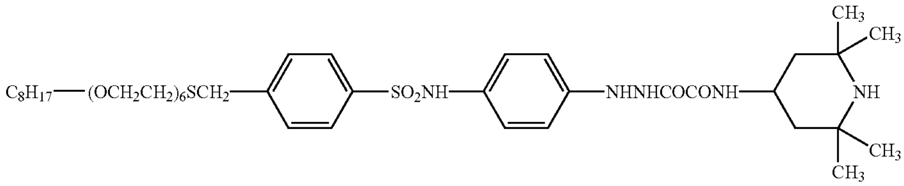

Other hydrazine derivatives that can be preferably used are Compounds H-1 to H-29 disclosed in U.S. Pat. No. 5,545,505, column 11 to column 20 and Compounds 1-12 disclosed in U.S. Pat. No. 5,464,738, column 9 to column 11. These hydrazine derivatives can be synthesized by a known method.

The aforementioned hydrazine derivatives are added to a photosensitive layer containing a silver halide and/or a layer adjacent to the photosensitive layer. Further, as for the amount to be added, although optimum amount may vary depending on grain size, halogen composition, degree of chemical sensitization, type of inhibitor of the silver halide grains and so forth, it is preferably about $10^{-6}$ to $10^{-1}$ mole, particularly preferably about $10^{-5}$ to $10^{-2}$ mole, per one mole of silver halide.

As the quaternary ammonium compounds and the quaternary phosphonium compounds preferably used as the high contrast agent, compounds represented by following formula (c) or (c)' are preferably used.

Formula (c)

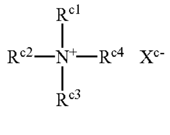

Formula (c)'

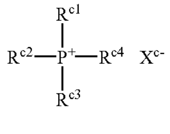

In the aforementioned formulas (c) and (c)', $R^{c1}$, $R^{c2}$, $R^{c3}$ and $R^{c4}$ each independently represent a hydrogen atom or a substituent, and $X^{c-}$ represents an anion. In addition, $R^{c1}$ to $R^{c4}$ may bond to each other to form a ring.

These compounds preferably have a non-diffusion group or a silver halide adsorption group in the molecule. In order to have non-diffusion property, the compounds preferably have a molecular weight of 100 or more, more preferably 300 or more. The non-diffusion group has the same meaning as the non-diffusion group contained in $R^{b1}$ in the aforementioned formula (b), and similar groups can be mentioned as specific examples thereof. Further, preferred silver halide adsorption groups are a heterocyclic group, a mercapto group, a thioether group, a thione group, a thiourea group and so forth.

In the aforementioned formulas (c) and (c)', the substituents represented by any one of $R^{c1}$ to $R^{c4}$ may be an alkyl group (methyl group, ethyl group, propyl group, butyl group, hexyl group, cyclohexyl group etc.), an alkenyl group (allyl group, butenyl group etc.), an alkynyl group (propargyl group, butynyl group etc.), an aryl group (phenyl group, naphthyl group etc.), a heterocyclic group (piperidinyl group, piperazinyl group, morpholinyl group, pyridyl group, furyl group, thienyl group, tetrahydrofuryl group, tetrahydrothienyl group, sulfolanyl group etc.), an amino group and so forth.

Examples of the ring formed by $R^{c1}$ to $R^{c4}$ bonded to each other are piperidine ring, morpholine ring, piperazine ring, quinuclidine ring, pyridine ring, pyrrole ring, imidazole ring, triazole ring, tetrazole ring and so forth.

$R^{c1}$ to $R^{c4}$ may be further substituted with one or more other substituents, and examples of the substituents include a hydroxyl group, an alkoxy group, anaryloxy group, a carboxyl group, a sulfo group, an alkyl group, an aryl group and so forth.

$R^{c1}$ to $R^{c4}$ each preferably represent a hydrogen atom or an alkyl group.

The anion represented by $X^{c-}$ may be an inorganic or organic anion such as a halide ion, a sulfate ion, a nitrate ion, an acetate ion and a p-toluenesulfonate ion.

Further preferred compounds are compounds represented by the following formula (c-1), (c-2) or (c-3) and compounds represented by the following formula (d).

Formula (c-1)

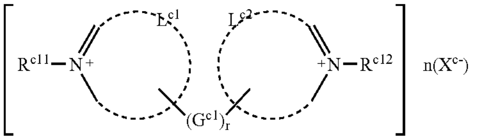

Formula (c-2)

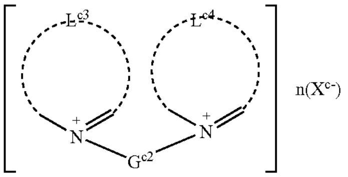

Formula (c-3)

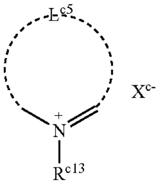

In the aforementioned formula (c-1), $L^{c1}$ and $L^{c2}$ each independently represent a nonmetallic atom group for completing a nitrogen-containing heterocyclic ring. The nitrogen-containing heterocyclic ring may contain an oxygen atom, another nitrogen atom or a sulfur atom, and may be condensed with a benzene ring. The heterocyclic rings constituted by $L^{c1}$ and $L^{c2}$ may have one or more substituents, and they may be identical to or different from each other. Examples of the substituents include an alkyl group, an aryl group, an aralkyl group, an alkenyl group, an alkynyl group, a halogen atom, an acyl group, an alkoxycarbonyl group, an aryloxycarbonyl group, a sulfo group, a carboxy group, a hydroxyl group, an alkoxy group, an aryloxy group, an amido group, a sulfamoyl group, a carbamoyl group, a ureido group, an amino group, a sulfonamido group, a sulfonyl group, a cyano group, a nitro group, a mercapto group, an alkylthio group and an arylthio group. Preferred examples of the nitrogen-containing heterocyclic ring completed by $L^{c1}$ or $L^{c2}$ include a 5- or 6-membered ring (rings of pyridine, imidazole, thiozole, oxazole, pyrazine, pyrimidine etc.), and a pyridine ring is mentioned as a still more preferred example.

In the aforementioned formula (c-1), $G^{c1}$ represents a divalent bridging group, and r represents 0 or 1. The divalent bridging group represented by $G^{c1}$ represents each of an alkylene group, an arylene group, an alkenylene group, $—SO_2—$, $—SO—$, $—O—$, $—S—$, $—CO—$, $—N(R^c)—$ ($R^c$ represents an alkyl group, an aryl group or a hydrogen atom) or a combination thereof. $G^{c1}$ is preferably an alkylene group or an alkenylene group.

In the aforementioned formula (c-1), $R^{c11}$ and $R^{c12}$ each independently represent an alkyl group having 1-20 carbon atoms, and $R^{c11}$ and $R^{c12}$ may be identical to or different from each other. The alkyl group includes an alkyl group having one or more substituents and an unsubstituted alkyl group, and examples of the substituents are similar to those mentioned as substituents of $L^{c1}$ and $L^{c2}$. A preferred example of $R^{c11}$ and $R^{c12}$ is an alkyl group having 4-10 carbon atoms, and a further preferred example is a substituted or unsubstituted aryl-substituted alkyl group.

In the aforementioned formula (c-1), $X^{c-}$ represents a counter ion required to offset charge of the whole molecule, and represents, for example, chloride ion, bromide ion, iodide ion, nitrate ion, sulfate ion, p-toluenesulfonate ion, oxalate ion or the like. n represents a number of the counter ion required to offset the charge of the whole molecule, and in the case of an intramolecular salt, n is 0.

In the aforementioned formula (c-2), $L^{c3}$ and $L^{c4}$ each independently represent a nonmetallic atom group for completing anitrogen-containing heterocyclic ring. $L^{c3}$ and $L^{c4}$ have the same meanings as $L^{c1}$ and $L^{c2}$ in the aforementioned formula (c-1), and similar groups and scope can be mentioned as specific examples and preferred scope thereof. In the aforementioned formula (c-2), $G^{c2}$represents a divalent bridging group. $G^{c2}$has the same meaning as $G^{c1}$ in the aforementioned formula (c-1), and similar groups and scope can be mentioned as specific examples and preferred scope thereof. In the aforementioned formula (c-2), $X^{c-}$ represents a counter ion required to offset charge of the whole molecule. n represents a number of the counter ion required to offset the charge of the whole molecule, and in the case of an intramolecular salt, n is 0. $X^{c-}$ has the same meaning as $X^{c-}$ in the aforementioned formula (c-1), and similar ions can be mentioned as specific examples thereof.

In the aforementioned formula (c-3), $L^{c5}$ represents a nonmetallic atom group for completing a nitrogen-containing heterocyclic ring. $L^{c5}$ has the same meaning as $L^{c1}$ and $L^{c2}$ in the aforementioned formula (c-1), and similar groups and scope can be mentioned as specific examples and preferred scope thereof. In the aforementioned formula (c-3), $X^{c-}$ represents a counter ion required to offset charge of the whole molecule, n represents a number of the counter ion required to offset the charge of the whole molecule, and in the case of an intramolecular salt, n represents 0. $X^{c-}$ has the same meaning as $X^{c-}$ in the aforementioned formula (c-1), and similar ions can be mentioned as specific examples thereof.

Formula (d)

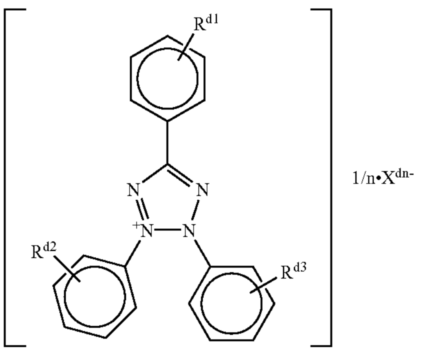

In the aforementioned formula (d), $R^{d1}$, $R^{d2}$ and $R^{d3}$ represent a hydrogen atom or a substituent. Preferred as the substituent are those showing a negative value as the Hammett's sigma value (sP). The Hammett's sigma values of groups on phenyl group can be seen in many references, for example, C. Hansch, Journal of Medical Chemistry, vol. 20, p.304, 1977, in which mentioned as particularly preferred groups having a negative sigma value are, for example, methyl group (sP=−0.17, all the values mentioned hereafter are sP values), ethyl group (−0.15), cyclopropyl group (−0.21), n-propyl group (−0.13), isopropyl group (−0.15), cyclobutyl group (−0.15), n-butyl group (−0.16), isobutyl group (−0.20), n-pentyl group (−0.15), cyclohexyl group (−0.22), amino group (−0.66), acetylamino group (−0.15), hydroxyl group (−0.37), methoxy group (−0.27), ethoxy group (−0.24), propoxy group (−0.25), butoxy group (−0.32), pentoxy group (−0.34) etc. All of these are useful as $R^{d1}$, $R^{d2}$ and $R^{d3}$ in the aforementioned formula (d).

n represents 1 or 2. Examples of the anion represented by $X^{d\,n-}$ include, for example, halide ions such as chloride ion, bromide ion and iodide ion, acid radicals of inorganic acid such as nitric acid, sulfuric acid and perchloric acid, acid radicals of organic acid such as sulfonic acid and carboxylic acid, anionic activators, specifically, lower alkylbenzenesulfonate anions such as p-toluenesulfonate anion, higher alkylbenzenesulfonate anions such as p-dodecylbenzenesulfonate anion, higher alkyl sulfuric acid ester anions such as lauryl sulfate anion, borate type anions such as tetraphenylboron, dialkyl sulfosuccinate anions such as di-2-ethylhexyl sulfosuccinate anion, higher fatty acid anions such as cetyl polyethenoxysulfate anion, polymers attached with acid radicals such as polyacrylic acid anion and so forth.

Specific examples of the quaternary ammonium compounds and the quaternary phosphonium compounds are mentioned below. However, the present invention is not limited by the following specific examples at all.

c-1

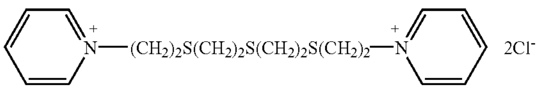

c-2

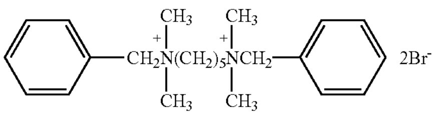

c-3

$(CH_3)_3\overset{+}{N}(CH_2)_2SS(CH_2)_2\overset{+}{N}(CH_3)_3$ 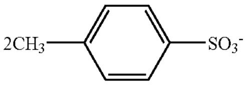

c-4

$(CH_3)_3\overset{+}{N}(CH_2)_2S(CH_2)_2S(CH_2)_2S(CH_2)_2\overset{+}{N}(CH_3)_3$ 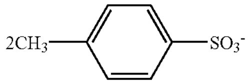

c-5

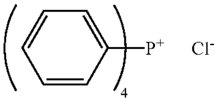

c-6

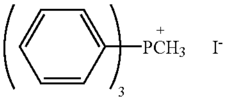

c-7

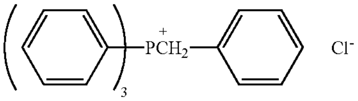

c-8

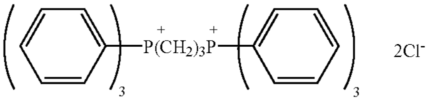

c-9

$(C_4H_9)_3\overset{+}{P}C_{16}H_{33}$ $Br^-$ c-10

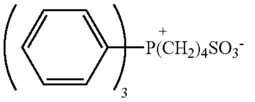

c-11

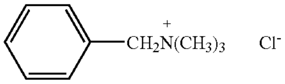

c-12

$C_{16}H_{33}\overset{+}{N}(CH_3)_3$ $Br^-$ c-13

$\overset{+}{N}(C_4H_9)_4$ $Cl^-$ c-14

$(CH_3)_3\overset{+}{N}CH_2CH_2OH$ $Cl^-$

-continued
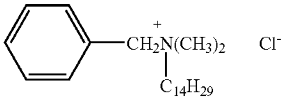
c-15
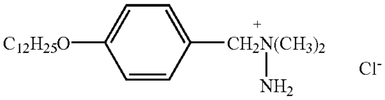
c-16
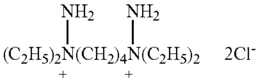
c-17
$(C_4H_9)_3\overset{+}{N}CH_2CH_2\overset{+}{N}(C_4H_9)_3 \quad SO_4^{2-}$
c-18
$(C_2H_5)_3\overset{+}{N}(CH_2)_8\overset{+}{N}(C_2H_5)_3 \quad 2Cl^-$
c-19
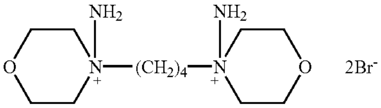
c-20
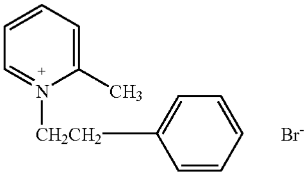
c-21
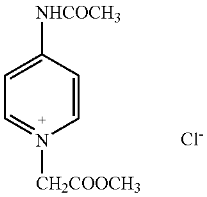
c-22
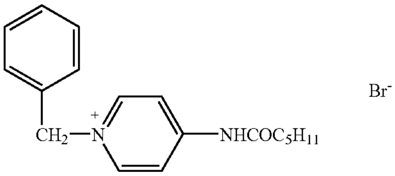
c-23
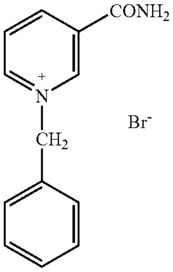
c-24
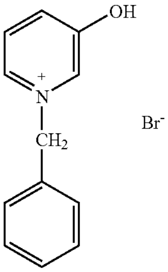
c-25
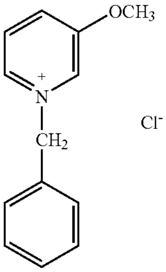
c-26
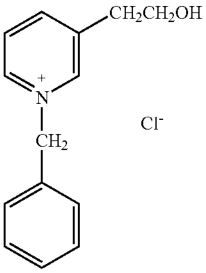
c-27
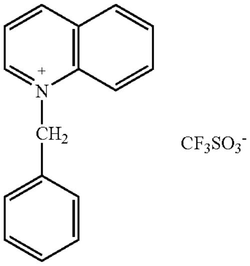
c-28

-continued
c-29
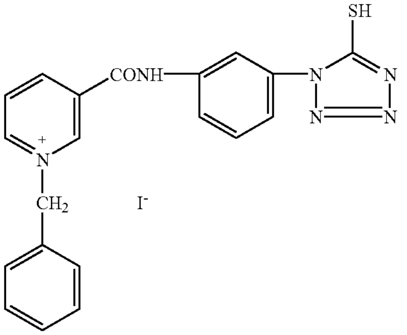
c-30
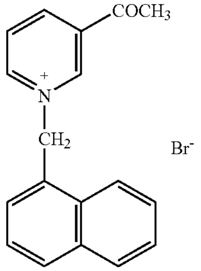
c-31
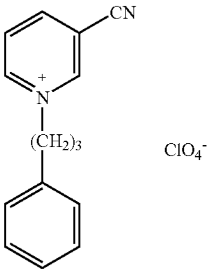
c-32
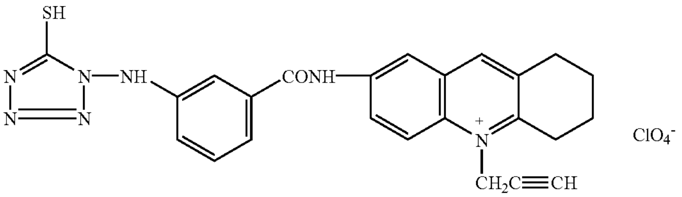
c-33
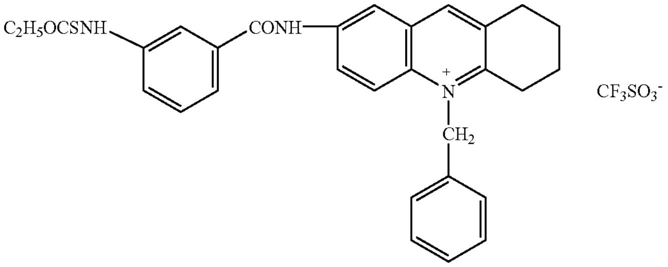
c-34
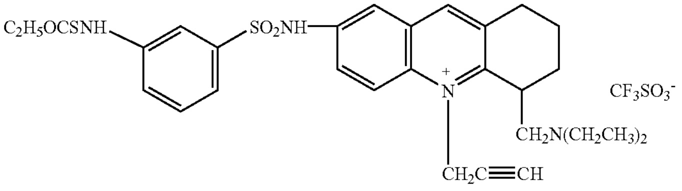
c-35
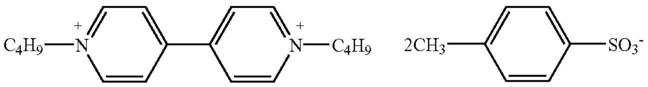
c-36
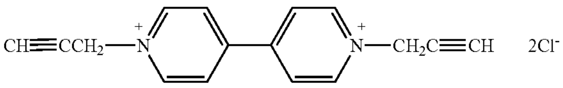
c-37
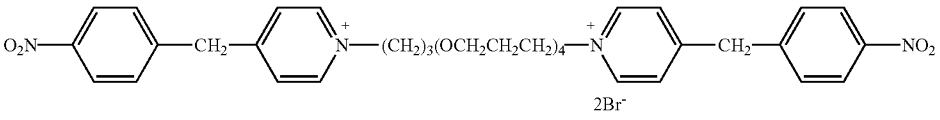

-continued
c-38
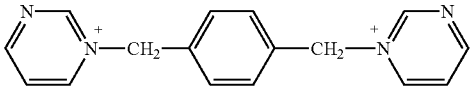
$2Cl^-$
c-39
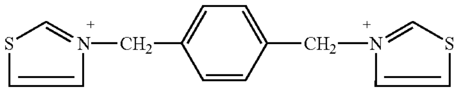
$2Cl^-$
c-40
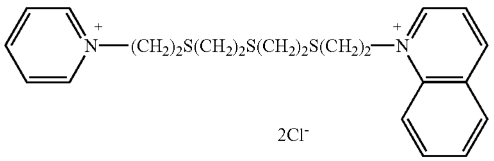
$2Cl^-$
c-41
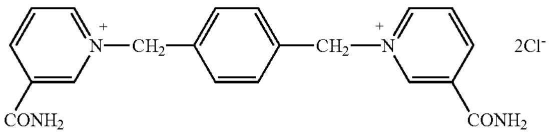
$2Cl^-$
c-42
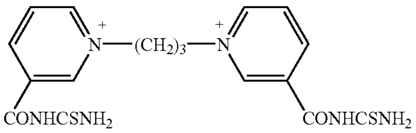
$2Cl^-$
c-43
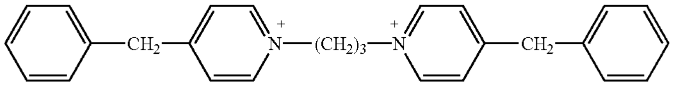
$2Cl^-$
c-44
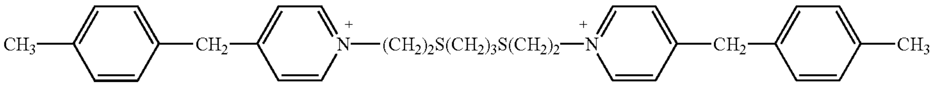
$2Cl^-$
c-45
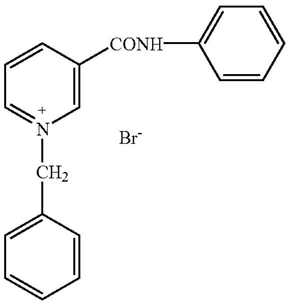
$Br^-$
c-46
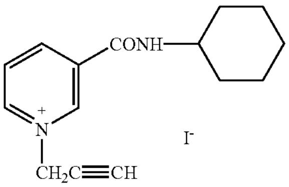
$I^-$
c-47
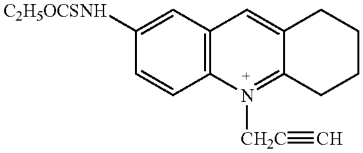
$CF_3SO_3^-$
c-48
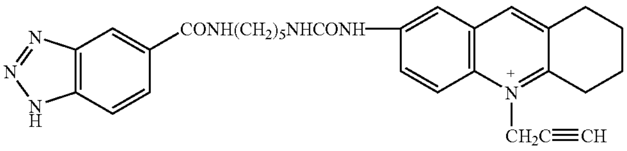
$CF_3SO_3^-$
c-49
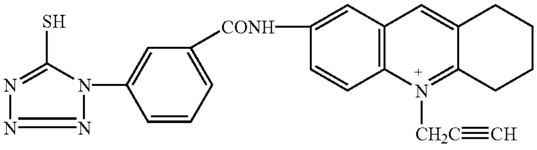
$ClO_4^-$ -continued c-50

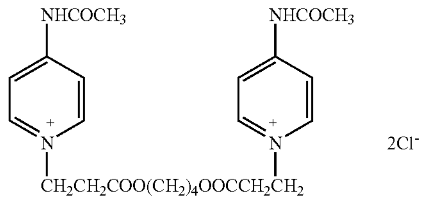

c-51

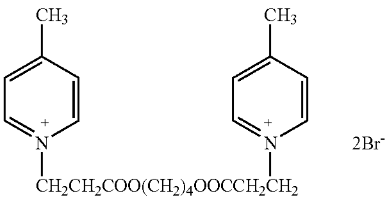

c-52

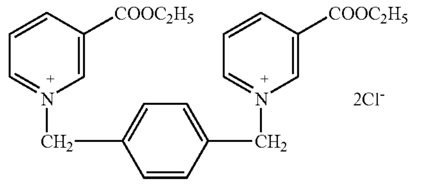

c-53

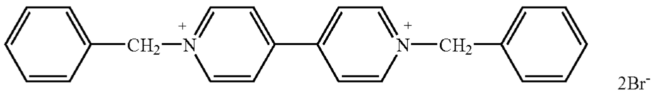

c-54

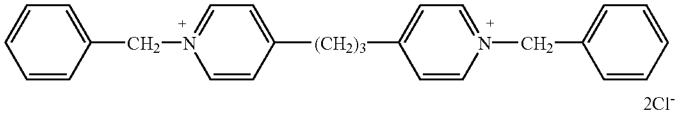

c-55

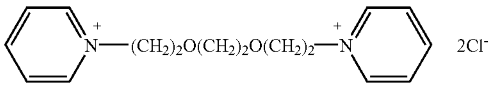

Formula (d)

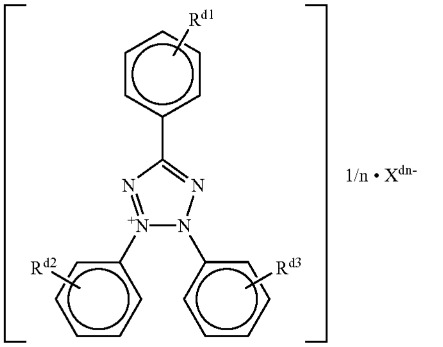

| No. | $R^{d1}$ | $R^{d2}$ | $R^{d3}$ | $X^{dn-}$ |
|---|---|---|---|---|
| d-1 | H | H | (p)$CH_3$ | $Cl^-$ |
| d-2 | H | (p)$CH_3$ | (p)$CH_3$ | $Cl^-$ |
| d-3 | (p)$CH_3$ | (p)$CH_3$ | (p)$CH_3$ | $Cl^-$ |
| d-4 | (p)$CH_3$ | H | (p)$CH_3$ | $Cl^-$ |
| d-5 | (p)$CH_3$ | (p)$OCH_3$ | (p)$CH_3$ | $Cl^-$ |
| d-6 | H | (p)$OCH_3$ | (p)$CH_3$ | $Cl^-$ |
| d-7 | H | (p)$OCH_3$ | (p)$OCH_3$ | $Cl^-$ |
| d-8 | H | (m)$C_2H_5$ | (m)$C_2H_5$ | $Cl^-$ |
| d-9 | (p)$C_2H_5$ | (p)$C_2H_5$ | (p)$C_2H_5$ | $Cl^-$ |
| d-10 | H | (p)$C_3H_7$ | (p)$C_3H_7$ | $Cl^-$ |
| d-11 | H | (p)iso$C_3H_7$ | (p)iso$C_3H_7$ | $Cl^-$ |
| d-12 | H | (p)$OC_2H_5$ | (p)$OC_2H_5$ | $Cl^-$ |
| d-13 | H | (p)$OCH_3$ | (p)iso$C_3H_7$ | $Cl^-$ |
| d-14 | H | H | (p)n$C_{12}H_{25}$ | $Cl^-$ |
| d-15 | H | (p)n$C_{12}H_{25}$ | (p)n$C_{12}H_{25}$ | $Cl^-$ |
| d-16 | (p)$NH_2$ | H | H | $Cl^-$ |
| d-17 | H | (p)$NH_2$ | H | $Cl^-$ |
| d-18 | H | (p)$CH_3$ | (p)$CH_3$ | $ClO_4^-$ |

Parenthesized alphabets indicate substitution positions.

The aforementioned quaternary ammonium compounds and quaternary phosphonium compounds can be easily synthesized by a known method. For example, the aforementioned tetrazolium compounds can be synthesized by referring to the method described in Chemical Reviews, 55, pp.335-483.

The amount of these quaternary ammonium compounds and the quaternary phosphonium compounds is preferably about $1\times10^{-8}$ to 1 mole, more preferably about $1\times10^{-7}$ to $1\times10^{-1}$ mole, per mole of silver halide. They can be added into the photosensitive material at the arbitrary stage from the time of the formation of silver halide grains to the coating.

The quaternary ammonium compounds and the quaternary phosphonium compounds may be used each alone or two or more kinds of them may be used in combination. Further, although they may be added to any layer among layers constituting the photosensitive material, they are preferably added to at least one layer among layers on the image-forming layer side constituting the photosensitive material, more preferably the image-forming layer and/or a layer adjacent thereto.

The vinyl compounds represented by the formula (e) preferably used as a high contrast agent will be explained hereafter.

Formula (e)

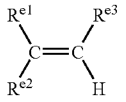

In the aforementioned formula (e), although $R^{e1}$ and $R^{e3}$ are shown in the cis-configuration for convenience, the trans-configuration is also included in the scope of the aforementioned formula (e), and the same shall apply to the structural formulas of specific compounds.

In the aforementioned formula (e), $R^{e1}$ represents an electron-withdrawing group, and $R^{e2}$ represents a hydrogen atom, an alkyl group, an alkenyl group, an alkynyl group, an aryl group, a heterocyclic group, a halogen atom, an acyl group, a thioacyl group, an oxalyl group, an oxyoxalyl group, a thiooxalyl group, an oxamoyl group, an oxycarbonyl group, a —S-carbonyl group, a carbamoyl group, a thiocarbamoyl group, a sulfonyl group, a sulfinyl group, an oxysulfonyl group, a thiosulfonyl group, a sulfamoyl group, an oxysulfinyl group, a thiosulfinyl group, a sulfinamoyl group, a phosphoyl group, a nitro group, an imino group, N-carbonylimino group, N-sulfonylimino group, a dicyanoethylene group, an ammonium group, a sulfonium group, a phosphonium group, a pyrylium group or an immonium group. $R^{e3}$ represents a halogen atom, an oxy group, a thio group or an amino group.

The "electron-withdrawing group" represented by $R^{e1}$ means a substituent that can have a Hammett's substituent constant σp of a positive value, but cyano group itself is excluded. Specific examples of the electron-withdrawing group include a substituted alkyl group (e.g., a halogenated alkyl group etc.), a substituted alkenyl group (e.g., cyanovinyl group etc.), a substituted or unsubstituted alkynyl group (e.g., a trifluoromethylacetylenyl group, cyanoacetylenyl group etc.), a substituted aryl group (e.g., cyanophenyl group etc.), a substituted or unsubstituted heterocyclic group (e.g., pyridyl group, triazinyl group, benzoxazolyl group etc.), a halogen atom, an acyl group (e.g., an acetyl group, trifluoroacetyl group, formyl group etc.), a thioacyl group (e.g., thioformyl group, thioacetyl group etc.), an oxalyl group (e.g., methyloxalyl group etc.), an oxyoxalyl group (e.g., ethoxalyl group), a thiooxalyl group (e.g., ethylthiooxalyl group etc.), an oxamoyl group (e.g., methyloxamoyl group etc.), an oxycarbonyl group (e.g., an ethoxycarbonyl group, carboxyl group etc.), a thiocarbonyl group (e.g., ethylthiocarbonyl group etc.), a carbamoyl group, a thiocarbamoyl group, a sulfonyl group, a sulfinyl group, an oxysulfonyl group (e.g., ethoxysulfonyl group), a thiosulfonyl group (e.g., ethylthiosulfonyl group), a sulfamoyl group, an oxysulfinyl group (e.g., methoxysulfinyl group), a thiosulfinyl group (e.g., methylthiosulfinyl group etc.), a sulfinamoyl group, a phosphoryl group, a nitro group, an imino group, an N-carbonylimino group (eg., N-acetylimino group etc.), an N-sulfonylimino group (e.g., N-methanesulfonylimino group etc.), $—CH{=}C(CN)_2$ group, an ammonium group, a sulfonium group, a phosphonium group, a pyrylium group, an immonium group and so forth as well as those in a form of a heterocyclic ring where an ammonium group, sulfonium group, phosphonium group or the like forms a ring. Those having a σp value of 0.3 or more are preferred.

$R^{e2}$ may be a hydrogen atom, an alkyl group (e.g., methyl group, ethyl group, trifulioromethyl group etc.), an alkenyl group (e.g., vinyl group, halogenated vinyl group, cyanovinyl group etc.), an alkynyl group (e.g., acetylenyl group, cyanoacetylenyl group etc.), an aryl group (e.g., nitrophenyl group, cyanophenyl group, pentafluorophenyl group etc.), or a heterocyclic group (e.g., pyridyl group, pyrimidyl group, triazinyl group, succinimido group, tetrazolyl group, triazolyl group, imidazolyl group, benzoxazolyl group etc.). Further, it may also be any of the groups specifically mentioned above as the groups represented by X, that is, a halogen atom, an acyl group, a thioacyl group, an oxalyl group, an oxyoxalyl group, a thiooxalyl group, an oxamoyl group, an oxycarbonyl group, a thiocarbonyl group, a carbamoyl group, a thiocarbamoyl group, a sulfonyl group, a sulfinyl group, an oxysulfonyl group, a thiosulfonyl group, a sulfamoyl group, an oxysulfinyl group, a thiosulfinyl group, a sulfinamoyl group, a phosphoyl group, a nitro group, an imino group, an N-carbonylimino group, an N-sulfonylimino group, a dicyanoethylene group, an ammonium group, a sulfonium group, a phosphonium group, a pyrylium group, an immonium group and so forth.

$R^{e2}$ is preferably an electron-withdrawing group that can have a Hammett's substituent constant σp of a positive value, more preferably one having a σp value of 0.30 or more.

$R^{e3}$ may be a halogen atom, an oxy group (e.g., hydroxy group (including an organic or inorganic salt thereof), an alkoxy group, an aryloxy group, a heterocyclyloxy group, an acyloxy group, an alkenyloxy group, an alkynyloxy group, an alkoxycarbonyloxy group, an aminocarbonyloxy group etc.), a thio group (e.g., a mercapto group (including an organic or inorganic salt thereof), an alkylthio group, an arylthio group, a heterocyclylthio group, an alkenylthio group, an alkynylthio group, an acylthio group, an alkoxycarbonylthio group, an aminocarbonylthio group etc.), an amino group (e.g., amino group, an alkylamino group, an arylamino group, an acylamino group, an oxycarbonylamino group, a ureido group, a sulfonamido group etc.) or the like.

$R^{e3}$ is preferably a hydroxy group, a mercapto group, an alkoxy group, an alkylthio group, a halogen atom, a hydroxy group, or an organic salt or inorganic salt of hydroxy group or mercapto group, more preferably a hydroxy group, an alkoxy group or an organic salt or inorganic salt of hydroxy group, further preferably a hydroxy group or an organic salt or inorganic salt of hydroxy group.

Further, compounds containing a thioether group in the substituents represented by each of $R^{e1}$ and $R^{e2}$ are preferred.

Specific examples of the vinyl compounds represented by the aforementioned formula (e) are shown below.

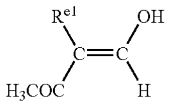

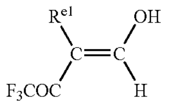

| No. | $—R^{e1}$ | No. | $—R^{e1}$ |
|---|---|---|---|
| 1e-1 | $—COOC_2H_5$ | 2e-1 | $—COOC_2H_5$ |
| 1e-2 | $—COCOOC_2H_5$ | 2e-2 | $—COCOOC_2H_5$ |
| 1e-3 | $—COCF_3$ | 2e-3 | $—COCF_3$ |
| 1e-4 | $—SO_2CH_3$ | 2e-4 | $—SO_2CH_3$ |
| 1e-5 | —CHO | | |
| 1e-6 | $—COCH_3$ | | |

-continued

| | | | |
|---|---|---|---|
| 1e-7 | —$SO_2CF_3$ | 2e-5 | —$SO_2CF_3$ |
| 1e-8 | 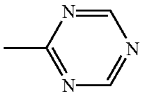 | 2e-6 | 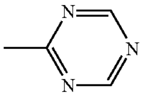 |
| 1e-9 | —$COOC_2H_4SCH_3$ | 2e-7 | —$COOC_2H_4SCH_3$ |
| 1e-10 | —$COCOOC_2H_4SCH_3$ | 2e-8 | —$COCOOC_2H_4SCH_3$ |
| 1e-11 | —$COCONHC_2H_4SCH_3$ | 2e-9 | —$COCONHC_2H_4SCH_3$ |

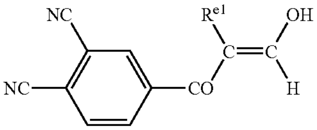

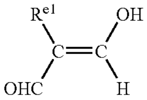

| No. | —$R^{e1}$ | No. | —$R^{e1}$ |
|---|---|---|---|
| 3e-1 | —$COOC_2H_5$ | 4e-1 | —$COOC_2H_5$ |
| 3e-2 | —$COCOOC_2H_5$ | 4e-2 | —$COCOOC_2H_5$ |
| 3e-3 | —$COCF_3$ | 4e-3 | —$COCF_3$ |
| 3e-4 | —$SO_2CH_3$ | 4e-4 | —$SO_2CH_3$ |
| 3e-5 | —CHO | 4e-5 | —CHO |
| 3e-6 | —$COCH_3$ | | |
| 3e-7 | —$COCH_2SCH_3$ | | |
| 3e-8 | —$SO_2CF_3$ | 4e-6 | —$SO_2CF_3$ |
| 3e-9 | 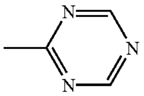 | 4e-7 | 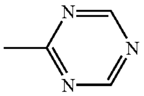 |
| 3e-10 | —$COOC_2H_4SCH_3$ | 4e-8 | —$COOC_2H_4SCH_3$ |
| 3e-11 | —$COCOOC_2H_4SCH_3$ | 4e-9 | —$COCOOC_2H_4SCH_3$ |
| 3e-12 | —$COCONHC_2H_4SCH_3$ | 4e-10 | —$COCONHC_2H_4SCH_3$ |

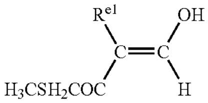

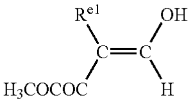

| No. | —$R^{e1}$ | No. | —$R^{e1}$ |
|---|---|---|---|
| 5e-1 | —$COOC_2H_5$ | 6e-1 | —$COOC_2H_5$ |
| 5e-2 | —$COCOOC_2H_5$ | 6e-2 | —$COCOOC_2H_5$ |
| 5e-3 | —$COCF_3$ | 6e-3 | —$COCF_3$ |
| 5e-4 | —$SO_2CH_3$ | 6e-4 | —$SO_2CH_3$ |
| 5e-5 | —CHO | 6e-5 | —CHO |
| 5e-6 | —$COCH_3$ | 6e-6 | —$COCH_3$ |
| 5e-7 | —$COCH_2SCH_3$ | 6e-7 | —$COCH_2SCH_3$ |
| 5e-8 | —$SO_2CF_3$ | 6e-8 | —$SO_2CF_3$ |
| 5e-9 | 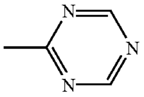 | 6e-9 | 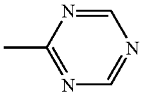 |
| 5e-10 | —$COOC_2H_4SCH_3$ | 6e-10 | —$COOC_2H_4SCH_3$ |
| 5e-11 | —$COCOOC_2H_4SCH_3$ | 6e-11 | —$COCOOC_2H_4SCH_3$ |
| 5e-12 | —$COCONHC_2H_4SCH_3$ | 6e-12 | —$COCONHC_2H_4SCH_3$ |

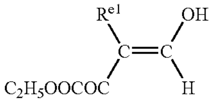

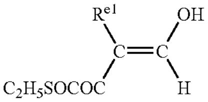

| No. | —$R^{e1}$ | No. | —$R^{e1}$ |
|---|---|---|---|
| 7e-1 | —$COOC_2H_5$ | 8e-1 | —$COOC_2H_5$ |
| 7e-2 | —$COCOOC_2H_5$ | 8e-2 | —$COCOOC_2H_5$ |
| | | 8e-3 | —$COCF_3$ |

-continued

| | | | |
|---|---|---|---|
| 7e-3 | —$SO_2CH_3$ | 8e-4 | —$SO_2CH_3$ |
| | | 8e-5 | —CHO |
| | | 8e-6 | —$COCH_3$ |
| | | 8e-7 | —$COCH_2SCH_3$ |
| 7e-4 | —$SO_2CF_3$ | 8e-8 | —$SO_2CF_3$ |
| 7e-5 | 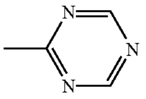 | 8e-9 | 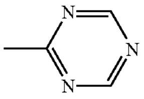 |
| 7e-6 | —$COOC_2H_4SCH_3$ | 8e-10 | —$COOC_2H_4SCH_3$ |
| 7e-7 | —$COCOOC_2H_4SCH_3$ | 8e-11 | —$COCOOC_2H_4SCH_3$ |
| 7e-8 | —$COCONHC_2H_4SCH_3$ | 8e-12 | —$COCONHC_2H_4SCH_3$ |

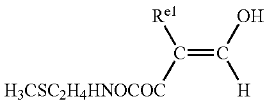 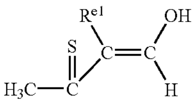

| No. | —$R^{e1}$ | No. | —$R^{e1}$ |
|---|---|---|---|
| 9e-1 | —$COOC_2H_5$ | 10e-1 | —$COOC_2H_5$ |
| 9e-2 | —$COCOOC_2H_5$ | 10e-2 | —$COCOOC_2H_5$ |
| | | 10e-3 | —$COCF_3$ |
| 9e-3 | —$SO_2CH_3$ | 10e-4 | —$SO_2CH_3$ |
| | | 10e-5 | —CHO |
| | | 10e-6 | —$COCH_3$ |
| | | 10e-7 | —$COCH_2SCH_3$ |
| 9e-4 | —$SO_2CF_3$ | 10e-8 | —$SO_2CF_3$ |
| 9e-5 | 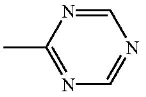 | 10e-9 | 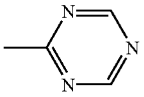 |
| 9e-6 | —$COOC_2H_4SCH_3$ | 10e-10 | —$COOC_2H_4SCH_3$ |
| 9e-7 | —$COCOOC_2H_4SCH_3$ | 10e-11 | —$COCOOC_2H_4SCH_3$ |
| 9e-8 | —$COCONHC_2H_4SCH_3$ | 10e-12 | —$COCONHC_2H_4SCH_3$ |

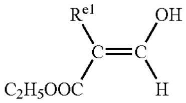 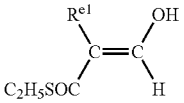

| No. | —$R^{e1}$ | No. | —$R^{e1}$ |
|---|---|---|---|
| 11e-1 | —$COOC_2H_5$ | 12e-1 | —$COOC_2H_5$ |
| | | 12e-2 | —$COCOOC_2H_5$ |
| | | 12e-3 | —$COCF_3$ |
| 11e-2 | —$SO_2CH_3$ | 12e-4 | —$SO_2CH_3$ |
| | | 12e-5 | —CHO |
| | | 12e-6 | —$COCH_3$ |
| | | 12e-7 | —$COCH_2SCH_3$ |
| 11e-3 | —$SO_2CF_3$ | 12e-8 | —$SO_2CF_3$ |
| 11e-4 | 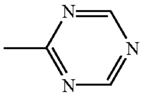 | 12e-9 | 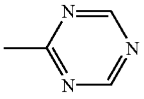 |
| 11e-5 | —$COOC_2H_4SCH_3$ | 12e-10 | —$COOC_2H_4SCH_3$ |
| 11e-6 | —$COCOOC_2H_4SCH_3$ | 12e-11 | —$COCOOC_2H_4SCH_3$ |
| | | 12e-12 | —$COCONHC_2H_4SCH_3$ |

-continued

| 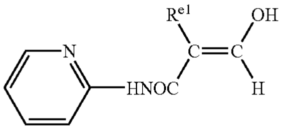 | | 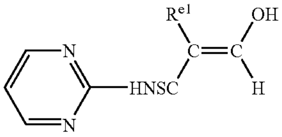 | |
|---|---|---|---|
| No. | —$R^{e1}$ | No. | —$R^{e1}$ |
| 13e-1 | —$COOC_2H_5$ | 14e-1 | —$COOC_2H_5$ |
| 13e-2 | —$COCOOC_2H_5$ | 14e-2 | —$COCOOC_2H_5$ |
| 13e-3 | —$COCF_3$ | 14e-3 | —$COCF_3$ |
| 13e-4 | —$SO_2CH_3$ | 14e-4 | —$SO_2CH_3$ |
| 13e-5 | —CHO | 14e-5 | —CHO |
| 13e-6 | —$COCH_3$ | 14e-6 | —$COCH_3$ |
| 13e-7 | —$COCH_2SCH_3$ | 14e-7 | —$COCH_2SCH_3$ |
| 13e-8 | —$SO_2CF_3$ | 14e-8 | —$SO_2CF_3$ |
| 13e-9 | 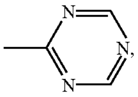 | 14e-9 | 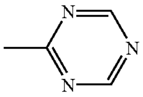 |
| 13e-10 | —$COOC_2H_4SCH_3$ | 14e-10 | —$COOC_2H_4SCH_3$ |
| 13e-11 | —$COCOOC_2H_4SCH_3$ | 14e-11 | —$COCOOC_2H_4SCH_3$ |
| 13e-12 | —$COCONHC_2H_4SCH_3$ | 14e-12 | —$COCONHC_2H_4SCH_3$ |

| 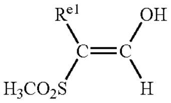 | | 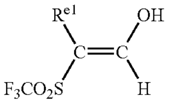 | |
|---|---|---|---|
| No. | —$R^{e1}$ | No. | —$R^{e1}$ |
| 15e-1 | —$COOC_2H_5$ | 16e-1 | 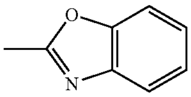 |
| 15e-2 | —$COCOOC_2H_5$ | | |
| 15e-3 | —$SO_2CH_3$ | 16e-2 | —$COCONHC_2H_4SCH_3$ |
| 15e-4 | —$SO_2CF_3$ | | |
| 15e-5 | 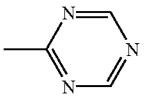 | | |
| 15e-6 | —$COOC_2H_4SCH_3$ | | |
| 15e-7 | —$COCOOC_2H_4SCH_3$ | | |
| 15e-8 | —$COCONHC_2H_4SCH_3$ | | |

| 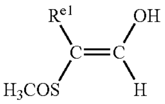 | | 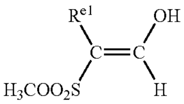 | |
|---|---|---|---|
| No. | —$R^{e1}$ | No. | —$R^{e1}$ |
| 17e-1 | —$COOC_2H_5$ | 18e-1 | —$COOC_2H_5$ |
| 17e-2 | —$COCOOC_2H_5$ | 18e-2 | —$COCOOC_2H_5$ |
| 17e-3 | —$COCF_3$ | 18e-3 | —$COCF_3$ |
| 17e-4 | —$SO_2CH_3$ | 18e-4 | —$SO_2CH_3$ |
| 17e-5 | —CHO | 18e-5 | —CHO |
| 17e-6 | —$COCH_3$ | 18e-6 | —$COCH_3$ |
| 17e-7 | —$COCH_2SCH_3$ | 18e-7 | —$COCH_2SCH_3$ |
| 17e-8 | —$SO_2CF_3$ | 18e-8 | —$SO_2CF_3$ |
| 17e-9 | 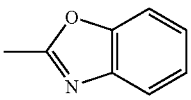 | 18e-9 | 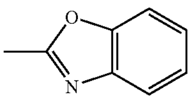 |
| 17e-10 | —$COOC_2H_4SCH_3$ | 18e-10 | —$COOC_2H_4SCH_3$ |

-continued

| | | | |
|---|---|---|---|
| 17e-11 | —$COCOOC_2H_4SCH_3$ | 18e-11 | —$COCOOC_4H_4SCH_3$ |
| 17e-12 | —$COCONHC_2H_4SCH_3$ | 18e-12 | —$COCONHC_2H_4SCH_3$ |

| 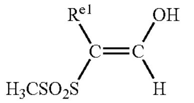 | | 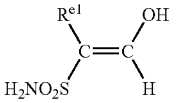 | |
|---|---|---|---|
| No. | —$R^{e1}$ | No. | —$R^{e1}$ |
| 19e-1 | —$COOC_2H_5$ | 20e-1 | —$COOC_2H_5$ |
| 19e-2 | —$COCOOC_2H_5$ | 20e-2 | —$COCOOC_2H_5$ |
| 19e-3 | —$COCF_3$ | 20e-3 | —$COCF_3$ |
| 19e-4 | —$SO_2CH_3$ | 20e-4 | —$SO_2CH_3$ |
| 19e-5 | —CHO | 20e-5 | —CHO |
| 19e-6 | —$COCH_3$ | 20e-6 | —$COCH_3$ |
| 19e-7 | —$COCH_2SCH_3$ | 20e-7 | —$COCH_2SCH_3$ |
| 19e-8 | —$SO_2CF_3$ | 20e-8 | —$SO_2CF_3$ |
| 19e-9 | 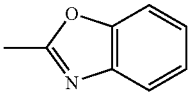 | 20e-9 | 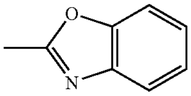 |
| 19e-10 | —$COOC_2H_4SCH_3$ | 20e-10 | —$COOC_2H_4SCH_3$ |
| 19e-11 | —$COCOOC_2H_4SCH_3$ | 20e-11 | —$COCOOC_2H_4SCH_3$ |
| 19e-12 | —$COCONHC_2H_4SCH_3$ | 20e-12 | —$COCONHC_2H_4SCH_3$ |

| 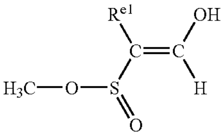 | | 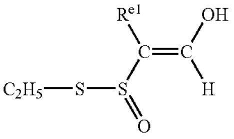 | |
|---|---|---|---|
| No. | —$R^{e1}$ | No. | —$R^{e1}$ |
| 21e-1 | —$COOC_2F_4H$ | 22e-1 | —$COOC_4F_4H$ |
| 21e-2 | —$COCOOCH_2C_2F_4H$ | 22e-2 | —$COCOOCH_2C_2F_4H$ |
| 21e-3 | —$COCF_3$ | 22e-3 | —$COCF_3$ |
| 21e-4 | —$SO_2CH_3$ | 22e-4 | —$SO_2CH_3$ |
| 21e-5 | —CHO | 22e-5 | —CHO |
| 21e-6 | —$COCH_3$ | 22e-6 | —$COCH_3$ |
| 21e-7 | —$COCH_2SCH_3$ | 22e-7 | —$COCH_2SCH_3$ |
| 21e-8 | —$SO_2CF_3$ | 22e-8 | —$SO_2CF_3$ |
| 21e-9 | 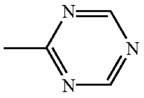 | 22e-9 | 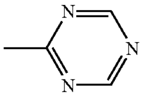 |
| 21e-10 | —$COOC_2H_4SCH_3$ | 22e-10 | —$COOC_2H_4SCH_3$ |
| 21e-11 | —$COCOOC_2H_4SCH_3$ | 22e-11 | —$COCOOC_2H_4SCH_3$ |
| 21e-12 | —$COCONHC_2H_4SCH_3$ | 22e-12 | —$COCONHC_2H_4SCH_3$ |

| 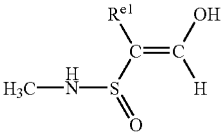 | | 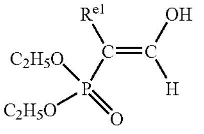 | |
|---|---|---|---|
| No. | —$R^{e1}$ | No. | —$R^{e1}$ |
| 23e-1 | —$COOC_2F_4H$ | 24e-1 | —$COOC_2F_4H$ |
| 23e-2 | —$COCOOCH_2C_2F_4H$ | 24e-2 | —$COCOOCH_2C_2F_4H$ |
| 23e-3 | —$COCF_3$ | 24e-3 | —$COCF_3$ |
| 23e-4 | —$SO_2CH_3$ | 24e-4 | —$SO_2CH_3$ |
| 23e-5 | —CHO | 24e-5 | —CHO |
| 23e-6 | —$COCH_3$ | 24e-6 | —$COCH_3$ |
| 23e-7 | —$COCH_2SCH_3$ | 24e-7 | —$COCH_2SCH_3$ |
| 23e-8 | —$SO_2CF_3$ | 24e-8 | —$SO_2CF_3$ |

-continued

| | | | |
|---|---|---|---|
| 23e-9 | 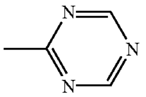 | 24e-9 | 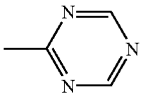 |
| 23e-10 | $—COOC_2H_4SCH_3$ | 24e-10 | $—COOC_2H_4SCH_3$ |
| 23e-11 | $—COCOOC_2H_4SCH_3$ | 24e-11 | $—COCOOC_2H_4SCH_3$ |
| 23e-12 | $—COCONHC_2H_4SCH_3$ | 24e-12 | $—COCONHC_2H_4SCH_3$ |

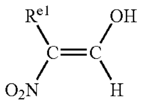

| No. | $—R^{e1}$ |
|---|---|
| 25e-1 | $—COOC_2F_4H$ |
| 25e-2 | $—COCOOCH_2C_2F_4H$ |
| 25e-3 | $—COCF_3$ |
| 25e-4 | $—SO_2CH_3$ |
| 25e-5 | —CHO |
| 25e-6 | $—COCH_3$ |
| 25e-7 | $—COCH_2SCH_3$ |
| 25e-8 | $—SO_2CF_3$ |
| 25e-9 | 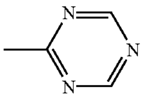 |
| 25e-10 | $—COOC_2H_4SCH_3$ |
| 25e-11 | $—COCOOC_2H_4SCH_3$ |
| 25e-12 | $—COCONHC_2H_4SCH_3$ |

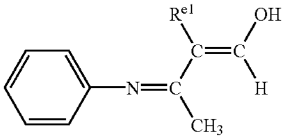 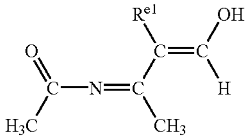

| No. | $—R^{e1}$ | No. | $—R^{e1}$ |
|---|---|---|---|
| 26e-1 | $—COOC_2H_5$ | 27e-1 | $—COOC_2H_5$ |
| 26e-2 | $—COCOOC_2H_5$ | 27e-2 | $—COCOOC_2H_5$ |
| 26e-3 | $—COCF_3$ | 27e-3 | $—COCF_3$ |
| 26e-4 | $—SO_2CH_3$ | 27e-4 | $—SO_2CH_3$ |
| 26e-5 | —CHO | 27e-5 | —CHO |
| 26e-6 | $—COCH_3$ | 27e-6 | $—COCH_3$ |
| 26e-7 | $—SO_2CF_3$ | 27e-7 | $—SO_2CF_3$ |
| 26e-8 | 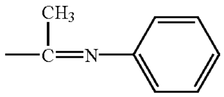 | 27e-8 | 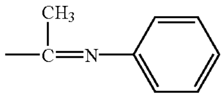 |
| | | 27e-9 | 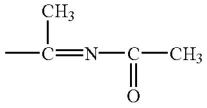 |

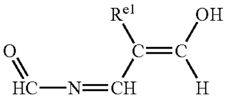 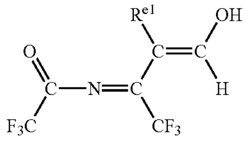

| No. | $—R^{e1}$ | No. | $—R^{e1}$ |
|---|---|---|---|
| 28e-1 | $—COOC_2H_5$ | 29e-1 | $—COOC_2H_5$ |
| 28e-2 | $—COCOOC_2H_5$ | 29e-2 | $—COCOOC_2H_5$ |
| 28e-3 | $—COCF_3$ | 29e-3 | $—COCF_3$ |
| 28e-4 | $—SO_2CH_3$ | 29e-4 | $—SO_2CH_3$ |

-continued
| | | | |
|---|---|---|---|
| 28e-5 | —CHO | 29e-5 | —CHO |
| 28e-6 | —$COCH_3$ | 29e-6 | —$COCH_3$ |
| 28e-7 | —$SO_2CF_3$ | 29e-7 | —$SO_2CF_3$ |
| 28e-8 | 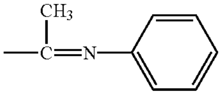 | 29e-8 | 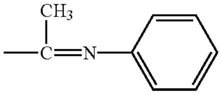 |
| 28e-9 | 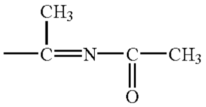 | 29e-9 | 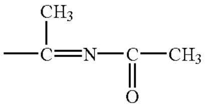 |
| 28e-10 | 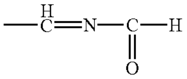 | 29e-10 | 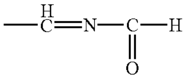 |
| | | 29e-11 | 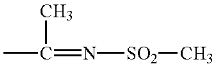 |
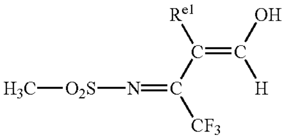 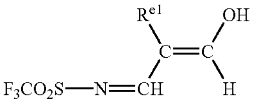
| No. | —$R^{e1}$ | No. | —$R^{e1}$ |
|---|---|---|---|
| 30e-1 | —$COOC_2H_5$ | 31e-1 | —$COOC_2H_5$ |
| 30e-2 | —$COCOOC_2H_5$ | 31e-2 | —$COCOOC_2H_5$ |
| 30e-3 | —$COCF_3$ | 31e-3 | —$COCF_3$ |
| 30e-4 | —$SO_2CH_3$ | 31e-4 | —$SO_2CH_3$ |
| 30e-5 | —CHO | 31e-5 | —CHO |
| 30e-6 | —$COCH_3$ | 31e-6 | —$COCH_3$ |
| 30e-7 | —$SO_2CF_3$ | 31e-7 | —$SO_2CF_3$ |
| 30e-8 | 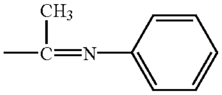 | 31e-8 | 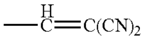 |
| 30e-9 | 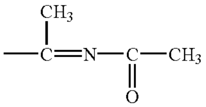 | 31e-9 | 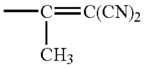 |
| 30e-10 | 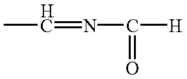 | 31e-10 | 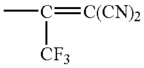 |
| 30e-11 | 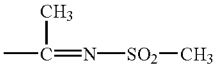 | 31e-11 | 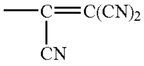 |
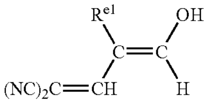 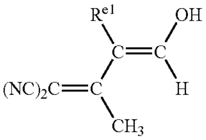
| No. | —$R^{e1}$ | No. | —$R^{e1}$ |
|---|---|---|---|
| 32e-1 | —$COOC_2H_5$ | 33e-1 | —$COOC_2H_5$ |
| 32e-2 | —$COCOOC_2H_5$ | 33e-2 | —$COCOOC_2H_5$ |
| 32e-3 | —$COCF_3$ | 33e-3 | —$COCF_3$ |
| 32e-4 | —$SO_2CH_3$ | 33e-4 | —$SO_2CH_3$ |
| 32e-5 | —CHO | 33e-5 | —CHO |
| 32e-6 | —$COCH_3$ | 33e-6 | —$COCH_3$ |

-continued

| | | | |
|---|---|---|---|
| 32e-7 | —$SO_2CF_3$ | 33e-7 | —$SO_2CF_3$ |
| 32e-8 | 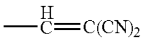 | 33e-8 | 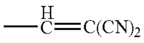 |
| | | 33e-9 | 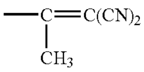 |

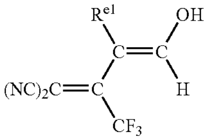

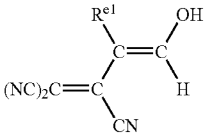

| No. | —$R^{e1}$ | No. | —$R^{e1}$ |
|---|---|---|---|
| 34e-1 | —$COOC_2H_5$ | 35e-1 | —$COOC_2H_5$ |
| 34e-2 | —$COCOOC_2H_5$ | 35e-2 | —$COCOOC_2H_5$ |
| 34e-3 | —$COCF_3$ | 35e-3 | —$COCF_3$ |
| 34e-4 | —$SO_2CH_3$ | 35e-4 | —$SO_2CH_3$ |
| 34e-5 | —CHO | 35e-5 | —CHO |
| 34e-6 | —$COCH_3$ | 35e-6 | —$COCH_3$ |
| 34e-7 | —$SO_2CF_3$ | 35e-7 | —$SO_2CF_3$ |
| 34e-8 | 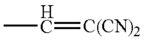 | 35e-8 | 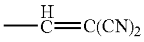 |
| 34e-9 | 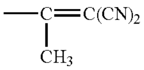 | 35e-9 | 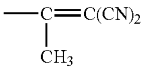 |
| 34e-10 | 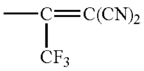 | 35e-10 | 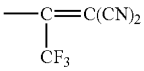 |
| | | 35e-11 | 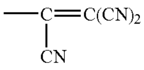 |

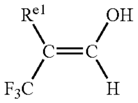

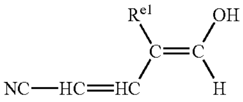

| No. | —$R^{e1}$ | No. | —$R^{e1}$ |
|---|---|---|---|
| 36e-1 | —$COOC_2H_5$ | 37e-1 | —$COOC_2H_5$ |
| 36e-2 | —$COCOOC_2H_5$ | 37e-2 | —$COCOOC_2H_5$ |
| 36e-3 | —$COCF_3$ | 37e-3 | —$COCF_3$ |
| 36e-4 | —$SO_2CH_3$ | 37e-4 | —$SO_2CH_3$ |
| 36e-5 | —CHO | 37e-5 | —CHO |
| 36e-6 | —$COCH_3$ | 37e-6 | —$COCH_3$ |
| 36e-7 | —$COCH_2SCH_3$ | 37e-7 | —$COCH_2SCH_3$ |
| 36e-8 | —$SO_2CF_3$ | 37e-8 | —$SO_2CF_3$ |
| 36e-9 | 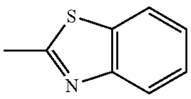 | 37e-9 | 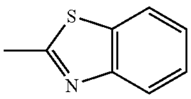 |
| 36e-10 | —$COOC_2H_4SCH_3$ | 37e-10 | —$COOC_2H_4SCH_3$ |
| 36e-11 | —$COCOOC_2H_4SCH_3$ | 37e-11 | —$COCOOC_2H_4SCH_3$ |
| 36e-12 | —$COCONHC_2H_4SCH_3$ | 37e-12 | —$COCONHC_2H_4SCH_3$ |

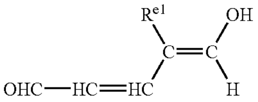

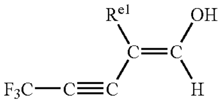

| No. | —$R^{e1}$ | No. | —$R^{e1}$ |
|---|---|---|---|
| 38e-1 | —$COOC_2H_5$ | 39e-1 | —$COOC_2H_5$ |
| 38e-2 | —$COCOOC_2H_5$ | 39e-2 | —$COCOOC_2H_5$ |

-continued

| | | | |
|---|---|---|---|
| 38e-3 | —$COCF_3$ | 39e-3 | —$COCF_3$ |
| 38e-4 | —$SO_2CH_3$ | 39e-4 | —$SO_2CH_3$ |
| 38e-5 | —CHO | 39e-5 | —CHO |
| 38e-6 | —$COCH_3$ | 39e-6 | —$COCH_3$ |
| 38e-7 | —$COCH_2SCH_3$ | 39e-7 | —$COCH_2SCH_3$ |
| 38e-8 | —$SO_2CF_3$ | 39e-8 | —$SO_2CF_3$ |
| 38e-9 | 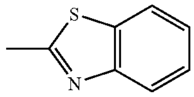 | 39e-9 | 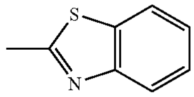 |
| 38e-10 | —$COOC_2H_4SCH_3$ | 39e-10 | —$COOC_2H_4SCH_3$ |
| 38e-11 | —$COCOOC_2H_4SCH_3$ | 39e-11 | —$COCOOC_2H_4SCH_3$ |
| 38e-12 | —$COCONHC_2H_4SCH_3$ | 39e-12 | —$COCONHC_2H_4SCH_3$ |

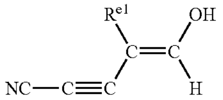

| No. | —$R^{e1}$ |
|---|---|
| 40e-1 | —$COOC_2H_5$ |
| 40e-2 | —$COCOOC_2H_5$ |
| 40e-3 | —$COCF_3$ |
| 40e-4 | —$SO_2CH_3$ |
| 40e-5 | —CHO |
| 40e-6 | —$COCH_3$ |
| 40e-7 | —$COCH_2SCH_3$ |
| 40e-8 | —$SO_2CF_3$ |
| 40e-9 | 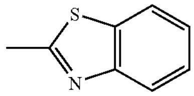 |
| 40e-10 | —$COOC_2H_4SCH_3$ |
| 40e-11 | —$COCOOC_2H_4SCH_3$ |
| 40e-12 | —$COCONHC_2H_4SCH_3$ |

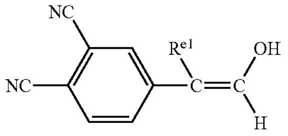

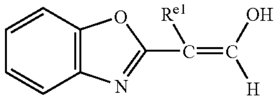

| No. | —$R^{e1}$ | No. | —$R^{e1}$ |
|---|---|---|---|
| 41e-1 | —$COOC_2H_5$ | 42e-1 | —$COOC_2H_5$ |
| 41e-2 | —$COCOOC_2H_5$ | 42e-2 | —$COCOOC_2H_5$ |
| 41e-3 | —$COCF_3$ | 42e-3 | —$COCF_3$ |
| 41e-4 | —$SO_2CH_3$ | 42e-4 | —$SO_2CH_3$ |
| 41e-5 | —CHO | 42e-5 | —CHO |
| 41e-6 | —$COCH_3$ | 42e-6 | —$COCH_3$ |
| 41e-7 | —$COCH_2SCH_3$ | 42e-7 | —$COCH_2SCH_3$ |
| 41e-8 | —$SO_2CF_3$ | | |
| 41e-9 | 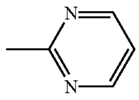 | 42e-8 | 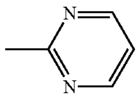 |
| 41e-10 | —$COOC_2H_4SCH_3$ | 42e-9 | —$COOC_2H_4SCH_3$ |
| 41e-11 | —$COCOOC_2H_4SCH_3$ | 42e-10 | —$COCOOC_2H_4SCH_3$ |
| 41e-12 | —$COCONHC_2H_4SCH_3$ | 42e-11 | —$COCONHC_2H_4SCH_3$ |

-continued

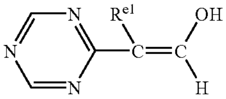
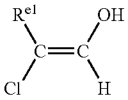

| No. | —$R^{e1}$ | No. | —$R^{e1}$ |
|---|---|---|---|
| 43e-1 | —$COOC_2H_5$ | 44e-1 | —$COOC_2H_5$ |
| 43e-2 | —$COCOOC_2H_5$ | 44e-2 | —$COCOOC_2H_5$ |
| | | 44e-3 | —$COCF_3$ |
| 43e-3 | —$SO_2CH_3$ | 44e-4 | —$SO_2CH_3$ |
| | | 44e-5 | —CHO |
| 43e-4 | —$SO_2CF_3$ | 44e-6 | —$COCH_3$ |
| | | 44e-7 | —$COCH_2SCH_3$ |
| | | 44e-8 | —$SO_2CF_3$ |
| 43e-5 | 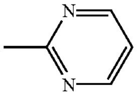 | 44e-9 | 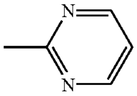 |
| 43e-9 | —$COOC_2H_4SCH_3$ | 44e-10 | —$COOC_2H_4SCH_3$ |
| 43e-10 | —$COCOOC_2H_4SCH_3$ | 44e-11 | —$COCOOC_2H_4SCH_3$ |
| 43e-11 | —$COCONHC_2H_4SCH_3$ | 44e-12 | —$COCONHC_2H_4SCH_3$ |

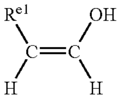
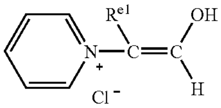

| No. | —$R^{e1}$ | No. | —$R^{e1}$ |
|---|---|---|---|
| 45e-1 | —$COOC_2H_5$ | 46e-1 | —$COOC_2H_5$ |
| 45e-2 | —$COCOOC_2H_5$ | 46e-2 | —$COCOOC_2H_5$ |
| 45e-3 | —$COCF_3$ | 46e-3 | —$COCF_3$ |
| 45e-4 | —$SO_2CH_3$ | 46e-4 | —$SO_2CH_3$ |
| 45e-5 | —CHO | 46e-5 | —CHO |
| 45e-6 | —$COCH_3$ | 46e-6 | —$COCH_3$ |
| 45e-7 | —$COCH_2SCH_3$ | 46e-7 | —$COCH_2SCH_3$ |
| 45e-8 | —$SO_2CF_3$ | 46e-8 | —$SO_2CF_3$ |
| 45e-9 | 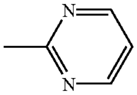 | 46e-9 | 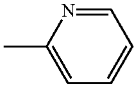 |
| 45e-10 | —$COOC_2H_4SCH_3$ | 46e-10 | —$COOC_2H_4SCH_3$ |
| 45e-11 | —$COCOOC_2H_4SCH_3$ | 46e-11 | —$COCOOC_2H_4SCH_3$ |
| 45e-12 | —$COCONHC_2H_4SCH_3$ | 46e-12 | —$COCONHC_2H_4SCH_3$ |

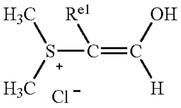
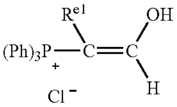

(Ph はフェニル基を表す)

| No. | —$R^{e1}$ | No. | —$R^{e1}$ |
|---|---|---|---|
| 47e-1 | —$COOC_2H_5$ | 48e-1 | —$COOC_2H_5$ |
| 47e-2 | —$COCOOC_2H_5$ | 48e-2 | —$COCOOC_2H_5$ |
| 47e-3 | —$COCF_3$ | 48e-3 | —$COCF_3$ |
| 47e-4 | —$SO_2CH_3$ | 48e-4 | —$SO_2CH_3$ |
| 47e-5 | —CHO | 48e-5 | —CHO |
| 47e-6 | —$COCH_3$ | 48e-6 | —$COCH_3$ |
| 47e-7 | —$COCH_2SCH_3$ | 48e-7 | —$COCH_2SCH_3$ |
| 47e-8 | —$SO_2CF_3$ | 48e-8 | —$SO_2CF_3$ |
| 47e-9 | 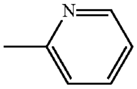 | 48e-9 | 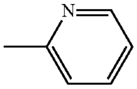 |

-continued

| | | | |
|---|---|---|---|
| 47e-10 | —$COOC_2H_4SCH_3$ | 48e-10 | —$COOC_2H_4SCH_3$ |
| 47e-11 | —$COCOOC_2H_4SCH_3$ | 48e-11 | —$COCOOC_2H_4SCH_3$ |
| 47e-12 | —$COCONHC_2H_4SCH_3$ | 48e-12 | —$COCONHC_2H_4SCH_3$ |

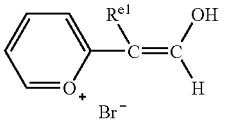
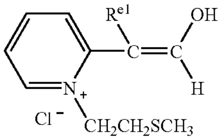

| No. | —$R^{e1}$ | No. | —$R^{e1}$ |
|---|---|---|---|
| 49e-1 | —$COOC_2H_5$ | 50e-1 | —$COOC_2H_5$ |
| 49e-2 | —$COCOOC_2H_5$ | 50e-2 | —$COCOOC_2H_5$ |
| 49e-3 | —$COCF_3$ | 50e-3 | —$COCF_3$ |
| 49e-4 | —$SO_2CH_3$ | 50e-4 | —$SO_2CH_3$ |
| 49e-5 | —CHO | 50e-5 | —CHO |
| 49e-6 | —$COCH_3$ | 50e-6 | —$COCH_3$ |
| 49e-7 | —$COCH_2SCH_3$ | 50e-7 | —$COCH_2SCH_3$ |
| 49e-8 | —$SO_2CF_3$ | 50e-8 | —$SO_2CF_3$ |
| 49e-9 | 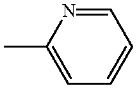 | 50e-9 | 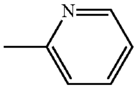 |
| 49e-10 | —$COOC_2H_4SCH_3$ | 50e-10 | —$COOC_2H_4SCH_3$ |
| 49e-11 | —$COCOOC_2H_4SCH_3$ | 50e-11 | —$COCOOC_2H_4SCH_3$ |
| 49e-12 | —$COCONHC_2H_4SCH_3$ | 50e-12 | —$COCONHC_2H_4SCH_3$ |

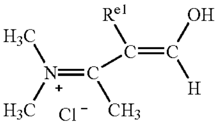
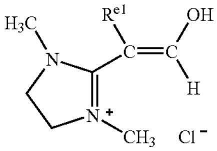

| No. | —$R^{e1}$ | No. | —$R^{e1}$ |
|---|---|---|---|
| 51e-1 | —$COOC_2H_5$ | 52e-1 | —$COOC_2H_5$ |
| 51e-2 | —$COCOOC_2H_5$ | 52e-2 | —$COCOOC_2H_5$ |
| 51e-3 | —$COCF_3$ | 52e-3 | —$COCF_3$ |
| 51e-4 | —$SO_2CH_3$ | 52e-4 | —$SO_2CH_3$ |
| 51e-5 | —CHO | 52e-5 | —CHO |
| 51e-6 | —$COCH_3$ | 52e-6 | —$COCH_3$ |
| 51e-7 | —$SO_2CF_3$ | 52e-7 | —$SO_2CF_3$ |
| 51e-8 | 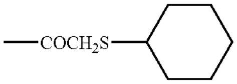 | 52e-8 | 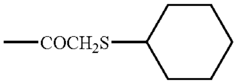 |
| 51e-9 | 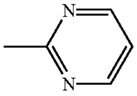 | 52e-9 | 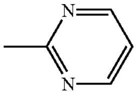 |
| 51e-10 | —$COOC_2H_4SC_2H_5$ | 52e-10 | —$COOC_2H_4SC_2H_5$ |
| 51e-11 | —$COCOOC_2H_4SC_2H_5$ | 52e-11 | —$COCOOC_2H_4SC_2H_5$ |
| 51e-12 | 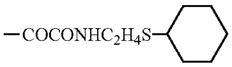 | 52e-12 | 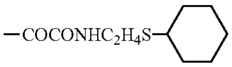 |

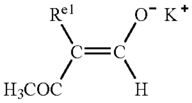
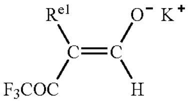

| No. | —$R^{e1}$ | No. | —$R^{e1}$ |
|---|---|---|---|
| 53e-1 | —$COOC_2H_5$ | 54e-1 | —$COOC_2H_5$ |
| 53e-2 | —$COCOOC_2H_5$ | 54e-2 | —$COCOOC_2H_5$ |
| | | 54e-3 | —$COCF_3$ |

-continued

| | | | |
|---|---|---|---|
| 53e-3 | —$COCH_3$ | 54e-4 | —$COCH_3$ |
| 53e-4 | —$SO_2CF_3$ | 54e-5 | —$SO_2CF_3$ |
| 53e-5 | 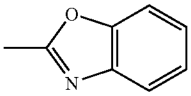 | 54e-6 | 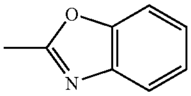 |
| 53e-6 | —$COOC_2H_4SCH_3$ | 54e-7 | —$COOC_2H_4SCH_3$ |
| 53e-7 | —$COCOOC_2H_4SCH_3$ | 54e-8 | —$COCOOC_2H_4SCH_3$ |
| 53e-8 | —$COCONHC_2H_4SCH_3$ | 54e-9 | —$COCONHC_2H_4SCH_3$ |

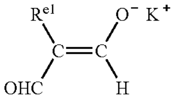 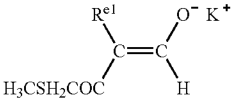

| No. | —$R^{e1}$ | No. | —$R^{e1}$ |
|---|---|---|---|
| 55e-1 | —$COOC_2H_5$ | 56e-1 | —$COOC_2H_5$ |
| 55e-2 | —$COCOOC_2H_5$ | 56e-2 | —$COCOOC_2H_5$ |
| 55e-3 | —$COCF_3$ | 56e-3 | —$COCF_3$ |
| | | 56e-4 | —$SO_2CH_3$ |
| 55e-4 | —CHO | 56e-5 | —CHO |
| 55e-5 | —$COCH_3$ | 56e-6 | —$COCH_3$ |
| | | 56e-7 | —$COCH_2SCH_3$ |
| 55e-6 | —$SO_2CF_3$ | 56e-8 | —$SO_2CF_3$ |
| 55e-7 | 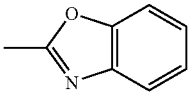 | 56e-9 | 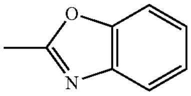 |
| 55e-8 | —$COOC_2H_4SCH_3$ | 56e-10 | —$COOC_2H_4SCH_3$ |
| 55e-9 | —$COCOOC_2H_4SCH_3$ | 56e-11 | —$COCOOC_2H_4SCH_3$ |
| 55e-10 | —$COCONHC_2H_4SCH_3$ | 56e-12 | —$COCONHC_2H_4SCH_3$ |

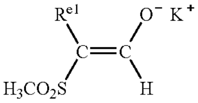 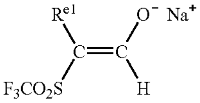

| No. | —$R^{e1}$ | No. | —$R^{e1}$ |
|---|---|---|---|
| 57e-1 | —$COOC_2H_5$ | 58e-1 | —$COOC_2H_5$ |
| 57e-2 | —$COCOOC_2H_5$ | 58e-2 | —$COCOOC_2H_5$ |
| 57e-3 | —$COCF_3$ | | |
| 57e-4 | —$SO_2CH_3$ | | |
| 57e-5 | —CHO | | |
| 57e-6 | —$COCH_3$ | | |
| | | 58e-3 | —$COCH_2SCH_3$ |
| 57e-7 | —$SO_2CF_3$ | 54e-4 | —$SO_2CF_3$ |
| 57e-8 | 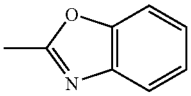 | 58e-5 | 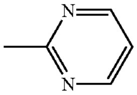 |
| 57e-9 | —$COOC_2H_4SCH_3$ | 58e-6 | —$COOC_2H_4SCH_3$ |
| 57e-10 | —$COCOOC_2H_4SCH_3$ | 58e-7 | —$COCOOC_2H_4SCH_3$ |
| 57e-11 | —$COCONHC_2H_4SCH_3$ | 58e-8 | —$COCONHC_2H_4SCH_3$ |

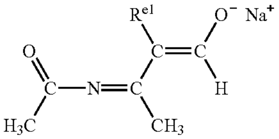 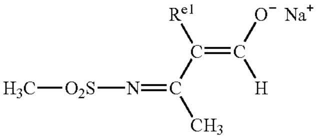

| No. | —$R^{e1}$ | No. | —$R^{e1}$ |
|---|---|---|---|
| 59e-1 | —$COOC_2H_5$ | 60e-1 | —$COOC_2H_5$ |
| 59e-2 | —$COCOOC_2H_5$ | 60e-2 | —$COCOOC_2H_5$ |
| 59e-3 | —$COCF_3$ | 60e-3 | —$COCF_3$ |

-continued

| | | | |
|---|---|---|---|
| 59e-4 | —$SO_2CH_3$ | 60e-4 | —$SO_2CH_3$ |
| 59e-5 | —CHO | 60e-5 | —CHO |
| 59e-6 | —$COCH_3$ | 60e-6 | —$COCH_3$ |
| 59e-7 | —$COCH_2SCH_3$ | 60e-7 | —$COCH_2SCH_3$ |
| 59e-8 | —$SO_2CF_3$ | 60e-8 | —$SO_2CF_3$ |
| 59e-9 | 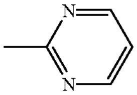 | 60e-9 | 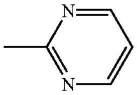 |
| 59e-10 | —$COOC_2H_4SCH_3$ | 60e-10 | —$COOC_2H_4SCH_3$ |
| 59e-11 | —$COCOOC_2H_4SCH_3$ | 60e-11 | —$COCOOC_2H_4SCH_3$ |
| 59e-12 | —$COCONHC_2H_4SCH_3$ | 60e-12 | —$COOCNHC_2H_4SCH_3$ |

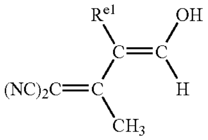

| No. | —$R^{e1}$ |
|---|---|
| 61e-1 | —$COOC_2H_5$ |
| 61e-2 | —$COCOOC_2H_5$ |
| 61e-3 | —$COCF_3$ |
| 61e-4 | —$SO_2CH_3$ |
| 61e-5 | —CHO |
| 61e-6 | —$COCH_3$ |
| 61e-7 | —$COCH_2SCH_3$ |
| 61e-8 | —$SO_2CF_3$ |
| 61e-9 | 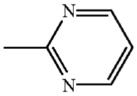 |
| 61e-10 | —$COOC_2H_4SCH_3$ |
| 61e-11 | —$COCOOC_2H_4SCH_3$ |
| 61e-12 | —$COCONHC_2H_4SCH_3$ |

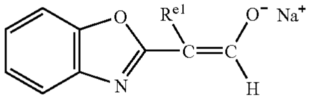 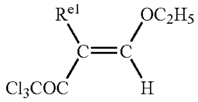

| No. | —$R^{e1}$ | No. | —$R^{e1}$ |
|---|---|---|---|
| 62e-1 | —$COOC_2H_5$ | 63e-1 | —$COOC_2H_4SCH_3$ |
| 62e-2 | —$COCOOC_2H_5$ | 63e-2 | —$COCOOC_2H_4SCH_3$ |
| 62e-3 | —$SO_2CF_3$ | 63e-3 | —$COCF_3$ |
| 62e-4 | —$COOC_2H_4SCH_3$ | 63e-4 | —CHO |
| 62e-5 | —$COCOOC_2H_4SCH_3$ | 63e-5 | —$SO_2CH_3$ |
| 62e-6 | —$COCONHC_2H_4SCH_3$ | 63e-6 | —$SO_2CF_3$ |
| 62e-7 | 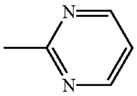 | | |

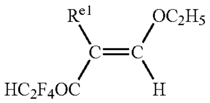 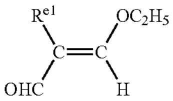

| No. | —$R^{e1}$ | No. | —$R^{e1}$ |
|---|---|---|---|
| 64e-1 | —$COOC_2H_4SCH_3$ | 65e-1 | —$COOC_2H_4SCH_3$ |
| 64e-2 | —$COCOOC_2H_4SCH_3$ | 65e-2 | —$COCOOC_2H_4SCH_3$ |
| 64e-3 | —$COCF_3$ | 65e-3 | —$COCF_3$ |
| 64e-4 | —CHO | 65e-4 | —CHO |
| 64e-5 | —$SO_2CH_3$ | 65e-5 | —$SO_2CH_3$ |

-continued
| | | | |
|---|---|---|---|
| 64e-6 | $—SO_2CF_3$ | 65e-6 | $—SO_2CF_3$ |
| 64e-7 | $—COCH_2SCH_3$ | 65e-7 | $—COCH_2SCH_3$ |
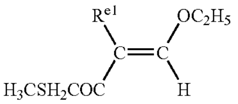
| No. | $—R^{e1}$ |
|---|---|
| 66e-1 | $—COOC_2H_4SCH_3$ |
| 66e-2 | $—COCOOC_2H_4SCH_3$ |
| 66e-3 | $—COCF_3$ |
| 66e-4 | —CHO |
| 66e-5 | $—SO_2CH_3$ |
| 66e-6 | $—SO_2CF_3$ |
| 66e-7 | $—COCH_2SCH_3$ |
67e-1
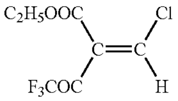
67e-2
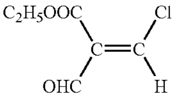
67e-3
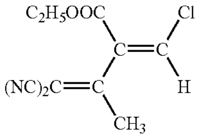
67e-4
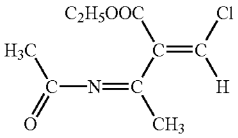
67e-5
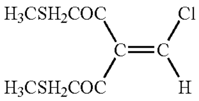
67e-6
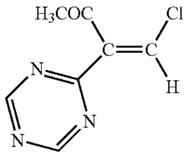
68e-1
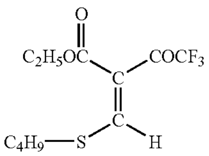
68e-2
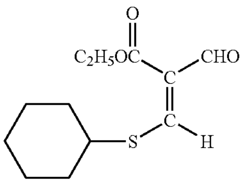

-continued
68e-3 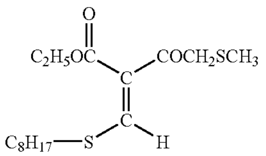
68e-4 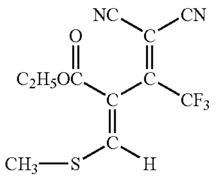
68e-5 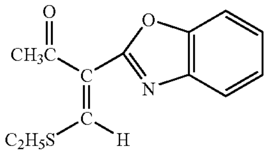
68e-6 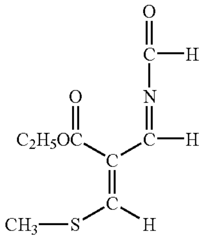
69e-1 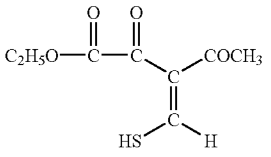
69e-2 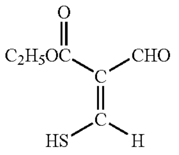
70e-1 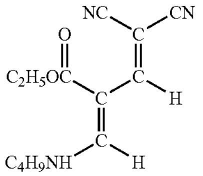
71e-1 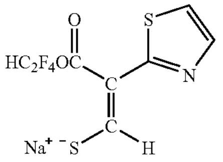

-continued 71e-2

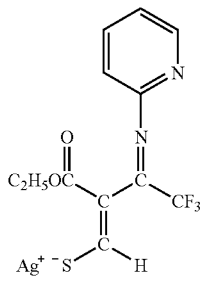

| | | | |
|---|---|---|---|
| 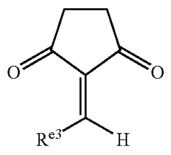 | | 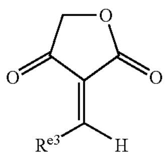 | |
| No. | —$R^{e3}$ | No. | —$R^{e3}$ |
| 72e-1 | —OH | 73e-1 | —OH |
| 72e-2 | —$OC_2H_5$ | 73e-2 | —$O^-Na^+$ |
| 72e-3 | —$SCH_3$ | 73e-3 | —$OCH_3$ |
| | | 73e-4 | —$O^-Ag^+$ |
| | | 73e-5 | —$SC_4H_9$ |
| | | 73e-6 | —$S^-K^+$ |
| | | 73e-7 | —Cl |
| | | 73e-8 | 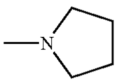 |

The compounds represented by the aforementioned formula (e) can be easily synthesized according to a known method.

The compounds represented by the aforementioned formula (e) are preferably added in an amount of 0.005-0.5 mole, preferably 0.01-0.3 mole, per mole of silver halide. The compounds represented by the aforementioned formula (e) may be used each alone, or two or more kinds of them may optionally be used in combination. Further, although they may be added to any layer among layers constituting the photosensitive material, they are preferably added to at least one layer among layers on the image-forming layer side constituting the photosensitive material, more preferably the image-forming layer and/or a layer adjacent thereto.

The photothermographic material used for the image formation method of the present invention can be prepared by coating a silver halide, an silver salt of an organic acid, a reducing agent and a high contrast agent on a support. The photothermographic material preferably has a structure that at least one image-forming layer containing a silver halide, an silver salt of an organic acid, a reducing agent and a high contrast agent and further containing a binder is provided on a support. Further, in the aforementioned photothermographic material, non-photosensitive layers other than the image-forming layer, such as a protective layer, an undercoat layer and a filter layer may be provided, and the filter layer may be provided on the image-forming layer side of the support or the side opposite to the side on which the image-forming layer is provided. As described above, one of the layers should be a coated layer obtained by applying a coating solution containing 20 weight % or more of an organic solvent, and it is preferred that the image-forming layer should be the coated layer obtained by applying a coating solution containing 20 weight % or more of an organic solvent. The organic solvent is preferably contained in the coating solution in an amount of 20-90 weight %, more preferably 30-80 weight %. The organic solvent is not particularly limited, and generally used organic solvents such as methyl ethyl ketone, toluene, methanol, ethanol and acetone can be used. A mixed organic solvent containing two or more kinds of these organic solvents may also be used. Although the coating solution may contain water, when it contains water, it preferably contains water in an amount of 20 weight % or less, more preferably 10 weight % or less.

The binder optionally contained in the photothermographic material may be transparent or translucent, and it is generally preferred that it consists of colorless polymer. Examples of the polymer include natural polymers, synthetic resins, synthetic homopolymers and copolymers and other film-forming media Specific examples thereof include, for example, gelatin, gum arabic, poly(vinyl alcohol), hydroxyethyl cellulose, cellulose acetate, cellulose acetate butyrate, poly(vinylpyrrolidone), casein, starch, poly(acrylic acid), poly(methyl methacrylate), poly(vinyl chloride), poly(methacrylic acid), copoly(styrene-maleic anhydride), copoly(styrene-acrylonitrile), copoly(styrene-butadiene), poly(vinyl acetal) (e.g., poly(vinyl formal), poly(vinyl butyral)), poly (ester), poly(urethane), phenoxy resin, poly(vinylidene chloride), poly(epoxide), poly(carbonate), poly(vinyl acetate), cellulose ester and poly (amide). Although the binder may be hydrophilic or hydrophobic, it is preferable to use a hydrophobic transparent binder in order to reduce fog after heat development. Preferred binders are polyvinyl butyral, cellulose acetate, cellulose acetate butyrate, polyester, polycarbonate, polyacrylic acid, polyurethane and so forth. Among these, polyvinyl butyral, cellulose acetate, cellulose acetate butyrate and polyester are particularly preferably used.

Further, in order to protect a surface to prevent scratches, the photothermographic material may have a non-photosensitive layer outside the image-forming layer. Type of the binder used for the non-photosensitive layer may be the same as or different from that of the binder used for the image-forming layer.

In the present invention, in order to increase the heat development speed, the amount of the binder in the image-forming layer is preferably 1.5-10 g/$m^2$, more preferably 1.7-8 g/$m^2$. When it is less than 1.5 g/$m^2$, density of unexposed areas is markedly increased and the material may not be used.

In the present invention, the material preferably contains a matting agent on the image-forming layer side. For preventing scratches on images after the heat development, a matting agent is preferably provided in a surface layer of the photothermographic material, and the matting agent is preferably contained in an amount of 0.5-30 weight % with respect to the total binder on the image-forming layer side. When a back layer is provided on the opposite side of the support with respect to the image-forming layer, at least one of layers on the back layer side preferably contains a matting agent, and the matting agent is preferably provided in a surface layer also for imparting lubricity to the photothermographic material or not leaving fingerprints. The matting agent is preferably contained in an amount of 0.5-40 weight % with respect to the total binder on the back layer side opposite to the image-forming layer side. Although the matting agent may have a defined shape or undefined shape, it preferably has a defined shape, and those having a spherical shape are preferably used.

In the photothermographic material of the present invention, although only the image-forming layer may be formed on the support, it is preferable to form at least one non-photosensitive layer on the image-forming layer. In order to control amount or wavelength distribution of light that passes through the image-forming layer, a filter dye layer may be formed on the same side as the image-forming layer and/or an antihalation dye layer, i.e., so-called backing layer, may be formed on the opposite side, and a dye or pigment may be contained in the image-forming layer. The non-photosensitive layer optionally formed preferably contains the aforementioned binder and matting agent, and it may further contain a lubricant such as polysiloxane compound, wax or liquid paraffin.

Further, various kinds of surfactants can be used as coating aids for the photothermographic material. Inter alia, fluorocarbon type surfactants are preferably used to improve electrification characteristics or to prevent spot-like coating failures.

The photothermographic material may contain a toning agent for suppressing silver color tone, if needed. Preferred examples of the toning agent are disclosed in Research Disclosure, Item 17029.

Various kinds of additives may be added to any of the image-forming layer, non-photosensitive layer and other layers to be formed. For the photothermographic material, there can be used, for example, surfactant, antioxidant, stabilizer, plasticizer, ultraviolet absorber, coating aid and so forth. As these additives and the other additives mentioned above, the compounds disclosed in Research Disclosure, Item 17029 (p. 9-15, June, 1978) can be preferably used.

The support of the photothermographic material is preferably transparent, and it is preferably a support of a film of plastic (e.g., polyethylene terephthalate, polycarbonate, polyimide, nylon, cellulose triacetate, polyethylene naphthalate) in order to obtain a predetermined optical density after the development and to prevent deformation of images after the development. A support of polyethylene terephthalate (abbreviated as "PET" hereinafter) or plastics containing styrene type polymer having a syndiotactic structure (abbreviated as "SPS" hereinafter) is particularly preferred. The support suitably has a thickness of about 50-300 μm, preferably 70-180 μm. A plastic support subjected to a heat treatment may also be used. The plastics to be employed for this purpose may be any of the plastics mentioned above. As for the heat treatment, a support consisting of any of these may be heated at a temperature higher than the glass transition temperature of the support by 30° C. or more, preferably 35° C. or more, still more preferably 40° C. or more, but not exceeding the melting point of the support after the formation of the support as a film and before coating of the image-forming layer.

In order to improve electrification property of the photothermographic material, conductive compounds such as metal oxides and/or conductive polymers can be added to a constitutive layer. Although they may be added to any layer, they are preferably added to an undercoat layer, back layer, layer between the image-forming layer and an undercoat layer or the like. The conductive compounds disclosed in U.S. Pat. No. 5,244,773, columns 14-20 can be preferably used in the present invention.

EXAMPLES

The present invention will be further specifically explained with reference to the following examples. The materials, regents, ratios, procedures and so forth mentioned in the following examples can be optionally changed so long as such change does not depart from the spirit of the present invention. Therefore, the scope of the present invention is not limited by the following examples.

<Preparation of Photothermographic material A>

(Preparation of Undercoated Support)

Both surfaces of a commercially available biaxially stretched and thermally fixed PET film (thickness: 120 μm) were subjected to a corona discharge treatment at 8 W/$m^2$·minute. On one surface, the following Undercoat coating solution a was applied in such an amount that a dry film thickness of 0.8 μm should be obtained and dried to form Undercoat layer A, and on the opposite surface, the following Undercoat coating solution b containing antistatic component was applied in such an amount that a dry film thickness of 0.8 μm should be obtained and dried to form Undercoat layer B having antistatic property.

| | |
|---|---|
| <<Undercoat coating solution a>> | |
| Copolymer latex solution (solid content: 30%, butyl acrylate/tert-butyl acrylate/styrene/2-hydroxyethyl acrylate = 30/20/25/25 (weight %)) | 270.0 g |
| Hexamethylene-1,6-bis (ethyleneurea) | 0.8 g |
| Polystyrene microparticles (mean grain size: 3 μm) | 0.05 g |
| Colloidal, silica (mean grain size: 90 μm) | 0.1 g |
| <<Undercoat coating solution b>> | |
| $SnO_2$/Sb (weight ratio: 9/1, mean grain size: 0.18 μm) | Amount giving coating amount of 200 mg/$m^2$ |

-continued

| | |
|---|---|
| Copolymer latex solution (solid content: 30%, butyl acrylate/ styrene/glycidyl acrylate = 30/20/40 (weight %) | 270.0 g |
| Hexamethylene-1,6-bis (ethyleneurea) | 0.8 g |

Water was added to obtain a total volume of 1 L.

<<Heat Treatment of Support>>

The aforementioned undercoated support was heated to 140° C. during the drying process for undercoat layers and then gradually cooled.

(Preparation of Silver Halide Emulsion A)

In an amount of 7.5 g of inert gelatin and 10 mg of potassium bromide were dissolved in 900 mL of water, and the solution was adjusted to a temperature of 35° C. and pH 3.0, and added with 370 mL of an aqueous solution containing 74 g of silver nitrate and anaqueous solution containing sodium chloride, potassiumbromide and potassium iodide in a molar ratio of 60/38/2, $[Ir(NO)Cl_5]$ salt in an amount of $1\times10^{-6}$ mole per mole of silver of and rhodium chloride salt in an amount of $1\times10^{-6}$ mole per mole of silver by the controlled double jet method, while the pAg was kept at 7.7. Then, the solution was added with 4-hydroxy-6-methyl-1,3, 3a, 7-tetrazaindene and adjusted with NaOH to pH 8.0 and pAg 6.5 to perform reduction sensitization. Thus, cubic silver iodobromide grains having a mean grain size of 0.06 μm, monodispersion degree of 10%, variation coefficient of 8% for projected area and [100] face ratio of 87%. This emulsion was added with a gelatin coagulant to cause coagulation precipitation for desalting, and thus Silver halide emulsion A was obtained.

(Preparation of Sodium Behenate Solution)

In an amount of 32.4 g of behenic acids, 9.9 g of arachidic acid and 5.6 g of stearic acid were dissolved in 945 mL of pure water at 90° C. Then, the solution was added with 98 mL of 1.5 mol/L sodium hydroxide aqueous solution with stirring at high speed. Subsequently, the solution was added with 0.93 mL of concentrated nitric acid, cooled at 55° C. and stirred for 30 minutes to obtain sodium behenate solution.

(Preparation of Preform Emulsion A)

The aforementioned sodium behenate solution was added with 15.1 g of Silver halide emulsion A mentioned above, adjusted to pH 8.1 with a sodium hydroxide solution, then added with 147 mL of 1 mol/L silver nitrate solution over 7 minutes, and stirred for 20 minutes, and water-soluble salts were removed by ultrafiltration. The obtained silver behenate was in the form of grains having a mean grain size of 0.8 μm and monodispersion degree of 8%. After flocculates of the dispersion was formed, water was removed and the residue was subjected to 6 times of washing with water and removal of water and dried to obtain Preform emulsion A.

(Preparation of Photosensitive Emulsion A)

The obtained Preform emulsion A was gradually added with 544 g of a solution of polyvinyl butyral (average molecular weight: 3,000) in methyl ethyl ketone (17 weight %) and 107 g of toluene, mixed and then dispersed in a media dispersing machine utilizing a bead mill containing $ZrO_2$ having a size of 0.5 mm at 4000 psi to prepare Photosensitive emulsion A.

(Preparation of Photothermographic Material A)

The both surfaces of the aforementioned support were simultaneously coated with the following layers to prepare Photothermographic material A. Each layer was dried at 60° C. for 15 minutes.

(Coating of Back Surface Side)

A solution having the following composition was applied on Undercoat layer B of the support.

| | |
|---|---|
| Cellulose acetate butyrate (10% methyl ethyl ketone solution) | 15 mL/m$^2$ |
| Dye (i) | 7 mg/m$^2$ |
| Dye (ii) | 7 mg/m$^2$ |
| Monodispersed silica matting agent (monodispersed silica having monodispersion degree: 15% and mean grain size: 8 μm) | 30 mg/m$^2$ |
| $C_8F_{17}(CH_2CH_2O)_{12}C_8F_{17}$ | 50 mg/m$^2$ |
| $C_8F_{17}—C_6H_4—SO_3Na$ | 10 mg/m$^2$ |

(Coating of Image-Forming Layer Surface Side)

Image-Forming Layer

A solution having the following composition was coated on Undercoat layer A of the support in such an amount that the coated silver amount should become 2.4 g/m$^2$ and dried.

The coating solution for image-forming layer was a coating solution containing 50 weight % of methyl ethyl ketone, toluene, methanol and acetone.

| | |
|---|---|
| Photosensitive emulsion A | 240 g |
| Sensitizing dye (i) (0.1% methanol solution) | 1.7 mL |
| Pyridinium bromide perbromide (6% methanol solution) | 3 mL |
| Calcium bromide (0.1% methanol solution) | 1.7 mL |
| Oxidizing agent (i) (10% methanol solution) | 1.2 mL |
| 2-(4-Chlorobenzoyl) benzoic acid (12% methanol solution) | 9.2 mL |
| 2-Mercaptobenzimidazole (1% methanol solution) | 11 mL |
| Oxidizing agent (tribromomethylsulfoquinoline, 5% methanol solution) | 17 mL |
| Phthalazine | 0.6 g |
| Hydrazine derivative (i) | 0.3 g |
| Hydrazine derivative (ii) | 0.3 g |

-continued
| | | |
|---|---|---|
| N-methylflohydroxamic acid | 0.3 | g |
| 4-Methylphthalic acid | 0.25 | g |
| Tetrachlorophthalic acid | 0.2 | g |
| Developer (i) (20% methanol solution) | 29.5 | mL |
| Isocyanate compound (Desmodur N3300, Mobay Chemical Co.) | 0.5 | g |
| Ethyl 1-cyano-2-hydroxyacrylate | 0.2 | g |
Dye (i)
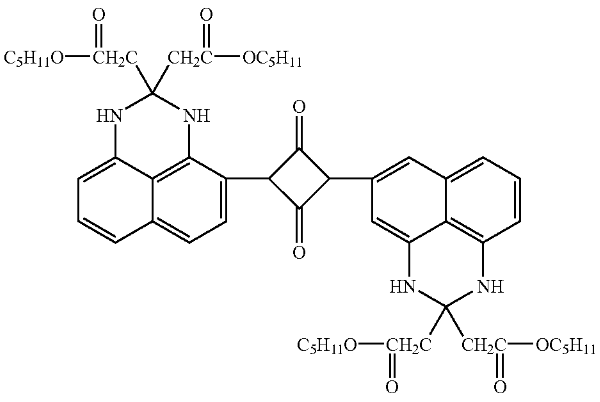
Dye (ii)
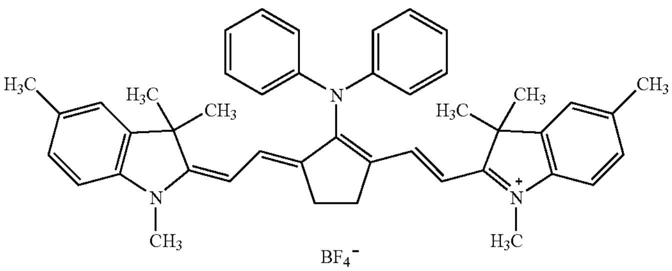
Hydrazine derivative (i)
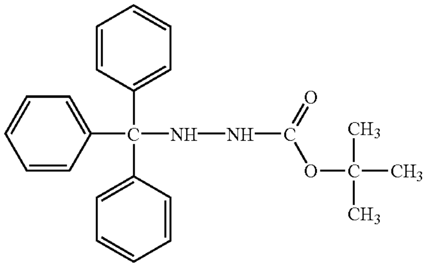
Hydrazine derivative (ii)
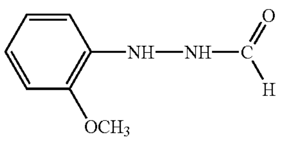

-continued

Developer (i)

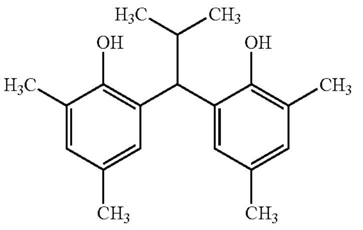

Sensitizing dye (i)

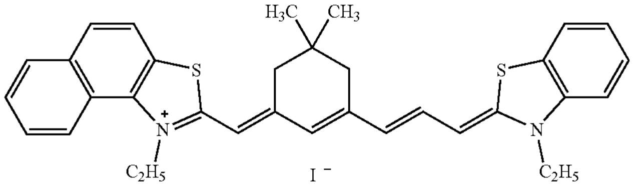

Oxidizing agent (i)

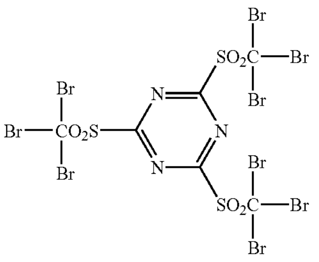

Surface Protective Layer

A solution having the following composition was coated at the same time of the coating of the image-forming layer thereon and dried.

| | |
|---|---|
| Acetone | 5 mL/$m^2$ |
| Methyl ethyl ketone | 21 mL/$m^2$ |
| Cellulose acetate butyrate | 2.3 g/$m^2$ |
| Methanol | 7 mL/$m^2$ |
| Phthalazine | 250 mg/$m^2$ |
| Monodispersed silica matting agent (monodispersion degree: 10%, mean grain size: 4 μm) | 70 mg/$m^2$ |
| $CH_2{=}CHSO_2CH_2CH_2OCH_2CH_2SO_2CH{=}CH_2$ | 35 mg/$m^2$ |
| $C_8F_{17}(CH_2CH_2O)_{12}C_8F_{17}$ | 100 mg/$m^2$ |
| $C_8F_{17}$—$C_6H_4$—$SO_3Na$ | 10 mg/$m^2$ |

<Preparation of Photothermographic Material A' for Comparison>

<<Preparation of Silver Halide Emulsion A'>>

In an amount of 11 g of alkali-treated gelatin (calcium content: 2700 ppm or less), 30 mg of potassium bromide and 1.3 g of sodium 4-methylbenzenesulfonate were dissolved in 700 ml of water, and the solution was adjusted to pH 6.5 at a temperature of 45° C., and added with 159 mL of an aqueous solution containing 18.6 g of silver nitrate and an,aqueous solution containing 1 mole/liter of potassium bromide, $5\times10^{-6}$ mole/liter of $(NH_4)_2RhCl_5(H_2O)$ and $2\times10^{-5}$ mole/liter of $K_3IrCl_6$ by the controlled double jet method over a period of 6 minutes and 30 seconds, while the pAg was kept at 7.7. Then, the solution was added with 476 mL of an aqueous solution containing 55.5 g of silver nitrate and an aqueous halide salt solution containing 1 mole/liter of potassium bromide and $2\times10^{-5}$ mole/liter of $K_3IrCl_6$ by the controlled double jet method over a period of 28 minutes and 30 seconds, while the pAg was kept at 7.7. Thereafter, by lowering the pH to cause coagulation precipitation to attain desalting. The mixture was added with 51.1 g of low molecular weight gelatin having an average molecular weight of 15,000 (calcium content: 20 ppm or less), and the pH and pAg of the mixture were adjusted to 5.9 and 8.0, respectively. The obtained grains were cubic grains having a mean grain size of 0.11 μm, variation coefficient of 9% for projected area and [100] face ratio of 90%. The silver halide grains obtained as described above were added with sodium benzenethiosulfonate in an amount of 76 μmoles per mole of silver and triethylthiourea in an amount of 71 μmoles per mole of silver. Then, the mixture was ripened, added with $5\times10^{-4}$ mole of 4-hydroxy-6-methyl-1,3,3a,7-tetrazaindene and 0.17 g of Compound A, and then added with potassium bromide (added as aqueous solution), the following Sensitizing Dye A, B or C (added as solution in ethanol) and Compound B (added as solution in methanol) in amounts of $4.7\times10^{-2}$ mole, $12.8\times10^{-4}$ mole and $6.4\times10^{-3}$ mole, respectively, per mole of the silver halide with stirring. After 20 minutes, the emulsion was rapidly cooled to 30° C. to complete the preparation of Silver halide emulsion A'.

Sensitizing dye A

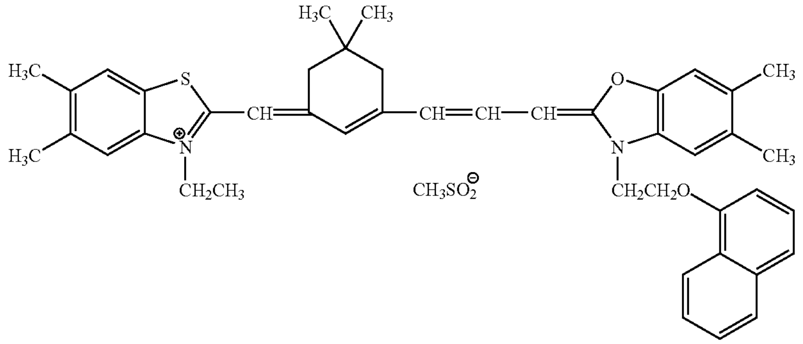

Compound A

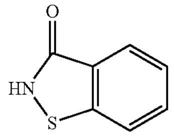

Compound B

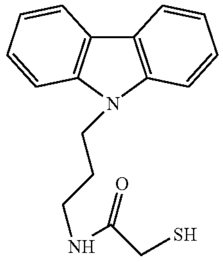

Sensitizing dye B

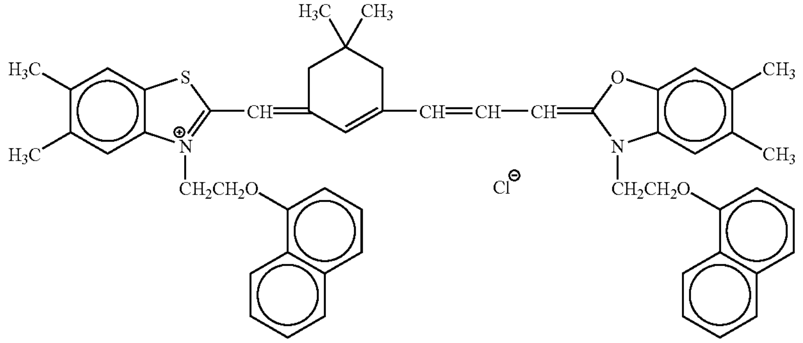

Sensitizing dye C

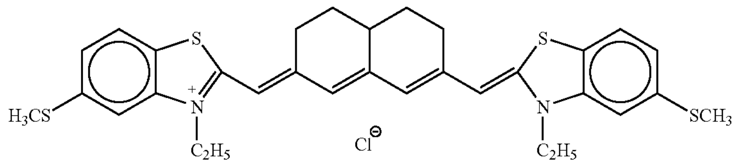

<<Preparation of Silver Behenate Dispersion A>>

In an amount of 87.6 g of behenic acid (Edenor C22-85R, trade name, produced by Henkel Co.), 49.2 mL of 5 mol/L NaOH aqueous solution and 120 mL of tert-butyl alcohol were mixed and allowed to react at 75° C. to obtain a solution of sodium behenate. This sodium behenate solution and an aqueous silver nitrate solution were added to a reaction vessel containing 635 mL of distilled water and 30 mL of tert-butyl alcohol with stirring. At this time, the internal temperature of the reaction vessel was kept at 30° C. and controlled so that the temperature of the solution should not be raised. After finishing the addition, the solid content was recovered by suction filtration and the solid content was washed with water. Wet cake corresponding to 100 g of the dry solid content of the obtained silver behenate was added with 7.4 g of polyvinyl alcohol (PVA-217, trade name, average polymerization degree: about 1700) and water, pre-dispersed by a homomixer and then dispersed in a dispersing machine (Microfluidizer-M-110S-EH; trade name, produced by Microfluidex International Corporation, using G10Z interaction chamber) to obtain Silver behenate dispersion A.

<<Preparation of Solid Microparticle Dispersion of Reducing Agent: 1,1-bis(2-hydroxy-3,5-dimethylphenyl)-3,5,5-trimethyl-hexane>>

In an amount of 10 kg of 1,1-bis(2-hydroxy-3,5-dimethylphenyl)-3,5,5-trimethylhexane and 10 kg of 20 weight % aqueous solution of denatured polyvinyl alcohol (Poval MP203, produced by Kuraray Co. Ltd.) were added with 400 g of Safinol 104E (Nisshin Kagaku Co.), 640 g of methanol and 16 kg of water, and mixed sufficiently to form slurry. The slurry was dispersed in a bead mill of horizontal type (UVM-2, produced by Imex Co.) and then added with 4 g of benzoisothiazolinone sodium salt and water to obtain a solid microparticle dispersion of reducing agent. The reducing agent particles contained in the dispersion obtained as described above had a median diameter of 0.44 μm, maximum particle diameter of 2.0 μm or less and variation coefficient of 19% for mean particle diameter.

<<Preparation of Solid Microparticle Dispersion of Organic Polyhalogenated Compound A>>

In an amount of 10 kg of Organic polyhalogenated compound A, 10 kg of 20 weight % aqueous solution of denatured polyvinyl alcohol (Poval MP203, produced by Kuraray Co. Ltd.), 639 g of 20 weight % aqueous solution of sodium triisopropylnaphthalene-sulfonate, 400 g of Safinol 104E (Nisshin Kagaku Co.), 640 g of methanol and 16 kg of water were mixed sufficiently to form slurry. The slurry was dispersed in a bead mill of horizontal type (UVM-2, produced by Imex Co.) and then added with water so that the concentration of Organic polyhalogenated compound A should become 25 weight % to obtain solid microparticle dispersion of Organic polyhalogenated compound A. The particles of the organic polyhalogenated compound contained in the dispersion obtained as described above had a median diameter of 0.36 μm, maximum particle diameter of 2.0 μm or less and variation coefficient of 18% for mean particle diameter.

<<Preparation of Solid Microparticle Dispersion of Organic Polyhalogenated Compound B>>

In an amount of 5 kg of Organic polyhalogenated compound B, 2.5 kg of 20 weight % aqueous solution of denatured polyvinyl alcohol (Poval MP203, produced by Kuraray Co. Ltd.), 213 g of 20 weight % aqueous solution of sodium triisopropylnaphthalene-sulfonate and 10 kg of water were mixed sufficiently to form slurry. The slurry was dispersed in a bead mill of horizontal type (UVM-2, produced by Imex Co.) and added with 2.5 g of benzoisothiazolinone sodium salt and water so that the concentration of Organic polyhalogenated compound B should become 23.5 weight % to obtain solid microparticle dispersion of Organic polyhalogenated compound B. The particles of the organic polyhalogenated compound contained in the dispersion obtained as described above had a median diameter of 0.38 μm, maximum particle-diameter of 2.0 μm or less and variation coefficient of 20% for mean particle diameter.

<<Preparation of Aqueous Solution of Organic Polyhalogenated Compound C>>

In an amount of 75.0 mL of water, 8.6 mL of sodium triisopropylnaphthalenesulfonate (20 weight % aqueous solution), 6.8 ml of sodium dihydrogenorthophosphate dihydrate (5 weight % aqueous solution) and 9.5 mL of 1 mol/L aqueous solution of potassium hydroxide were successively added and mixed with stirring. Further, the mixture was added with 4.0 g of Organic polyhalogenated compound C as powder with stirring to obtain 100 ml of aqueous solution of Organic polyhalogenated compound C.

<<Preparation of Emulsion Dispersion of Compound Z>>

In an amount of 10 kg of R-054 (produced by Sanko Co., Ltd.) containing 85 weight % of Compound Z was mixed with 11.66 kg of MIBK and dissolved in the solvent at 80° C. for 1 hour in an atmosphere substituted with nitrogen. This solution was added with 25.52 kg of water, 12.76 kg of 20 weight % aqueous solution of MP polymer (MP-203, produced by Kuraray Co. Ltd.) and 0.44 kg of 20 weight % aqueous solution of sodium triisopropylnaphthalenesulfonate and subjected to emulsion dispersion at 20-40° C. and 3600 rpm for 60 minutes. The dispersion was further added with 0.08 kg of Safinol 104E (Nisshin Kagaku Co.) and 47.94 kg of water and distilled under reduced pressure to remove MIBK. Then, the concentration of Compound Z was adjusted to 10 weight %.

<<Preparation of Dispersion of 6-Isopropylphthalazine Compound>>

In an amount of 62.35 g of water was added with 2.0 g of denatured polyvinyl alcohol (Poval MP203, produced by Kuraray Co., Ltd.) with stirring and mixed by stirring for 10 minutes. Then, the mixture was heated to attain uniform dissolution at an internal temperature in the range of 50-60° C. The internal temperature was lowered to 40° C. or lower, and the mixture was added with 25.5 g of polyvinyl alcohol (PVA-217, produced by Kuraray Co., Ltd., 10 weight % aqueous solution), 3.0 g of sodium triisopropylnaphthalene-sulfonate (20 weight % aqueous solution) and 7.15 g of 6-isopropylphthalazine (70% aqueous solution) and mixed by stirring to obtain 100 g of transparent dispersion.

<<Preparation of Solid Microparticle Dispersion of Development Accelerator W>>

In an amount of 10 kg of Development accelerator W, 10 kg of 20 weight % aqueous solution of denatured polyvinyl alcohol (Poval MP203, produced by Kuraray Co., Ltd.) and 20 kg of water were mixed sufficiently to form slurry. The slurry was dispersed in a bead mill of horizontal type (UVM-2, produced by Imex Co.) and added with water so that the concentration of Development accelerator W should become 20 weight % to obtain a solid microparticle dispersion of Development accelerator W.

<<Preparation of Coating Solution for Image-Forming Layer>>

Silver behenate dispersion A prepared above was added with the following binder, materials and Silver halide emulsion A' in the indicated amounts per mole of silver in Silver behenate dispersion A, and added with water to prepare a coating solution for image-forming layer. This coating solution was a coating solution containing 10 weight % of methanol and ethanol as organic solvents. After completion, the solution was degassed under reduced pressure of 0.54 atm for 45 minutes. The coating solution showed pH of 7.7 and viscosity of 50 mPa·s at 25° C.

| | |
|---|---|
| Binder: SBR latex (St/Bu/AA = 68/29/3 (weight %), $Na_2S_2O_8$ was used as polymerization initiator) | 397.0 g as solid |
| 1,1-Bis(2-hydroxy-3,5-dimethyl-phenyl)-3,5,5-trimethylhexane | 149.5 g as solid |
| Organic polyhalogenated compound B | 36.3 g as solid |
| Organic polyhalogenated compound C | 2.34 g as solid |
| Sodium ethylthiosulfonate | 0.47 g |
| Benzotriazole | 1.02 g |
| Polyvinyl alcohol (PVA-235, produced by Kuraray Co., Ltd.) | 10.8 g |
| 6-Isopropylphthalazine | 15.0 g |
| Compound Z | 9.7 g as solid |
| Compound X | 7.7 g |
| Dye A (added as a mixture with low molecular weight gelatin having mean molecular weight of 15000) | Amount giving optical density of 0.3 at 783 nm (about 0.40 g as solid) |
| Silver halide emulsion A | 0.06 mole as Ag |
| Compound A as preservative | 40 ppm in the coating solution (2.5 mg/$m^2$ as coated amount) |

pH was adjusted by using NaOH as a pH modifier. (The coated film showed a glass transition temperature of 17° C.)

<<Preparation of Coating Solution for Protective Layer>>

In an amount of 943 g of a polymer latex solution of copolymer of methyl methacrylate/styrene/2-ethylhexyl acrylate/2-hydroxyethyl methacrylate/acrylic acid=58.9/8.6/

25.4/5.1/2 (weight %) (glass transition temperature as copolymer: 46° C. (calculated value), solid content: 21.5 weight %, added with 100 ppm of Compound A and further added with Compound D as a film-forming aid in an amount of 15 weight % relative to solid content of the latex so that the glass transition temperature of the coating solution should become 24° C., mean particle diameter: 116 nm) was added with water, 114.8 g of the aqueous solution of Organic polyhalogenated compound C, 17.0 g as solid content of Organic polyhalogenated compound A, 0.69 g as solid content of sodium dihydrogenorthophosphate dihydrate, 11.55 g as solid content of Development accelerator W, 1.58 g of matting agent (polystyrene particles, mean particle diameter: 7 μm, variation coefficient of 8% for mean particle diameter), 29.3 g of polyvinyl alcohol (PVA-235, Kuraray Co., Ltd.) and 1.62 g of Compound E, and further added with water to form a coating solution (containing 0.8 weight % of methanol solvent). After completion, the solution was degassed under reduced pressure of 0.47 atm for 60 minutes. The coating solution showed pH of 5.5, and viscosity of 45 mPa·s at 25° C.

Polyhalogenated compound A

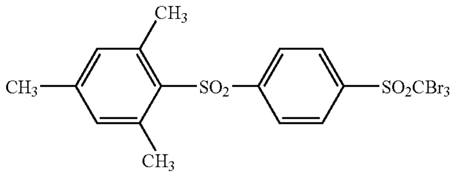

Polyhalogenated compound B

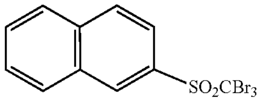

Compound Z

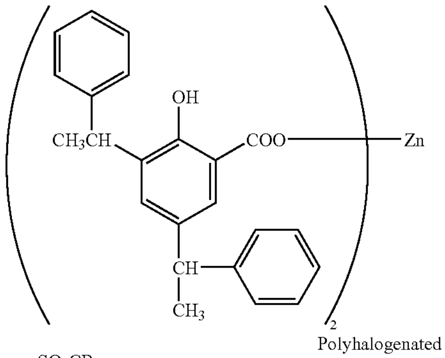

Polyhalogenated compund C

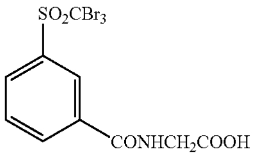

Dye A

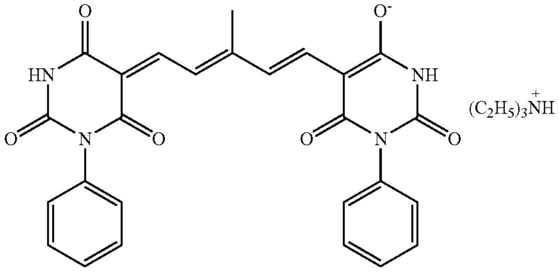

-continued

Development accelerator W

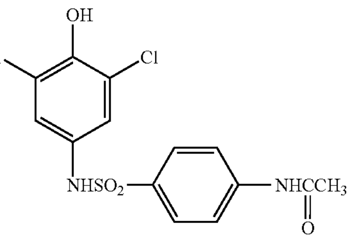

Compound X

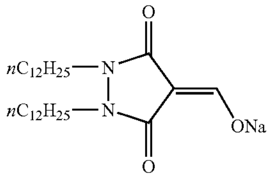

<<Preparation of Coating Solution for Lower Overcoat Layer>>

In an amount of 625 g of a polymer latex solution of copolymer of methyl methacrylate/styrene/2-ethylhexyl acrylate/2-hydroxyethyl methacrylate/acrylic acid=58.9/8.6/25.4/5.1/2 (weight %) (glass transition temperature as copolymer: 46° C. (calculated value), solid content: 21.5 weight %, added with 100 ppm of Compound A and further added with Compound D as a film-forming aid in an amount of 15 weight % relative to solid content of the latex so that the glass transition temperature of the coating solution should become 24° C., mean particle diameter: 74 nm) was added with water, 0.23 g of Compound C, 0.13 g of Compound E, 11.7 g of Compound F, 2.7 g of Compound H and 11.5 g of polyvinyl alcohol (PVA-235, Kuraray Co., Ltd.), and further added with water to form a coating solution (containing 0.1 weight % of methanol solvent). After completion, the solution was degassed under reduced pressure of 0.47 atm for 60 minutes. The coating solution showed pH of 2.6, and viscosity of 30 mPa·s at 25° C.

<<Preparation of Coating Solution for Upper Overcoat Layer>>

In an amount of 649 g of polymer latex solution of copolymer of methyl methacrylate/styrene/2-ethylhexyl acrylate/2-hydroxyethyl methacrylate/acrylic acid=58.9/8.6/25.4/5.1/2 (weight %) (glass transition temperature of the copolymer: 46° C. (calculated value), solid content: 21.5 weight %, added with 100 ppm of Compound A and further added with Compound D as a film-forming aid in an amount of 15 weight % relative to solid content of the latex so that the glass transition temperature of the coating solution should become 24° C., mean particle diameter: 116 nm) was added with water, 18.4 g of 30 weight % solution of carnauba wax (Cellosol 524, Chukyo Yushi Co., Ltd., silicone content: less than 5 ppm), 0.23 g of Compound C, 1.85 g of Compound E, 1.0 g of Compound G, 3.45 g of matting agent (polystyrene particles, mean diameter: 7 μm, variation coefficient for mean particle diameter: 8%) and 26.5 g of polyvinyl alcohol (PVA-235, Kuraray Co., Ltd.) and further added with water to form a coating solution (containing 1.1 weight % of methanol solvent). After completion, the coating solution was degassed at a reduced pressure of 0.47 atm for 60 minutes. The coating solution showed pH of 5.3 and viscosity of 25 mPa·s at 25° C.

Compound C

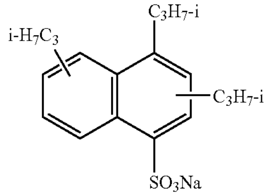

Compound D

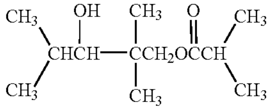

Compound E

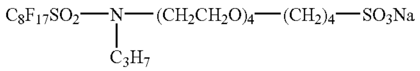

Compound F

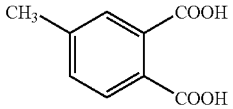

Compound G

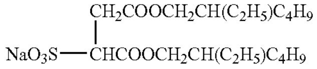

Compound H

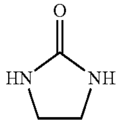

<<Preparation of Polyethylene Terephthalate (PET) Support with Back Layers and Undercoat Layers>>

(1) Preparation of PET Support

Polyethylene terephthalate having IV (intrinsic viscosity) of 0.66 (measured in phenol/tetrachloroethane=6/4 (weight ratio) at 25° C.) was obtained in a conventional manner by using terephthalic acid and ethylene glycol. The product was pelletized, melted and then extruded from a T-die to form an unstretched film. The film was stretched along the longitudinal direction by 3.3 times using rollers of different peripheral speeds, and then stretched at along the transverse direction by 4.5 times using a tenter. The temperatures of these operations were 110° C. and 130° C., respectively. Then, the film was subjected to thermal fixation at 240° C. for 20 seconds, and relaxed by 4% along the transverse direction at the same temperature. Then, the chuck of the tenter was released, the both edges of the film were knurled, and the film was rolled up at a tension of 4.8 kg/cm$^2$. Thus, a roll of a PET support having a width of 2.4 m, length of 3500 m and thickness of 120 μm was obtained.

(2) Preparation of Undercoat Layers and Back Layers (i) First Undercoat Layer

The aforementioned PET support was subjected to a corona discharge treatment of 0.375 kV·A·minute/m$^2$, and then a coating solution having the following composition was coated on the support in an amount of 6.2 mL/m$^2$ and dried to form a first undercoat layer.

| | |
|---|---|
| Latex A | 280.0 g |
| KOH | 0.5 g |
| Polystyrene microparticles (mean particle diameter: 2 μm, variation coefficient of 7% for mean particle diameter) | 0.03 g |
| 2,4-Dichloro-6-hydroxy-s-triazine | 1.8 g |
| Compound Bc-C | 0.097 g |
| Distilled water | Amount giving total weight of 1000 g |

(ii) Second Undercoat Layer

A coating solution having the following composition was coated on the first undercoat layer in an amount of 5.5 mL/m$^2$ and dried to form a second undercoat layer.

| | |
|---|---|
| Deionized gelatin ($Ca^{2+}$ content: 0.6 ppm, jelly strength: 230 g) | 10.0 g |
| Acetic acid (20 weight % aqueous solution) | 10.0 g |
| Compound Bc-A | 0.04 g |
| Methylcellulose (2 weight % aqueous solution) | 25.0 g |
| Polyethyleneoxy compound | 0.3 g |
| Distilled water | Amount giving total weight of 1000 g |

(iii) First Back Layer

The surface of the support opposite to the surface coated with the undercoat layers was subjected to a corona discharge treatment of 0.375 kV·A·minute/m$^2$, and a coating solution having the following composition was coated on the surface in an amount of 13.8 mL/m$^2$ and dried to form a first back layer.

| | |
|---|---|
| Julimer ET-410 (30 weight % aqueous dispersion Nihon Junyaku Co., Ltd.) | 23.0 g |
| Alkali-treated gelatin (molecular weight: about 10000, $Ca^{2+}$ content: 30 ppm) | 4.44 g |
| Deionized gelatin ($Ca^{2+}$ content: 0.6 ppm) | 0.84 g |
| Compound Bc-A | 0.02 g |
| Dye Bc-A | Amount giving optical density of 1.3-1.4 at 783 nm, about 0.88 g |
| Polyoxyethylene phenyl ether | 1.7 g |
| Water-soluble melamine compound (Sumitex Resin M-3, Sumitomo Chemical Co., Ltd., 8 weight % aqueous solution) | 15.0 g |
| Aqueous dispersion of Sb-doped $SbO_2$ acicular grains (FS-10D, Ishihara Sangyo Kaisha, Ltd.) | 24.0 g |
| Polystyrene microparticles (mean diameter: 2.0 μm, variation coefficient of 7% for mean particle diameter) | 0.03 g |
| Distilled water | Amount giving total weight of 1000 g |

(iv) Second Back Layer

A coating solution having the following composition was coated on the first back layer in an amount of 5.5 mL/$m^2$ and dried to form a second back layer.

| | |
|---|---|
| Julimer ET-410 (30 weight % aqueous dispersion Nihon Junyaku Co., Ltd.) | 57.5 g |
| Polyoxyethylene phenyl ether | 1.7 g |
| Water-soluble melamine compound (Sumitex Resin M-3, Sumitomo Chemical Co., Ltd., 8 weight % aqueous solution) | 15.0 g |
| Cellosol 524 (30 weight % aqueous solution, Chukyo Yushi Co., Ltd.) | 6.6 g |
| Distilled water | Amount giving total weight of 1000 g |

(v) Third Back Layer

The same coating solution as the first undercoat layer was coated on the second back layer in an amount of 6.2 mL/$m^2$and dried to form a third back layer.

(vi) Fourth Back Layer

A coating solution having the following composition was coated on the third back layer in an amount of 13.8 mL/$m^2$ and dried to form a forth back layer.

| | |
|---|---|
| Latex B | 286.0 g |
| Compound Bc-B | 2.7 g |
| Compound Bc-C | 0.6 g |
| Compound Bc-D | 0.5 g |
| 2,4-Dichloro-6-hydroxy-s-triazine | 2.5 g |
| Polymethyl methacrylate (10 weight % aqueous dispersion, mean particle diameter: 5.0 μm, variation coefficient of 7% for mean particle diameter) | 7.7 g |
| Distilled water | Amount giving total weight of 1000 g |

Dye Bc-A

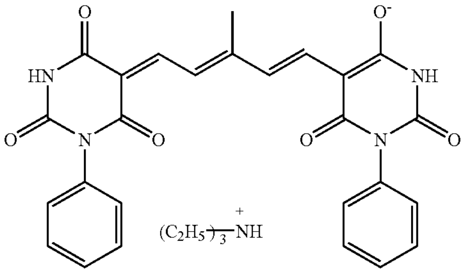

Compound Bc-A

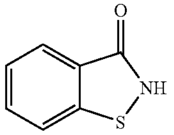

Compound Bc-B $C_{18}H_{37}OSO_3Na$

Compound Bc-C $C_8F_{17}SO_3Li$

Compound Bc-D

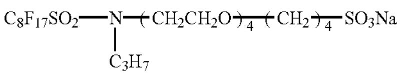

Latex A

Core/shell type latex comprising 90 weight % of core and 10 weight % of shell, core: vinylidene chloride/methyl acrylate/methyl methacrylate/acrylonitrile/acrylic acid=93/3/3/0.9/0.1 (weight %), shell: vinylidene chloride/methyl acrylate/methyl methacrylate/acrylonitrile/acrylic acid=88/3/3/3/3 (weight %), weight average molecular weight; 38000

Latex B

Latex of copolymer of methyl methacrylate/styrene/2-ethylhexyl acrylate/2-hydroxyethyl methacrylate/acrylic acid=59/9/26/5/1 (weight %).

(3) Heat Treatment During Transportation (3-1) Heat Treatment

The PET support with back layers and undercoat layers prepared as described above was introduced into a heat treatment zone having a total length of 200 m set at 160° C., and transported at a tension of 2 kg/$cm^2$ and a transportation speed of 20 m/minute.

(3-2) Post-Heat Treatment

Following the aforementioned heat treatment, the support was subjected to a post-heat treatment by passing it through a zone at 40° C. for 15 seconds, and rolled up. The rolling up tension for this operation was 10 kg/$cm^2$.

<<Preparation of Photothermographic Material A' for Comparison>>

On the undercoat layers on the side of the PET support on which the first and second undercoat layers were coated, the aforementioned coating solution for image-forming layerwas coated so that the coated silver amount should become 1.5 g/$m^2$by the slide bead coating method disclosed in JP-A-2000-2964, FIG. 1. On the image-forming layer, the aforementioned coating solution for protective layer was coated simultaneously with the coating solution for image-forming layer as stacked layers so that the coated solid content of the polymer latex should become 1.29 g/$m^2$. Then, the aforementioned coating solution for lower overcoat layer and coating solution for upper overcoat layer were simultaneously coated on the protective layer as stacked layers, so that the coated solid contents of the polymer latex should become 1.97 g/$m^2$ and 1.07 g/$m^2$, respectively, to prepare Photothermographic material A' for comparison.

<Evaluation>

Photothermographic material A and Photothermographic material A' for comparison prepared above were each cut into a sheet having a width of 590 mm and a length of 59 m, and rolled around a core member of a cylindrical shape so that the image-forming layer side should be exposed to the outside to form rolled samples. Each rolled sample was set on FT-286R (NEC) provided with a semiconductor laser at a wavelength of 785 nm. This plotter was combined with each of the heat development apparatuses shown in Table 1, and light exposure and heat development treatment were performed. The heat development apparatuses mentioned in Table 1 had the following structures.

<<Heat Development Apparatus 1>>

Heat development apparatus 1 was a heat development apparatus having the structure shown in FIG. 1.

<<Heat Development Apparatus 2>>

Heat development apparatus 2 was a heat development apparatus having the structure shown in FIG. 1 except that the same transportation rollers 13 as those of the upper side were also disposed on the lower side so that they should face each other in the heat development section B.

<<Heat Development Apparatus 3>>

Figure 2:
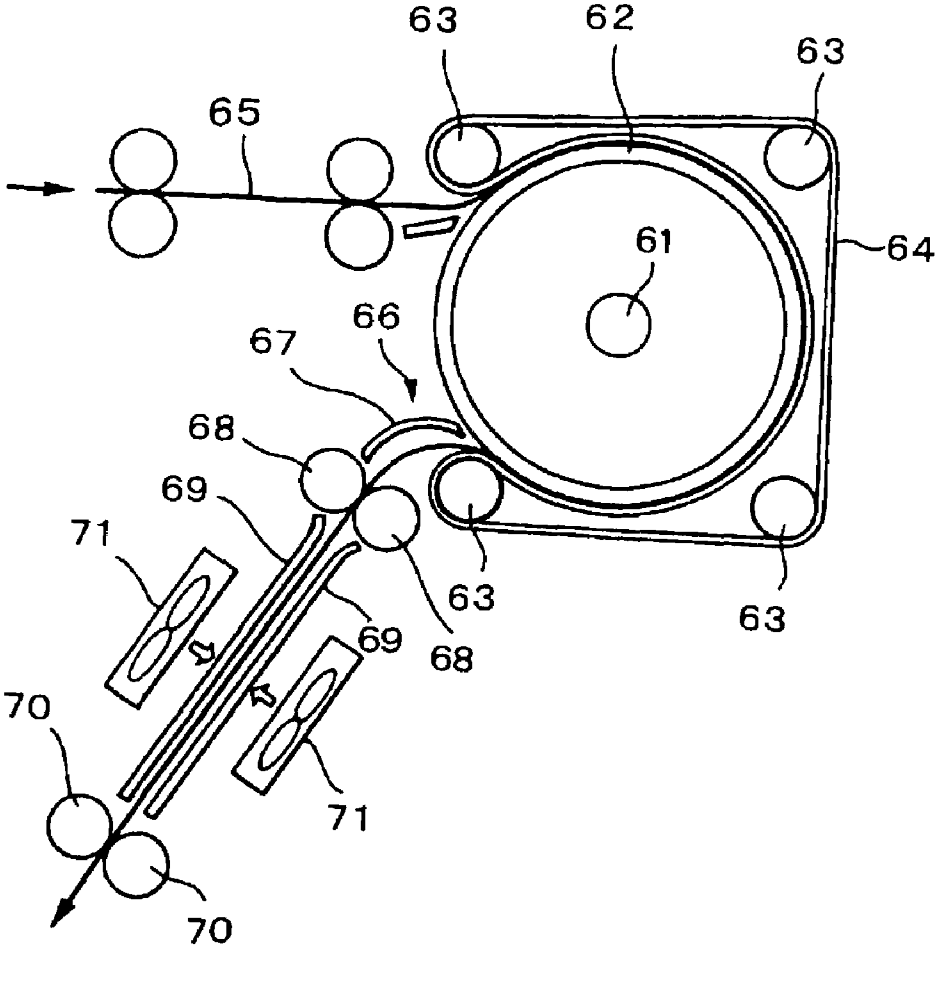
FIG. 2 is a side view of an exemplary heat developing apparatus for comparison with the image formation method of the present invention. In the figure, there are shown a halogen lamp 61, a heat drum 62, carrying rollers 63, a continuous belt 64, a photothermographic material 65, an exit 66, a guide panel 67, a pair of feeding rollers 68, flat guide panels 69, a pair of feeding rollers 70, and cooling fans 71.

Heat development apparatus 3 was a heat development apparatus of belt/drum type having the structure shown in FIG. 2. In FIG. 2, an exposed photothermographic material 65 is transported between a heat drum 62 and a continuous belt 64 suspended on multiple carrying rollers 63 and pressed on the heat drum 62. The heat drum 62 includes a halogen lamp 61 as a heat source, and during the transportation between the heat drum 62 and the continuous belt 64, the photothermographic material 65 is heated to a heat development temperature so that a latent image formed by the exposure is developed. Then, the photothermographic material 65 is transported to an exit 66 and made into a flat shape by a guide panel 67. Then, while the material is transported by two sets of feeding rollers 68 and 70, it is made into a flat shape by guide panels 69 and cooled to a predetermined temperature by cooling fans 71.

<<Heat Development Apparatus 4>>

Heat development apparatus 4 was "FDS-6100X" produced by Fuji Photo Film Co., Ltd. It had the same structure as that of the heat development apparatus shown in FIG. 1, and it was provided with transportation rollers 13 only on the image-forming layer side in the heat development section B.

The heat development was performed at a heat development temperature of 121° C. and a line speed of 25 mm/second in all of the heat development apparatuses.

The obtained images were evaluated for maximum density, gradation (2.7/(Light exposure giving density of 3—Light exposure giving density of 0.3)), unevenness of density and physical deformation. Unevenness of density and physical deformation were evaluated by sensory tests in which evaluation was classified into 5 stages. Score 5 means no problem, Score 3 means a limit for practical use, and Score 1 means unacceptability for practical use. The evaluation results are shown in Table 1 shown below.

TABLE 1

| Exp. No. | Type of photothermographic material | Content of organic solvent in coating solution for image-forming layer | Type of heat development apparatus | Maximum density | Gradation | Unevenness of density | Physical deformation | Note |
|---|---|---|---|---|---|---|---|---|
| 1 | Photothermographic material A | 50 weight % | Heat development apparatus 2 | −4.3 | 22 | 2 | 2 | Comparison |
| 2 | Photothermographic material A | 50 weight % | Heat development apparatus 1 | 4.4 | 22 | 4 | 4 | Invention |
| 3 | Photothermographic material A | 50 weight % | Heat development apparatus 3 | 4.2 | 21 | 2 | 1 | Comparison |
| 4 | Photothermographic material A | 50 weight % | Heat development apparatus 4 | 4.5 | 23 | 5 | 4 | Invention |
| 5 | Photothermographic material A for comparison | 10 weight % | Heat development apparatus 3 | 4.1 | 18 | 1 | 1 | Comparison |
| 6 | Photothermographic material A for comparison | 10 weight % | Heat development apparatus 1 | 4.1 | 19 | 2 | 2 | Comparison |

As clearly seen from the results shown in Table 1, it was found that the image formation method of the present invention could provide images showing high maximum density and high contrast and no generation of unevenness of density in image areas without causing physical deformation.

What is claimed is:

1. An image formation method comprising:

exposing a photothermographic material having an image-forming layer comprising at least one hydrophobic transparent binder and a back layer with a light having a wavelength of 700-850 nm and subjecting the exposed photothermographic material to development in a heat development apparatus provided with a preheating section, a heat development section and a gradual cooling section, wherein the image forming layer is obtained by applying a coating solution containing 50 weight % or more of an organic solvent based upon the total weight of solvent in the coating solution, and the heat development section is provided with heating members on the image-forming layer side and the back layer side and transportation rollers only on the image-forming layer side with respect to the phototherimographic material to be transported in the apparatus, and at least one layer constituting the photothermographic material contains at least one high contrast agent selected from the group consisting of hydrazine derivatives, quaternary ammonium compounds, quaternary phosphonium compounds and at least one high contrast agent represented by the following formula (e):

Formula (e)

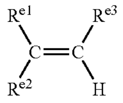

wherein $R^{e1}$ represents an electron-withdrawing group, $R^{e2}$ represents a hydrogen atom, an alkyl group, an alkenyl group, an alkynyl group, an aryl group, a heterocyclic group, a halogen atom, an acyl group, a thioacyl group, an oxalyl group, an oxyoxalyl group, a thiooxalyl group, an oxamoyl group, an oxycarbonyl group, an —S-carbonyl group, a carbamoyl group, a thiocarbamoyl group, a sulfonyl group, a sulfinyl group, an oxysulfonyl group, a thiosulfonyl group, a sulfamoyl group, an oxysulfinyl group, a thiosulfinyl group, a sulfinamoyl group, a phosphoyl group, a nitro group, an imino group, an N-carbonylimino group, an N-sulfonylimino group, a dicyanoethylene group, an ammonium group, a sulfonium group, a phosphonium group, a pyrylium group, or an immonium group, $R^{e3}$ represents a halogen atom, a hydroxy group or a salt thereof, an alkoxy group, an aryloxy group, a heterocyclyloxy group, an acyloxy group, an alkenyloxy group, an alkynyloxy group, an alkoxycarbonyloxy group, an aminocarbonyloxy group, a mercapto group or a salt thereof, an alkylthio group, an arylthio group, a heterocyclylthio group, an alkenylthio group, an alkynylthio group, an acylthio group, an alkoxycarbonylthio group, an aminocarbonylthio group, an amino group, an alkylamino group, an arylamino group, an acylamino group, an oxycarbonylamino group, a ureido group, or a sulfonamido group, and the trans-configuration between $R^{e1}$ and $R^{e3}$ is also included in the scope of the formula (e).

2. The image formation method according to claim 1, wherein the photothermographic material is in a form of sheet having a width of 550-650 mm and a length of 1-65 m.

3. The image formation method according to claim 1, wherein a part or all of the photothermographic material is rolled around a core member of cylindrical shape so that the image-forming layer side of the material should be exposed to outside.

4. The image formation method according to claim 1, wherein the photothermographic material is in a form of sheet having a width of 550-650 mm and a length of 1-65 m, and a part or all of the material is rolled around a core member of cylindrical shape so that the image-forming layer side of the material should be exposed to outside.

5. The image formation method according to claim 1, wherein the photothermographic material is heat-developed at a speed of 20-200 mm/second.

6. The image formation method according to claim 1, wherein the photothermographic material is heat-developed at a speed of 25-200 mm/second.

7. The image formation method according to claim 1, wherein the photothermographic material is heat-developed at a temperature of 80-250° C.

8. The image formation method according to claim 1, wherein the photothermographic material is heat-developed at a temperature of 100-140° C.

9. The image formation method according to claim 1, wherein the photothermographic material is heat-developed in the development apparatus for 1-180 seconds in total.

10. The image formation method according to claim 1, wherein the photothermographic material is heat-developed in the development apparatus for 5-90 seconds in total.

11. The image formation method according to claim 1, wherein the photothermographic material is exposed for $10^{-7}$ second or shorter.

12. The image formation method according to claim 1, wherein the photothermographic material is exposed by overlapped light beams of light sources.

13. The image formation method according to claim 1, wherein the overlapped light beams have an overlap coefficient of 0.2 or more.

14. The image formation method according to claim 1, wherein the photothermographic material is heated in the preheating section at a temperature of 80° C. or higher but lower than 115° C. for 5 seconds or more.

15. The image formation method according to claim 1, wherein the photothermographic material is transported with its back surface being in contact with a flat surface in the heat development section.

16. The image formation method according to claim 15, wherein the flat surface is composed of non-woven fabric.

17. The image formation method according to claim 15, wherein the flat surface is composed of aromatic polyamide or polytetrafluoroethylene.

18. The image formation method according to claim 1, wherein the surface of the transportation rollers is composed of silicone rubber.

19. The image formation method according to claim 1, wherein the hydrophobic transparent binder is polyvinyl butyral, cellulose acetate, cellulose acetate butyrate, polyester, polycarbonate, polyacrylic acid or polyurethane.

20. The image formation method according to claim 1, wherein the preheating section comprises transportation roller pairs consisting of an upper roller for an image-forming layer side of the photothermographic material and a lower roller for a back layer side of the photothermographic material, and the lower rollers are aluminum heating rollers.

21. The image formation method according to claim 1, wherein the preheating section comprises transportation roller pairs consisting of an upper roller for an image-forming layer side of the photothermographic material and a lower roller for a back layer side of the photothermographic material, and the upper rollers are silicone rubber rollers.

22. The image formation method according to claim 1, wherein the preheating section comprises at least six transportation roller pairs.

23. Photomechanical processing comprising the image formation method according to claim 1.

24. A method of preparing a photothermographic material and subsequently forming an image thereon, comprising:

applying at least one image-forming layer comprising a coating solution containing 50 weight % or more of an organic solvent based upon the total weight of solvent in the coating solution and at least one hydrophobic transparent binder, drying said coated solution to obtain a photothermographic material having an image-forming layer and a back layer, wherein at least one layer constituting the photothermographic material contains at least one high contrast agent selected from the group consisting of hydrazine derivatives, quaternary ammonium compounds, quatemary phosphonium compounds and at least one high contrast agent represented by the following formula (e):

Formula (e)

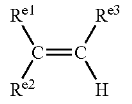

wherein $R^{e1}$ represents an electron-withdrawing group, $R^{e2}$ represents a hydrogen atom, an alkyl group, an alkenyl group, an alkynyl group, an aryl group, a heterocyclic group, a halogen atom, an acyl group, a thioacyl group, an oxalyl group, an oxyoxalyl group, a thiooxalyl group, an oxamoyl group, an oxycarbonyl group, an —S-carbonyl group, a carbamoyl group, a thiocarbamoyl group, a sulfonyl group, a sulfinyl group, an oxysulfonyl group, a thiosulfonyl group, a sulfamoyl group, an oxysulfinyl group, a thiosulfinyl group, a sulfinamoyl group, a phosphoyl group, a nitro group, an imino group, an N-carbonylimino group, an N-sulfonylimino group, a dicyanoethylene group, an ammonium group, a sulfonium group, a phosphonium group, a pyrylium group or an immonium group, $R^{e3}$ represents a halogen atom, a hydroxy group or a salt thereof, an alkoxy group, an aryloxy group, a heterocyclyloxy group, an acyloxy group, an alkenyloxy group, an alkynyloxy group, an alkoxycarbonyloxy group, an aminocarbonyloxy group, a mercapto group or a salt thereof, an alkylthio group, an arylthio group, a heterocyclylthio group, an alkenylthio group, an alkynylthio group, an acylthio group, an alkoxycarbonylthio group, an aminocarbonylthio group, an amino group, an alkylamino group, an arylamino group, an acylamino group, an oxycarbonylamino group, a ureido group or a sulfonamido group, and the trans-configuration between $R^{e1}$ and $R^{e3}$ is also included in the scope of the formula (e), exposing a photothermographic material with a light having a wavelength of 700-850 nm, and subjecting the exposed photothermographic material to development in a heat development apparatus provided with a preheating section, a heat development section and a gradual cooling section, wherein the heat development section is provided with heating members on the image-forming layer side and the back layer side and transportation rollers only on the image-forming layer side with respect to the photothermographic material to be transported in the apparatus.

25. The image formation method according to claim 24, wherein the hydrophobic transparent binder is polyvinyl butyral, cellulose acetate, cellulose acetate butyrate, polyester, polycarbonate, polyacrylic acid or polyurethane.

26. Photomechanical processing comprising the image formation method according to claim 24.

* * * * *